US005912979A

United States Patent [19]

Gavrilos

[11] Patent Number: 5,912,979
[45] Date of Patent: Jun. 15, 1999

[54] METHOD AND APPARATUS FOR OBJECT SURVEILLANCE ALONG A TRANSPORT PATH

[75] Inventor: Emanuel N. Gavrilos, Melrose Park, Ill.

[73] Assignee: Bell & Howell Mail Processing Systems Co., Durham, N.C.

[21] Appl. No.: 08/062,033

[22] Filed: May 17, 1993

Related U.S. Application Data

[63] Continuation of application No. 07/608,641, Nov. 2, 1990, abandoned.

[51] Int. Cl.[6] .................. G06K 9/00

[52] U.S. Cl. .................. 382/101

[58] Field of Search .................. 382/1, 7, 22, 101, 382/103, 135, 199; 358/102, 108; 364/460, 467, 478, 478.13, 478.17; 209/579, 900, 934; 348/94, 107, 143; 701/300; H04N 7/18

[56] References Cited

U.S. PATENT DOCUMENTS

| | | | |
|---|---|---|---|
| 3,819,173 | 6/1974 | Anderson et al. | 270/54 |
| 4,247,008 | 1/1981 | Dobbs | 209/569 |
| 4,257,324 | 3/1981 | Stefansson et al. | 101/93.01 |
| 4,328,962 | 5/1982 | Akers | 271/12 |
| 4,338,671 | 7/1982 | Korytkowski et al. | 364/478 |
| 4,364,554 | 12/1982 | Akers | 271/272 |
| 4,432,458 | 2/1984 | Daboub | 209/564 |
| 4,497,040 | 1/1985 | Gomes et al. | 364/900 |
| 4,503,976 | 3/1985 | Cloud et al. | 209/546 |
| 4,570,916 | 2/1986 | Thompson | 270/52.5 |
| 4,835,403 | 5/1989 | Wisniewski | 250/561 |
| 4,965,829 | 10/1990 | Lemelson | 382/1 |
| 5,105,363 | 4/1992 | Dragon et al. | 364/469 |

FOREIGN PATENT DOCUMENTS 0102704 3/1984 European Pat. Off. .

OTHER PUBLICATIONS

Raes et al., "Optical Document Sorter ODS–1", *Electrical Communications*, vol. 45, No. 2, 1970, pp. 135–143.

"Mail Processing System: Sorting Model 1000, 800, 600 Encoding Model 400", Bell & Howell brochure, 1988, *Bell & Howell Company*, Form No. PH–547, 12 pages.

*Primary Examiner*—Andrew W. Johns
*Attorney, Agent, or Firm*—Millen, White, Zelano & Branigan, P.C.

[57] ABSTRACT

A method and apparatus for document surveillance along a transport path in a mail sorting machine includes using a plurality of sequentially positioned photocells affixed along the transport path to detect document separation and jamming events through the application of assigned document identification and message transfer schemes whereby one sensor detects an edge of the document and transfers the document identifier and a shaft encoder count to the next sensor along the transport path in the form of a message. A message queue for each sensor is maintained to detect improper document leading edge and trailing edge conditions. A series of surveillance modules operates on a multitasking basis through a primary master processor.

22 Claims, 13 Drawing Sheets

METHOD AND APPARATUS FOR OBJECT SURVEILLANCE ALONG A TRANSPORT PATH

This application is a continuation of application Ser. No. 07/608,641, Nov. 2, 1990, now abandoned.

FIELD OF INVENTION

This invention generally pertains to apparatus and methods for sorting objects and more particularly to computerized apparatus and methods for high speed document surveillance and sorting with multi-task tracking of documents.

BACKGROUND OF THE INVENTION

Mail sorting machines provide postal patrons that handle high volumes of mail with the ability to take advantage of the United States Postal Service's reduced postal rates. The United States Postal Service defines its postal class structure in a manner that generally provides lower rates based upon certain criteria such as the length (five digits versus nine digits) and manner (bar-coded or not) by which the zip code information is provided, and also the number of mail pieces that are included in a given package (a certain number of mail pieces, such as ten or more). Thus, a postal patron can achieve a considerable postage savings for bulk mailing by qualifying for less expensive pre-sorted and barcoded rates. Sorting machines may also be used to sort incoming mail that has already been processed by the United States Postal Service.

Such automated mail sorting machines include Bell & Howell Company models J1000, J800 and J600 Mail Processing Systems and are provided by the Phillipsburg Division of Bell & Howell Company. These automated sorting machines write or optically read characters, and/or bar code labels and sort mail into various bins based upon detected ZIP code information.

Typically a mail sorting machine receives multiple mail pieces in an input hopper whereafter the mail pieces are transported to an extraction device which orientates each mail piece and feeds it to the transport path. Such a system is described in U.S. Patent Application of Paul F. Kostyniuk, assigned to instant assignee, entitled "Mail Sorting Apparatus and Method," filed Oct. 16, 1990, and is hereby incorporated by reference. The transport path generally provides for single file flow of the documents past the various stations of the sorting machine. Once a mail piece enters the transport path, a character reader reads the address and/or ZIP code written on the mail piece. A computer determines whether the ZIP code is a valid ZIP code and communicates the ZIP code digits to a bar code label printer. The label printer prints the bar-code label at the proper location on the mail piece. As the mail piece proceeds along the transport path, a bar code reader verifies whether a legitimate ZIP code label is printed and whether that ZIP code is attached to the proper mail piece.

In mail sorting systems such as these, accurate surveillance and alignment of documents is critical. Various problems arise along the transport path when an inadequate document tracking system is in place. These problems, which are aggravated as the speed of the system is increased, include document jamming, delayed document separation, and document "disappearance."

Document jamming occurs when a document gets caught along the transport path. One type of document jamming is called document shingling. Document shingling occurs when two or more documents appear to be a single document to the system such as when two documents are too close together or are stuck together. Delayed document separation occurs when two documents that have been fed together, separate later along the transport path. Document "disappearance" occurs when a document exits the sorting system prematurely or gets "trapped" in a section of the transport path where it cannot be detected.

Current sorting systems label mail pieces based upon a mail piece's assumed position in a queue. This type of sorting system detects when a first document enters the transport path and assumes that the first document to enter is the first document to leave the transport path. Such a system typically mislabels and missorts documents when a document inadvertently leaves the transport path. An example of this occurs when a document has been detected as properly entering the transport path and has its ZIP code properly read by the optical character reader. When this document is extracted by an operator or otherwise removed from (e.g., flies off or drops off of the transport path) the transport path before reaching the bar code printer, the system automatically marks the next document with the ZIP code information designated for the missing document assuming that the next document in line was the proper document. No real time automatic document surveillance system exists to prevent this type of error.

Known systems also fail not only to detect many of these problems, but they also fail to adequately correct many of these problems. For example, current systems that are able to detect a shingling event, flush the entire sorting system instead of minimizing its effects. This results in additional resorting of properly sorted documents. The shingling event is typically detected by shingling sensors at the beginning and end of the transport path.

Other systems fail to differentiate one type of error from another. An example is a document "disappearance" event wherein the system considers this event as a shingling event. System errors are not properly identified thereby limiting the ability to provide corrective measures. Thus, it is desirable to properly detect and correct disappearance errors and other errors without requiring a flushing of the transport path or other area of the sorting system.

There exists a need for a high speed intelligent automatic document sorting system that effectuates accurate (real time) document surveillance and provides error correction techniques to overcome the above mentioned problems. Such a system preferably should not require flushing the entire sorting system for all detected errors, but should correct errors to improve document throughput. The system should also accommodate fast transport path speeds without substantially increasing undetected sorting errors.

SUMMARY OF INVENTION

These needs and others are substantially met through the method and apparatus for intelligent document sorting disclosed herein. The invention comprises a real time multitasking surveillance module including a plurality of edge detecting sensors wherein a document is continuously tracked along a transport path by assigning a unique document identifier to each document and employing a unique message transferring scheme between consecutive sensors in the module. The message transferring scheme includes transferring the document identifier in the message to the next sensor. These messages also include shaft tick counts retrieved from the transport path belt shaft encoder. The counts are recorded at the leading and trailing edges of the document and sent to the message queue for the next consecutive sensor.

An expected net leading edge arrival count is compared to the actual net arrival shaft tick count for the same document as identified by the unique document identifier. If the actual arrival time (i.e., in shaft encoder ticks) exceeds the expected arrival time, the module detects a document disappearance and the message queue for the sensor is adjusted; if the actual arrival time is less than the expected arrival time, a document separation is detected and a new document identifier is assigned to the document for continued tracking capability. The message queue is adjusted to maintain the proper message associated with the next document.

Multiple surveillance modules are utilized as components of a larger complete surveillance system. Each module has a master processor that operates independently of any other module processor. Each sensor in a module is handled as a separate task by the module's processor. Each sensor is used to detect document separations, document disappearances and document jams. Multiple surveillance modules are monitored by a primary master processor that interfaces with the data processing unit of the sorting system through a Multibus backplane.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

DETAILED DESCRIPTION OF THE INVENTION

Figure 1:
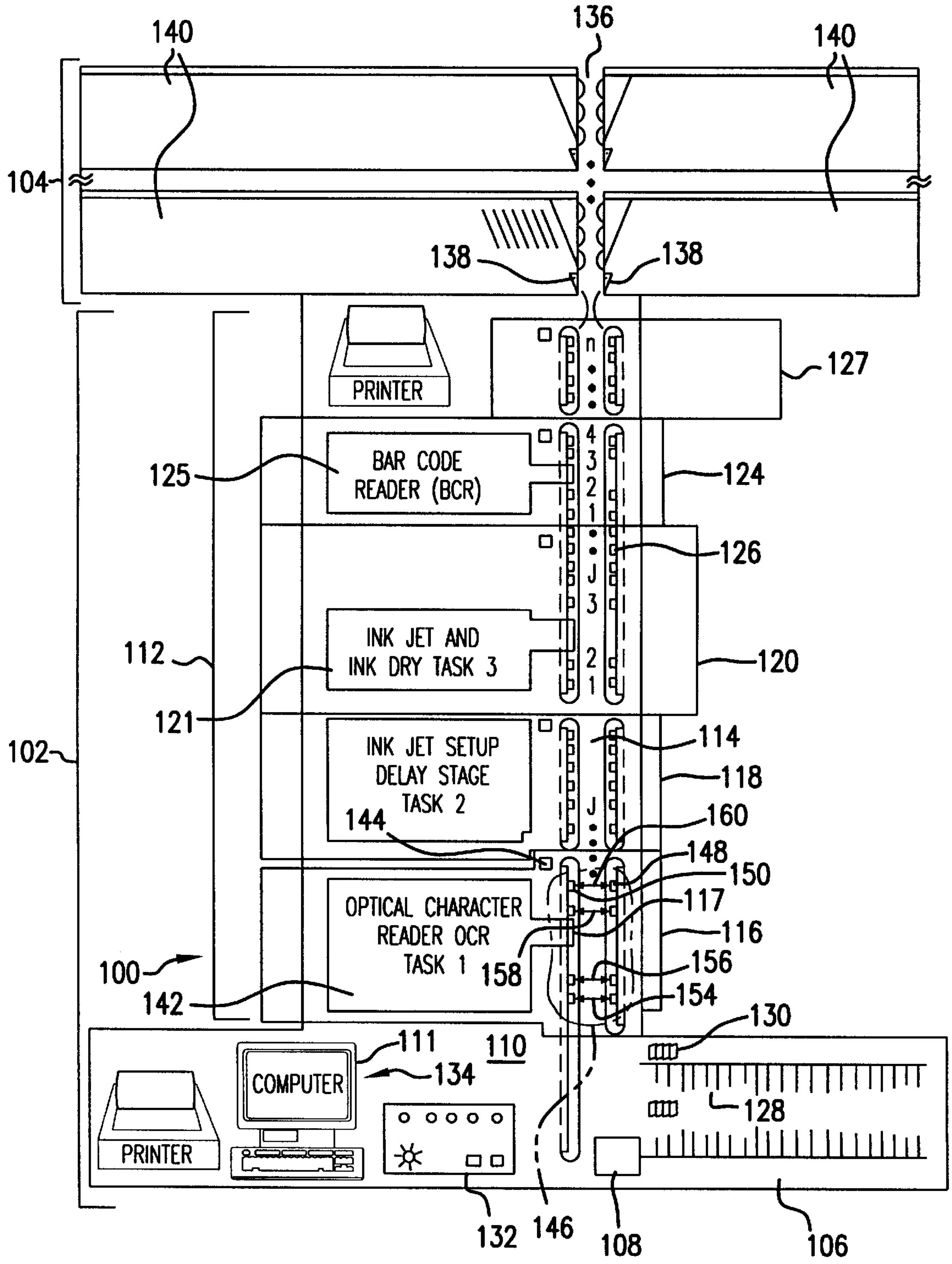
FIG. 1 is a diagrammatic top view of an intelligent sorting apparatus in accordance with the invention.

FIG. 1 generally depicts an intelligent document sorting system 100 according to the invention. The intelligent document sorting system 100 includes a document processing system 102 and a bin sorting stage 104 into which documents are ultimately sorted.

The document processing system 102 includes an input hopper 106; a document picker 108; a central processing computer 110; and a transport path 114 such as are known in the art, along which documents travel on edge toward the bin sorting stage 104. Along the transport path are various processing stations also included in a multi-tasking document surveillance system 112, including an optical character recognition (OCR) station 116; a secondary delay station 118; an Ink Jet printer station 120; a bar-code reader station 124; a conveyor/sorting station 127; and multiple sensors 126 associated with each station.

A plurality of hopper floor belts 128 and hopper augurs 130 (not shown) transport documents on edge toward the document picker 108. The documents are oriented with the name and address pressed against the picker 108. The picker (a vacuum type) 108 assures proper edge orientation and places the document onto the transport path 114. The documents travel at high speed (e.g., 165 in./sec. in the illustrated embodiment) on edge down the transport path with their name and address information facing the OCR window 117 and continue past the OCR station 116, the delay station 118, the Ink Jet printer station 120 including an INK DRY station, and the BCR station 124.

The document processing system also includes an operator console 132 and data processing system 134. The data processing system includes a control processing unit 111, such as an IBM personal computer or the like, and an interface system for interfacing with the document surveillance system 112.

The bin sorting stage 104 comprises sorting apparatus which is well known in the art including a central transport assembly 136 which directs documents along a sorting path that is collinear with the transport path 114 of the document processing system 102. A document is deflected into the proper bin 140 by diverter gates 138 based upon its coded ZIP code. The sorting bin stage 104 includes a plurality of unillustrated transport belts and may include any number of bins depending upon the given application. The sorting bin stage 104 is coupled to the document surveillance system 112.

The document surveillance system 112 operates as a real time multi-tasking fault detection, error correction system. The first task involves the OCR station 116. Each nonsecondary station (OCR INK JET, and BCR stations) is similar in that it includes a primary function such as reading ZIP codes, printing bar codes, or reading bar code labels, and in that each is an intelligent document surveillance module. The plurality of intelligent document surveillance modules are also integrated by a primary master processor into one larger intelligent document sorting system. For example, one intelligent surveillance module, the OCR station, includes an OCR 142, a shaft encoder 144, and a plurality of sensors 146 wherein each sensor is handled as a separate task by the surveillance module. These components are operably coupled to the OCR secondary master processor not shown in FIG. 1 (shown in FIG. 2).

The OCR 142 may be of the type MRS 40 manufactured and marketed by the Postal Logic Division of Bell & Howell in Dallas, Tex. The shaft encoder 144 is a conventional incremental encoder that produces a given number of shaft ticks (digital pulses) for a predetermined unit of instantaneous angular position of an encoder disc. The encoder disc is coupled to the rotating shaft of the transport path belt drive. Incremental encoders of this type generally require a counting system which counts the pulses generated by the encoder. The counts are added or subtracted from a given reference point. Although the preferred embodiment utilizes a belt driven system as the transport path, any other suitable transport mechanism may be used.

Such encoders provide an accurate shaft position used to measure the distance traveled by a given document along a section of the transport path. This accurate document positioning mechanism allows the OCR and other stations to accurately read and later print bar coded ZIP code information onto the document. The multiple station system uses a separate belt set for each station. Consequently, multiple shaft encoders are used to provide accurate distance information for each station. The digital shaft encoder 144 may, for example, be of the type sold by BEI Motion Systems Company, Model-M15, or Sumtak Electronic Instruments, Model-LEC, or any other suitable shaft encoder. The shaft encoder 144 and the plurality of sensors 146 provide inputs for the secondary master processor dedicated to the corresponding surveillance module.

The plurality of sensors 146 are of the optical sensor type and include an optical energy emitter 148 and an optical energy detector 150. There are at least four sensors within the OCR station 116. These include a first document detection sensor 154; a second document detection sensor 156; a third document detection sensor 158; and a fourth detection sensor 160. These sensors may, for example, be of the type manufactured by Honeywell, Inc., Microswitch Division, in Richardson, Tex., Model Number SE 5455-3 for an emitter and model number SD 5443-3 for the photodetectors. As appreciated by those of ordinary skill in the art, other suitable sensors other than the optical type may be used, for example, weight detection sensors, or sensors operating at non-optical frequencies within the electromagnetic frequency spectrum. The spacing of sensors may vary along the transport path and may be adjusted depending upon the given application. The system operator may modify stored sensor spacing data to accommodate changes in sensor spacing. For example, the sensors 154, 156, 158 and 160 in the OCR station 116 vary in spacing from four inches to twelve inches.

Figure 2:
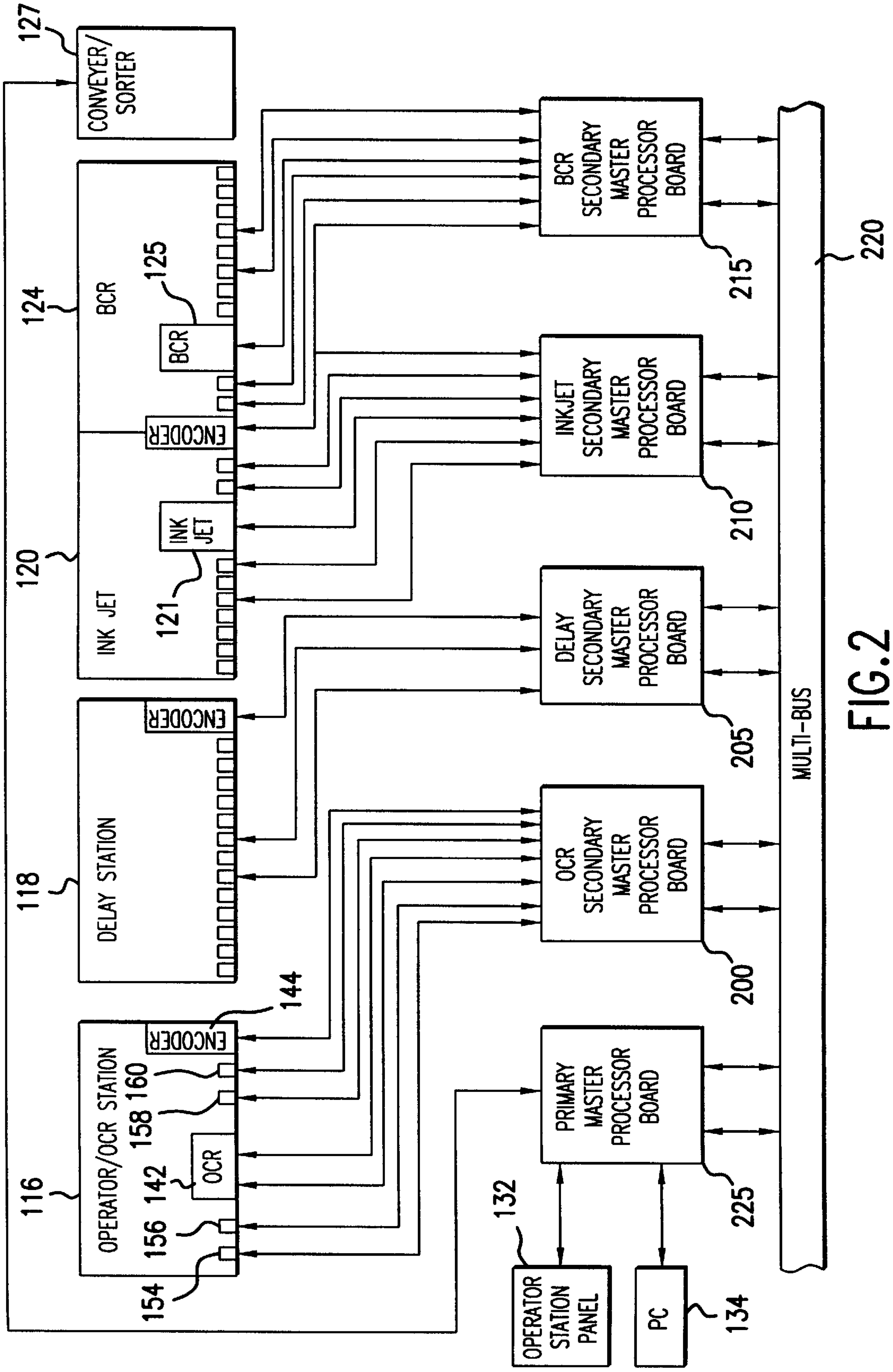
FIG. 2 is a detailed functional block diagram of the intelligent sorting apparatus in accordance with the invention.

FIG. 2 is a detailed block diagram of the system 102 which generally depicts interconnections to facilitate the real time multi-tasking functions between the various modules within the document processing system 102. The multi-tasking system includes an OCR secondary master processor board 200 coupled to the OCR station 116, a delay station secondary master processor board 205 operably coupled to the document delay station 118, an INK JET secondary master processor board 210 to the INK JET station 120, and a BCR secondary master processor board 215 operably coupled to the BCR station 124. Each of the processor boards 200, 205, 210, 215 includes a secondary master microprocessor and shares a common bi-directional MULTIBUS 220 (e.g., in the illustrated embodiment, the industry standard INTEL MULTIBUS) with a primary master processor board 225. These secondary master processors generally communicate on a multi-bus parallel priority basis with a primary master processor on board the primary master board 225. The primary master processor does not assign tasks to the secondary master processors. The secondary master processors continuously perform their particular tasks independent from the tasks performed by the primary master processor. The primary master processor board 225 is also coupled with the data processing system 134, the operator console 132, and the conveyor sorter station 127. In the illustrated embodiment, each of the processor boards 225, 200, 205, 210, 215 may be, for example, a Model M68K10-5 processor board marketed by SBE, Inc., located in Concord, Calif. These boards employ a Motorola series 68000 microprocessor, and each includes two standard serial and two standard parallel ports and utilize the industry standard MULTIBUS. In the illustrated embodiment, the primary master processor board 225 includes a piggy-backed I/O board which provides three extra conventional parallel ports, and each of the secondary master processor boards 200, 205, 210, 215 includes two piggy-backed I/O boards providing six extra parallel ports. These I/O ports are used to couple to optical sensors, and other devices as shown in FIG. 2. The primary master processor board 225 is coupled via the parallel ports to the personal computer 134, the operator panel 132 and the sorter 127 and communicates with these devices in a manner substantial as described in the incorporated co-pending patent application to P. F. Kostyniuk.

Each secondary master processing board 200, 205, 210, 215 performs real time document detection surveillance based upon received inputs from its corresponding sensors and shaft encoder. A microprocessor on each processor board performs the processing on this input data.

The primary master processor board 225, utilizing its on board microprocessor, supports the multi-tasking environment. Generally, this multi-tasking processing controls documents that are leaving one intelligent surveillance module and entering another. Each processing station, being monitored by its associated secondary master processing board, is controlled by a separate task of the master processing board 225. The master processor board 225 communicates with the data processing system 134 to assign the proper ZIP code number to the proper document.

Figure 3A:
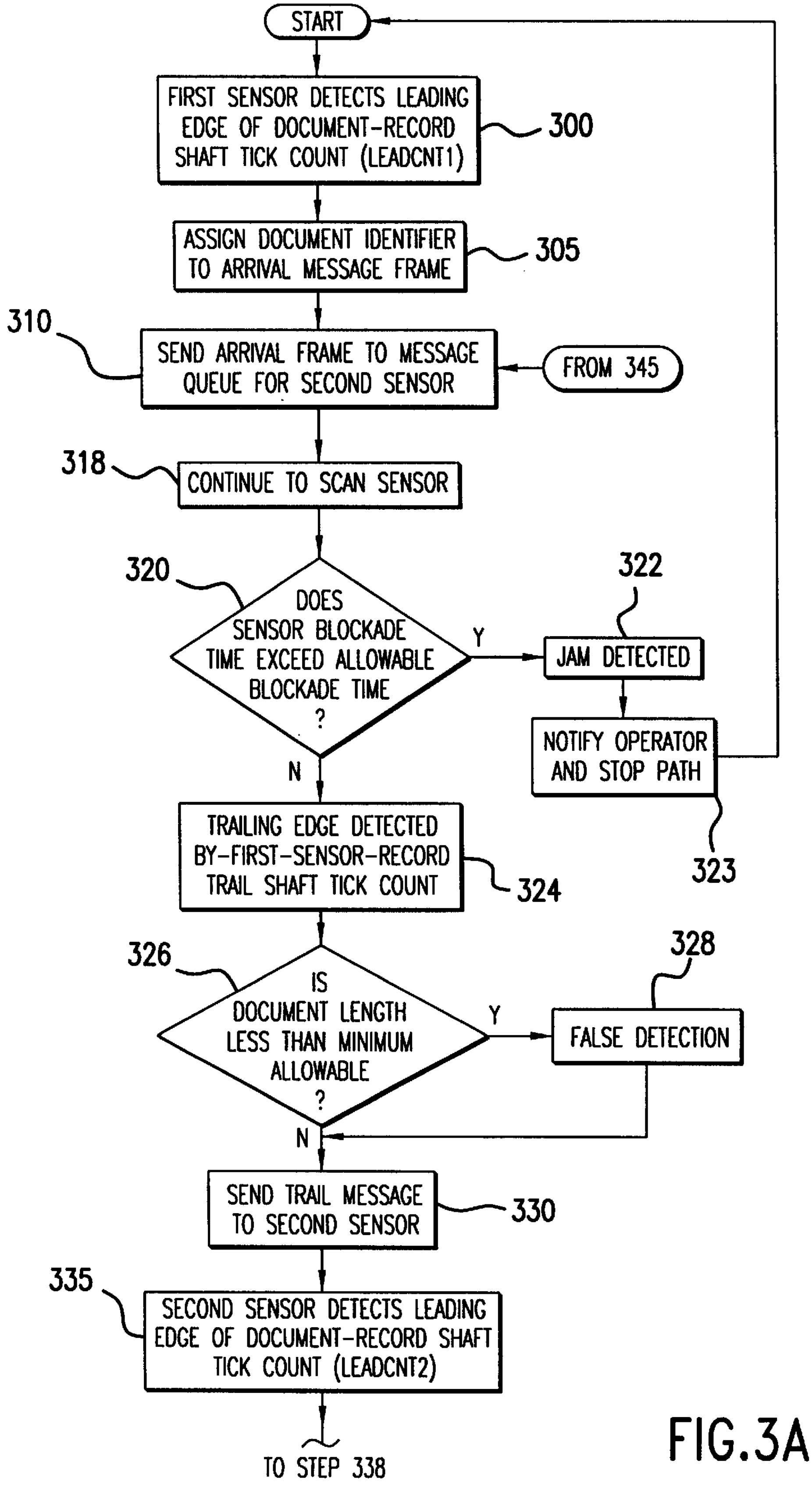
FIGS. 3A and 3B are flow charts generally illustrating the document surveillance process in accordance with the invention for each surveillance module.

FIGS. 3A, B, and C show a method in accordance with the invention, for using the plurality of optic sensors 146, with reference to the OCR station 116, to detect jamming errors, document separation errors, and document "disappearance errors," in real time. This unique surveillance method incorporates a document identifier and message queue technique integrated with the plurality of sensors to track documents through the OCR station. This method is used by each of the surveillance modules 116, 118, 120, 124 in the document surveillance system.

The first sensor 154 on the OCR station 116 detects the leading edge of a document and as illustrated at block 300 the secondary master OCR processor 200 records the current shaft tick count from the OCR station shaft encoder 144 which is a reference indication for the detected edge of the document. This information (LEADCNT1) becomes one component of a message frame 311 (see FIG. 3B). The document receives an identification number (DOCID) which uniquely identifies the document to the system as illustrated by block 305. This information is also a component of the message frame 311. An arrival message frame is a message frame containing the shaft tick count corresponding to the detection of the leading edge of a document (EDGECNT), such as LEADCNT1. The arrival message is then communicated to a message queue for the second sensor (next sensor along the transport path) as shown at block 310.

Figure 3B:
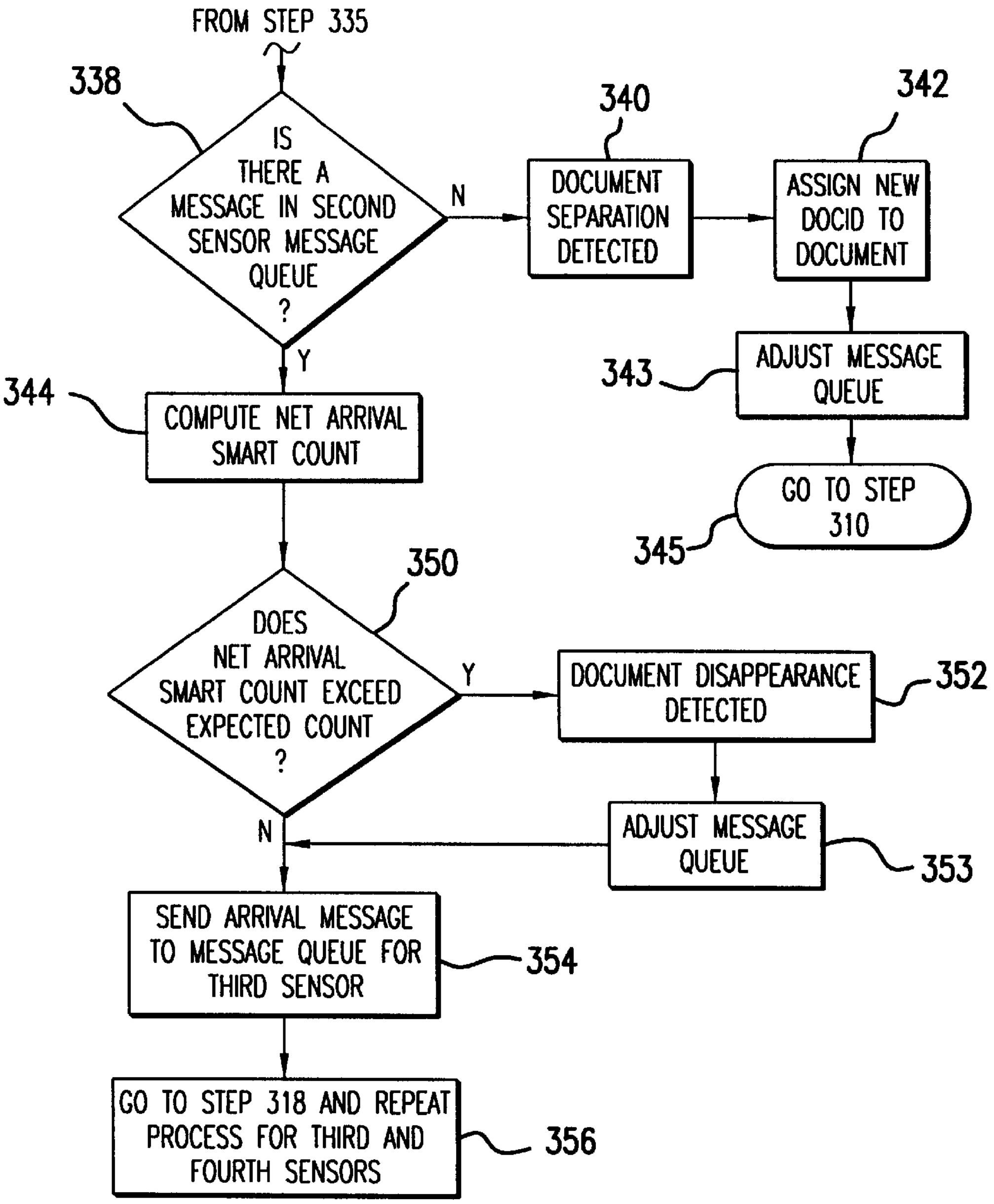
Figure 3C:
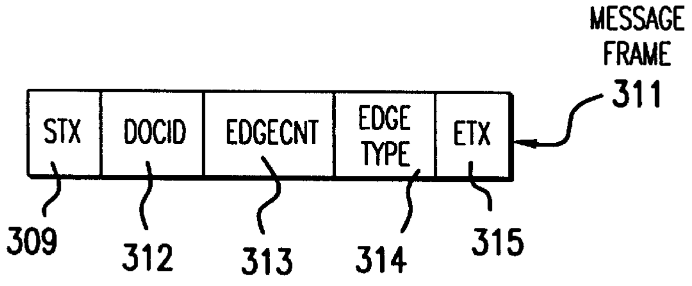
FIG. 3C is a diagram of the format of a message frame.

Reference to FIG. 3B, the arrival message frame 311 includes start text (STX) bits 309, document identification bits (DOCID) 312, edge shaft tick count EDGECNT 313, envelope edge type (leading edge versus trailing edge) 314, and end text (ETX) bits 315. This frame is stored in a message queue for the next sensor which is accessible by the OCR secondary master processor 200.

The sensor continues to be blocked by the document until the trailing edge passes the sensor. The OCR processor continues to scan the sensor 154 during this blockage interval, as illustrated by block 318, and a check 320 is performed to determine if the blockage time (in shaft encoder ticks) exceeds an allowable blockage time as set by the operator. If the sensor detects the same document for too long, a jam (i.e., object status) is detected as shown at step 322. The operator is notified and the transport path is stopped as illustrated in block 323. The path is cleared of the jam and the process continues at block 300.

When no jam is detected and the document proceeds down the transport path, the first sensor 154 detects the trailing edge of the document, and records the trailing edge shaft tick count in a trailing message frame step 324. The format of the arrival message frame and the trailing message frame generated at step 324 are identical. The content is different in that the trailing edge shaft tick count is used as the edge shaft tick count 313. At block 326, the leading edge shaft tick count is subtracted from the trailing edge shaft tick count to obtain the document length and the document length is compared to a stored minimum expected length. If the length is less than expected 326, a false detection is determined (step 328) indicating a possible malfunction of the sensor. Once the false detection is determined or if the document length is greater than the minimum length, the trailing message frame is sent to the message queue for the second sensor as illustrated by block 330.

As the document continues along the transport path the second OCR sensor 156 detects the leading edge of the document and records this leading edge shaft tick count (LEADCNT2) from the OCR shaft encoder 144 as indicated at block 335. The OCR secondary master processor 200 at step 338 (see FIG. 3B) checks if a message is available in the second sensor's message queue indicating that the document was detected by the first sensor. If no message exists, a document separation (i.e., object status) is detected, as shown at block 340, since the second sensor 156 detected a leading edge that was not detected by the first sensor 154. A DOCID is assigned to this separated document as illustrated by block 342 enabling the system to now track the document as though it entered the transport path properly and no flushing of the transport path is necessary. Proper tracking is facilitated by adjusting the message queue (rearranging messages in the message queue—to be discussed with reference to FIG. 4) as shown in block 343. Once the message queue for the second sensor is adjusted, the arrival message for the new document is sent to the message queue per the task of block 310 as indicated in block 345.

If a message exists at step 338, the OCR processor 200 retrieves the arrival frame from the message queue for the second sensor 156 and a net arrival shaft count is computed using LEADCNT1 and LEADCNT2 for the document as shown at block 344. The OCR processor 200 compares the computed net shaft tick count with an expected arrival shaft tick count at step 350. If it is determined that the net arrival shaft tick count exceeds the expected arrival count, a document disappearance (i.e., object status) is detected as illustrated at block 352. Once the processor detects the document disappearance, it removes from the queue the arrival message associated with the missing document as shown at block 353 so that the queue accurately reflects the messages associated with the next document on the transport path. The system is not shut down and the transport path is not flushed since the adjustment compensates for the missing document and the system continues to block 354. The expected shaft tick count is calculated based on the transport path speed, belt slippage tolerances and any other variables affecting the rate at which the document travels between sensors. Document arrival time is dependent upon the shaft tick count measured by the previous sensor.

If the net arrival shaft tick count is substantially equal to the expected arrival shaft tick count, no disappearance occurred. The recorded LEADCNT2 is sent via the arrival message frame to the message queue for the third sensor as illustrated by block 354. The process is then repeated starting as step 318 for the third and fourth sensors in the OCR station; the fourth sensor has its messages communicated to the message queue for the first sensor of the next surveillance module (here the secondary delay station 118). As with the first sensor at step 320, all sensors in the surveillance module are used to detect document jamming.

The second sensor also serves as a station activation sensor for the OCR station. The station activation sensor is the last sensor before the OCR reading window and provides information for the primary function of the station (i.e. the OCR function) that the document should arrive shortly. The OCR activates its set up procedures and prepares to read the approaching document. Each sensor in the OCR station is considered as a separate task handled by the OCR secondary master processor 200.

Figure 4A:
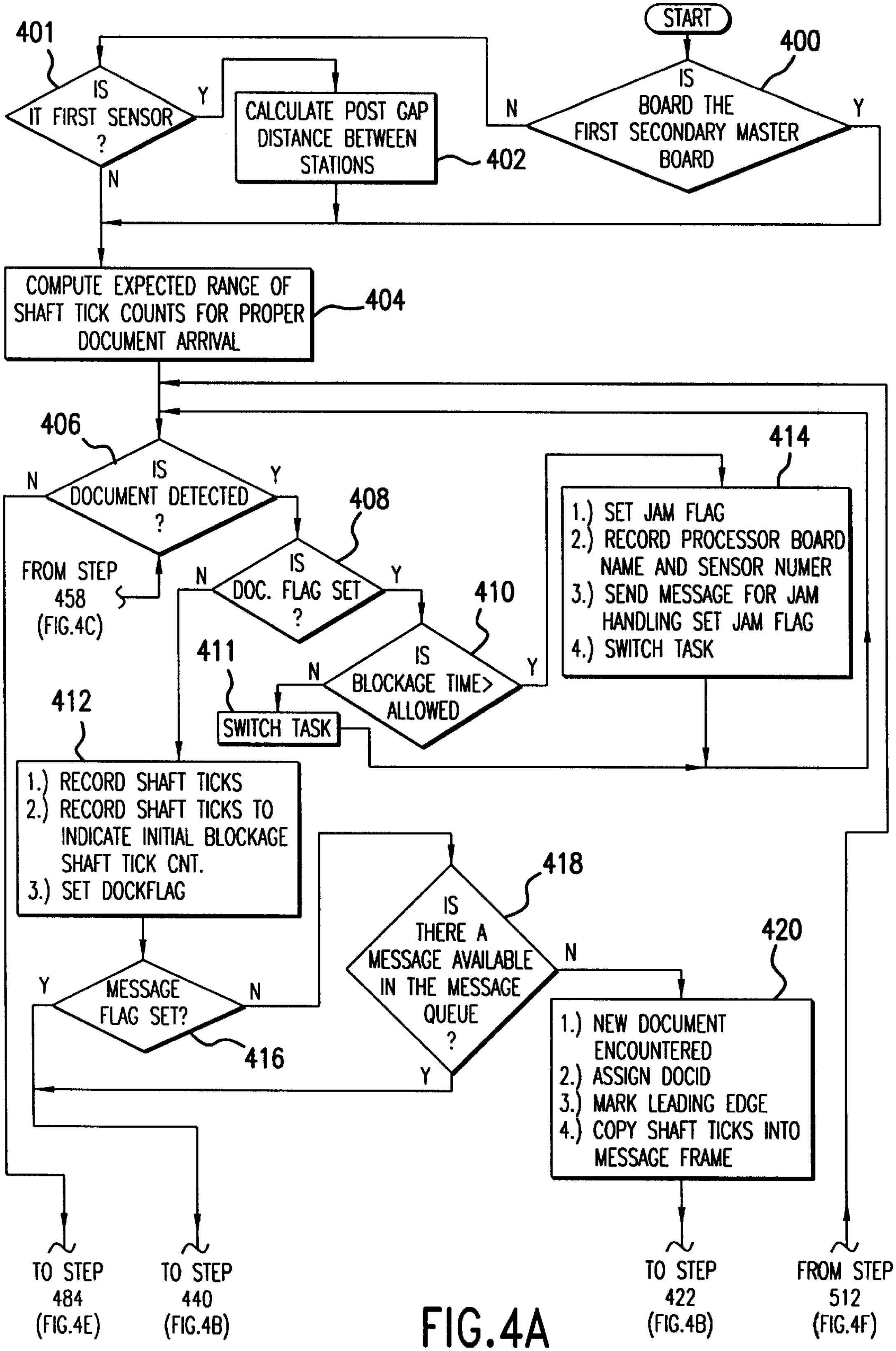
FIGS. 4A–4G show a more detailed flow chart depicting the document surveillance process of a sensor as generally illustrated in the process of FIGS. 3A and 3B.

FIGS. 4A–G illustrate the processing method employed by a station's secondary master processor for a single sensor of interest (pair of photocells) used in that processor's surveillance module. This process is, generally, the task performed for each sensor of each of the stations 200, 205, 210 and 215. As shown in FIG. 4A, after starting, the processor first determines whether it is assigned to the first station in the transport path (the Operator/OCR station) as illustrated by block 400. If it is not assigned to the first station, the processor, in step 401, determines whether the sensor of interest is the first sensor in the station. If it is the first sensor, the processor retrieves from a look up table, the path gap distance, represented in encoder shaft tick counts, between the previous station and the current station (step 402). The path gap distance is the distance between the last sensor from a previous module and the first sensor of the next module assuming that the transport path belts for each module are separate.

After the post gap distance is retrieved, the processor computes the expected range of shaft ticks that indicate proper arrival of the document from the previous sensor as illustrated by block 404. Similarly, if the processor is assigned to the first station, the processor then computes the expected range of shaft ticks that indicate proper arrival of the document from the previous sensor. These computations include determining: the exact number of shaft tick counts that are expected, the minimum number of allowable shaft tick counts, and the maximum number of allowable shaft tick counts. If the sensor is not the first sensor at block 401, the processor also computes the expected range of shaft ticks as illustrated by block 404.

Next, the processor checks to see if a document has been detected at step 406. When a document is detected, the document flag bit (DOCFLAG) is polled to determine whether it has already been set as illustrated by block 408. If DOCFLAG is set, indicating that the sensor is blocked, the processor computes at step 410 whether the blockage time (in shaft encoder tasks) of the document exceeds the allowable blockage time determined in step 404. If the blockage time is not greater than the allowable blockage time, the processor switches to a new task (i.e. the next sensor) at step 411 and begins the same process for the next sensor starting at step 406.

When the blockage time exceeds the allowable blockage time, a jam is detected as illustrated by block 414. Once a jam is detected, the processor board name and sensor number is recorded and sent to the data processing unit via the primary master processor 225. The processor sets the jam detection flag and switches to the next task (i.e. sensor).

If the DOCFLAG bit is not set (i.e. a leading edge has been detected), the processor reads the shaft encoder tick count and records this count in a look up table at step 412. At this time the same count (initial shaft tick count) is copied into another location for use in later calculating the net blockage time (step 412). To indicate that a document has just been detected, the DOCFLAG bit is also set as illustrated by block 412.

Once this information is recorded, the message flag (MSGFLAG) for the sensor is polled at step 416. If the MSGFLAG is set, thereby indicating that a separation has been detected (described later in the flow), a computation of the net arrival shaft ticks is made at step 440 of FIG. 4B. When the MSGFLAG bit is not set, the processor attempts to extract a message from the sensors message queue and determines if a message is available as illustrated by block 418. If there is a message available (arrival message from a prior task) a computation of the net arrival shaft ticks is made at step 440. When no message in the message queue is available, a new document has been encountered.

Once a new document is detected at block 418, the system assigns a unique document identifier (DOCID) at step 420. The DOCID is typically generated by incrementing the DOCID from the previous document that was detected, but any suitable identifier may be used such as the time at which the document was detected. The DOCID is assigned to each document by the first secondary master processor board 200 and stored in its memory. Subsequent access to the stored DOCID made by other secondary master processors is normally made to that same memory on the processor board 200. The DOCID serves to identify the document to each sensor and each surveillance module in the document surveillance system. The processor also marks the leading edge of the document by reading the shaft tick count of the shaft encoder recorded in the look-up table at step 412 and copying the shaft encoder tick count into the arrival message frame. This count represents the shaft tick count at the time the sensor detected the leading edge of the document.

Figure 4B:
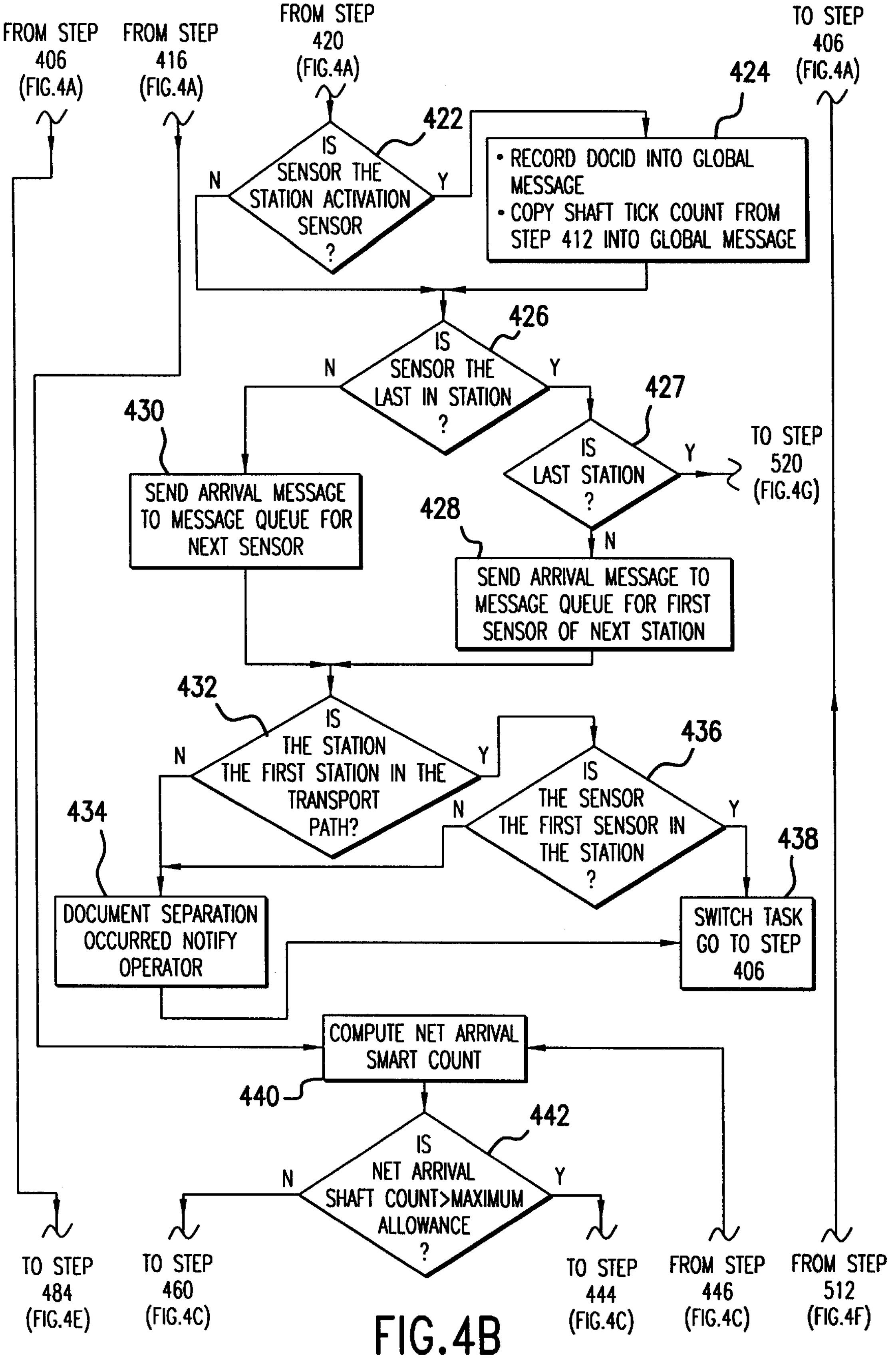
Figure 4C:
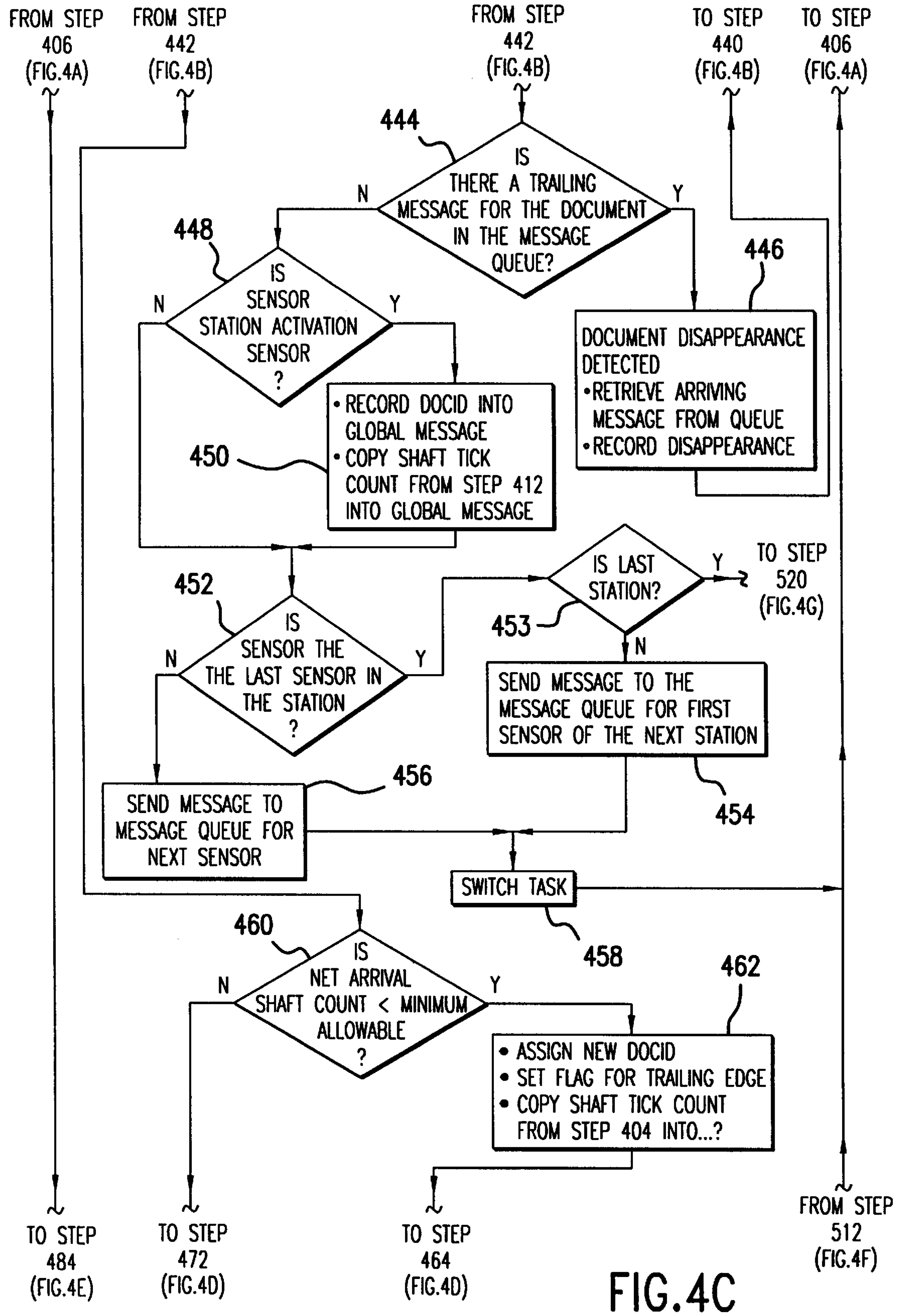

Referring now to FIG. 4B, the processor next determines whether the sensor of interest is the station activation sensor for that station as illustrated by block 422. If the sensor of interest is the station activation sensor, the processor records the DOCID from step 420 into a global message frame at step 424. The processor also copies into the global message frame the shaft tick count recorded in step 412 as illustrated by block 424. The global message frame is considered global because it is used by the functional device in the module and is not sent as a message frame to the message queue for the next sensor. For example, after the OCR station 116 creates the global message frame, the OCR uses this message to position its read window based upon the expected arrival time of that document. After the global message is generated, the processor then determines whether the sensor is the last sensor in the station at decision block 426. If the sensor of interest is not the station activation sensor 422 the processor directly proceeds to determine whether the sensor is the last sensor in the station at step 426.

When the sensor is the last sensor in the station and the station is not the last station at step 427, the processor sends the arrival message to the message queue for the first sensor of the next module as illustrated by block 428. The processor accesses the shaft tick count of the next module via the MULTIBUS. This count (LEADCNT) is communicated in the arrival message to the next module and serves as the initial shaft tick count used to determine the proper arrival time between modules. If the station is the last station, processing branches to step 520 of FIG. 4G. If the sensor is not the last sensor in the station, the processor in step 430 communicates the arrival message to the message queue for the next sensor. Once a document has been detected and the arrival message is communicated to the appropriate task, the processor determines whether the new document is one that has been separated from a previous document.

The processor control continues from step 428 or 430 to step 432 and determines whether the station is the first station in the transport path (i.e. OCR station) 432. If not, a new document was detected after the first station, and therefore a separation has occurred as indicated at block 434. The operator is notified but sorting continues uninterrupted since the document is still tracked and the arrival message (including the document's identifier) is communicated to the next sensor 430 and the global message corresponding to the separated document was generated at step 424. The processor then continues on to the next task by branching to block 406 as illustrated by block 438.

A separation is also detected and corrected when the document separates after the first sensor on the current station. If the processor determines that the sensor of interest is not the first sensor in the first station at step 436, a document separation is detected as illustrated by block 434. However, if the sensor is the first sensor in the first station to step 436, no separation is detected and the processor switches tasks to the next sensor at step 438.

Referring to the conditions of steps 416 and 418 of FIG. 4A after the processor determines that the message flag is set or that a message is available in the sensor's message queue, the processor next computes the net arrival shaft count at step 440. The processor then checks, at step 442, to determine whether the computed net arrival shaft count exceeds the maximum shaft tick count expected (determined in step 404 of FIG. 4A). If the net arrival shaft count does not exceed the maximum count expected, the processor then determines whether the net arrival count is less than the minimum shaft tick count expected (determined in step 404) as illustrated by block 460. However, when the net arrival shaft count does exceed the maximum count expected a test is performed (See FIG. 4C) to determine if a document disappearance occurred.

In the first step 444 of the test, the processor determines whether there is a trailing message in the message queue. If there was a trailing message for the document, a document disappearance is detected as illustrated by block 446. This results because the documents's leading and trailing edge was detected by the previous sensor yet the next sensor had not detected the document with in the expected time. Once the processor detects the document disappearance, the arrival message for that document is retrieved from the message queue to avoid mistaken identity with the next document traveling along the transport path and the disappearance is recorded as part of the real time error detection at step 446. After the document disappearance is recorded, the net arrival shaft count is computed at step 440 for the next document detected by the sensor of interest.

When no trailing message exists in the message queue at step 444, the processor determines whether the sensor is the station activation sensor at step 448. If the sensor is the station activation sensor, the global message is generated as illustrated by block 450 (as in step 424), wherein the processor records DOCID into the global message and also copies the shaft tick count from step 412 into the global message. Once the information is recorded for the global message, the processor determines whether the sensor is the last sensor in the station at step 452. However, if the sensor is not the station activation sensor, the processor does not record any information for the global message but directly determines whether the sensor is the last sensor in the station at step 452.

If the sensor is the last sensor in the station at step 452 and the station is not the last station at step 453, the processor sends a message to the message queue for the first sensor of the next station in step 454 (as in steps 426–428). When the sensor is not the last sensor in the station, the processor transfers the message to the message queue for the next task (sensor) in the station in step 456. Once the processor has sent the message to the appropriate message queue, the processor switches tasks as illustrated by block 458 and continues the process from step 406 of FIG. 4A for the next sensor in the module (station).

Referring to step 442, once the processor has determined that the net arrival shaft count is less than the maximum expected arrival shaft count, the processor determines whether the net arrival shaft count is less than the minimum expected shaft count (determined in step 404) at step 460. When the net arrival shaft count is not less than the minimum allowable shaft count, the document has reached the next sensor within the acceptable time interval and the processor then determines whether the sensor of interest is the station activation sensor as illustrated by block 472 of FIG. 4D.

However, if the net arrival shaft count is less than the minimum allowable shaft count, this indicates that a document separation occurred. Consequently, the processor assigns a new DOCID and copies the shaft tick count recorded in step 412 and the new DOCID into a new message at step 462. After the DOCID is assigned and the arrival shaft count has been generated, the processor determines whether the sensor is the last sensor in the station as illustrated by decision block 464.

As in steps 452–456, if the sensor of interest is the last sensor in the station and the station is not the last station at step 465, the processor sends a message to the message queue for the first sensor of the next station in step 466. When the sensor is not the last sensor in the station, the processor transfers the message to the message queue for the next task in the station in step 468. Once the processor has sent the message to the appropriate message queue, the processor informs the primary master processor that a document separation occurred as illustrated by block 470. The message flag is set indicating a document separation and the processor continues the process for the next sensor branching back to step 406.

Figure 4D:
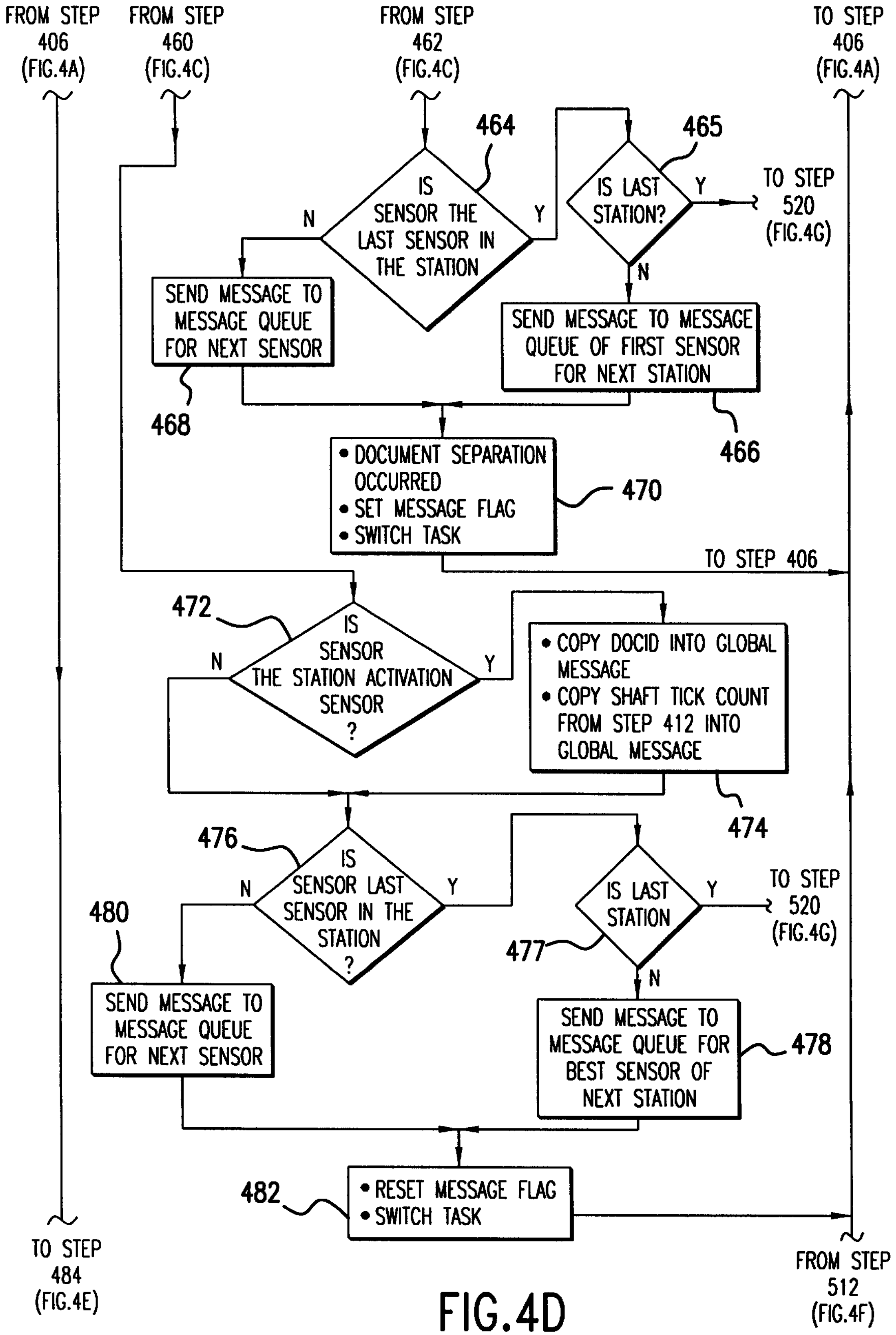

As stated previously with respect to step 460, when the net arrival shaft count is within the acceptable range, the processor determines whether the sensor is the station activation sensor in step 472 of FIG. 4D. If the sensor is the station activation sensor, the contents of the global message are generated, as in previous step 450, which includes copying DOCID and the arrival shaft tick count (from step 412) into the global message as illustrated by block 474. After the global message is constructed, the processor determines whether the sensor is the last sensor in the station at step 476. However, if the sensor is not the station activation sensor at step 472, the processor proceeds directly to step 476 to determine whether the sensor is the last sensor in the station (as in steps 464–468). When the sensor of interest is the last sensor in the station and the station is not the last station at step 477, the processor sends a message to the message queue for the first sensor of the next station in step 478. If the station is the last station at step 477, processing branches to step 520 of FIG. 4G. When the sensor is not the last sensor in the station, the arrival message is sent to the message queue for the next task in step 480. After the message has been communicated to the appropriate message queue, the message flag is reset and the processor continues to the next task by branching to block 406 as illustrated by block 482.

Some steps in the leading edge document process, as described in steps 406–482, are completed in conjunction with the trailing edge process as described hereafter. The spacing of the sensors varies from module to module, but typically the spacing between sensors is less than the length of the documents such that the leading edge of a document typically passes a first sensor while the next sensor detects that same document's leading edge before the trailing edge is detected by the first sensor. The inventive surveillance process is not dependent upon the sensor spacing as the multi-tasking process provides real time document surveillance.

Figure 4E:
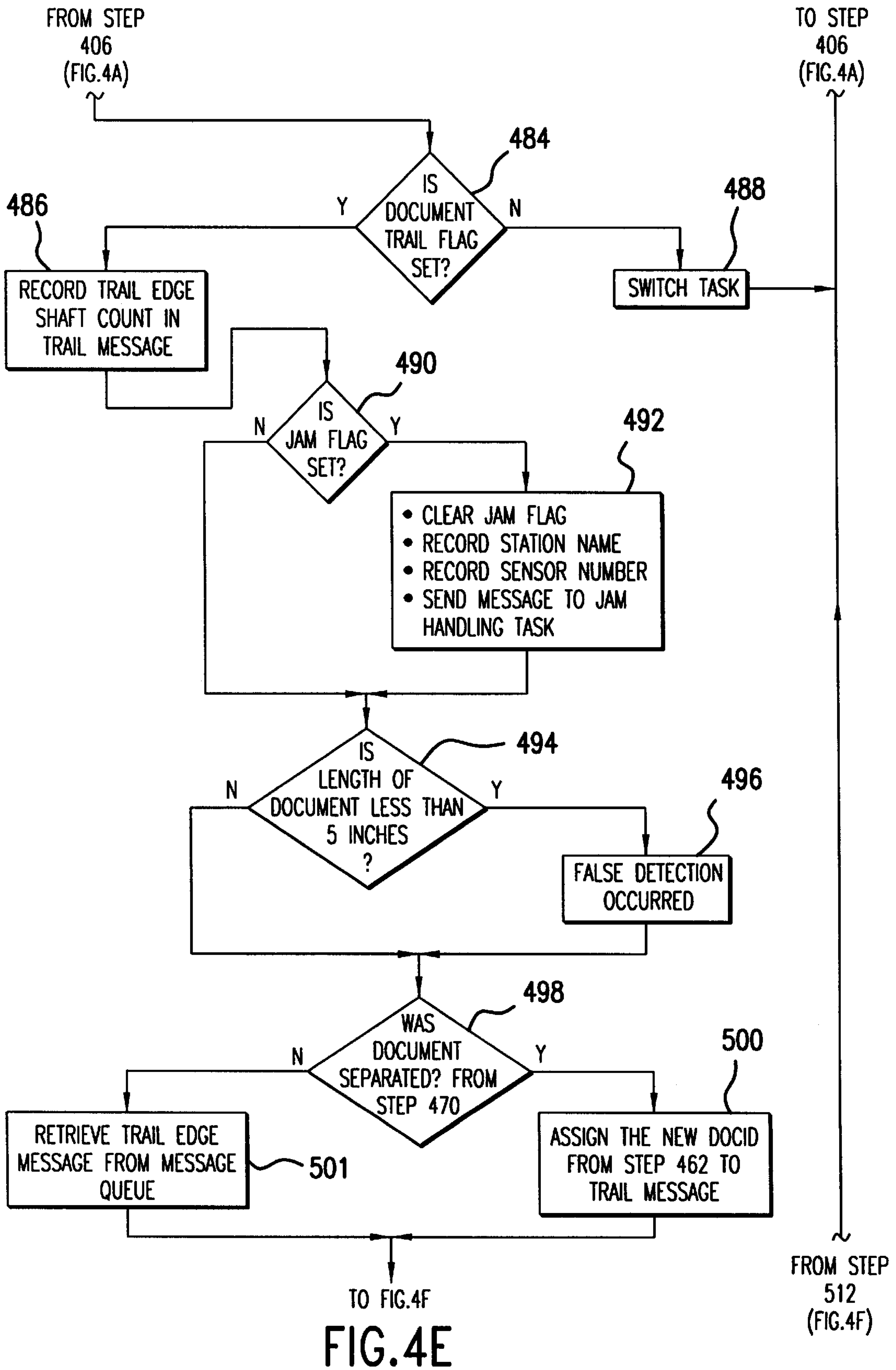

The trailing edge process is described generally in steps 484–498 of FIG. 4E. If the processor determines that the sensor has not detected a document at step 406 of FIG. 4A, the processor checks to see whether the document detection flag is set as illustrated by block 484. If it is set, this indicates that the sensor has previously detected the documents but since the sensor is no longer detecting a document (as determined at step 406), the trailing edge has passed the sensor. The processor then reads the shaft tick count from the shaft encoder and records this count in a trailing edge look up table in step 486. If, the document flag is not yet set, the processor switches to its next task as indicated by block 488 because a leading edge has not yet been detected by the sensor. Once the trailing shaft tick count is recorded at step 486, the processor determines whether the jam flag has been set from step 414 as illustrated by block 490. If the jam flag is set, the processor determines that the trailing edge of the jammed document has passed the sensor and the jam flag is cleared as illustrated by block 492. In addition to clearing the jam flag, the processor records the station name and the sensor number and sends this information in a message to the primary master processor in step 492. Jams are detected by leading edge information. Document length measurements result from both leading edge and trailing edge information.

After the message is sent to the primary master processor, the processor determines the length of the document at step 494 by subtracting the shaft tick count in the arrival message from the shaft tick count in the trailing message. The processor determines whether the document length is less than the minimum allowable document length set by the operator. If the jam flag is not set, the processor determines whether the length of the document is less than five inches. This length may be any suitable length as determined by the operator.

When the document length is less than five inches, a false document detection has occurred as indicated by block 496. This may occur if the sensor fails and intermittently or permanently indicates an output corresponding to a document detection when in fact no document passed the sensor. The processor assumes that no false detection occurred and determines whether the document is a separated document at step 498 (as determined in steps 460–470). This assumption allows the processor to keep the message queue for the next sensor stacked with the proper pair of arrival messages and trailing messages. If the document length is not less than five inches the processor still verifies whether the document was separated at step 498.

When the processor determines that the document was separated at step 498, the processor copies the new DOCID assigned in step 462 to the trailing message as illustrated by block 500. The processor then determines whether the sensor of interest is the station activation sensor at step 502 of FIG. 4F. If a document separation was not detected at step 498, the processor retrieves the trail message from the message queue 501. The processor then determines whether the sensor is the station activation sensor at step 502 of FIG. 4F.

Figure 4F:
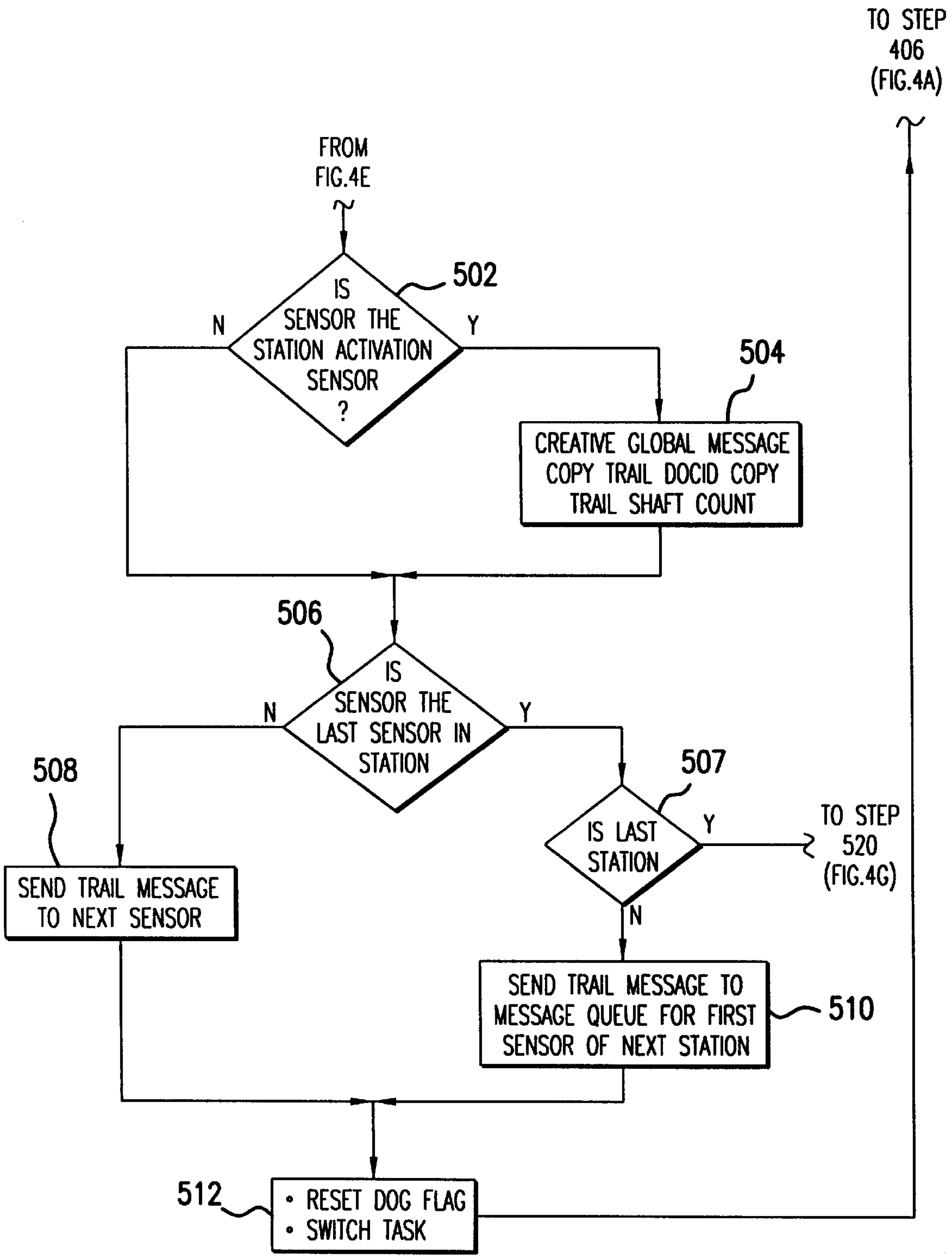

Referring to FIG. 4F, if the sensor is the station activation sensor at step 502, the global trail message is generated at step 504. Both the DOCID and the trail edge shaft tick count are copied into the global message at step 504, for use by the activity function (i.e. OCR or BCR) associated with the station. The processor then determines whether the sensor is the last sensor in the station as illustrated by block 506. However, if the sensor is not the station activation sensor, the processor proceeds directly to step 506 and determines whether the sensor is the last sensor in the station.

When the sensor is not the last sensor in the station, the processor sends the trail message to the message queue for the next sensor in the station as illustrated by block 508. When the sensor is the last sensor in the station and the station is not the last station at step 507, the processor sends the trailing message to the message queue for the first sensor of the next station via the common multi-bus between the current secondary master processor and the next station's secondary master processor as illustrated by block 510. Once the trailing message is communicated to the proper message queue, the processor resets the DOCFLAG and switches to its next task as illustrated by block 512 by returning to step 406.

Figure 4G:
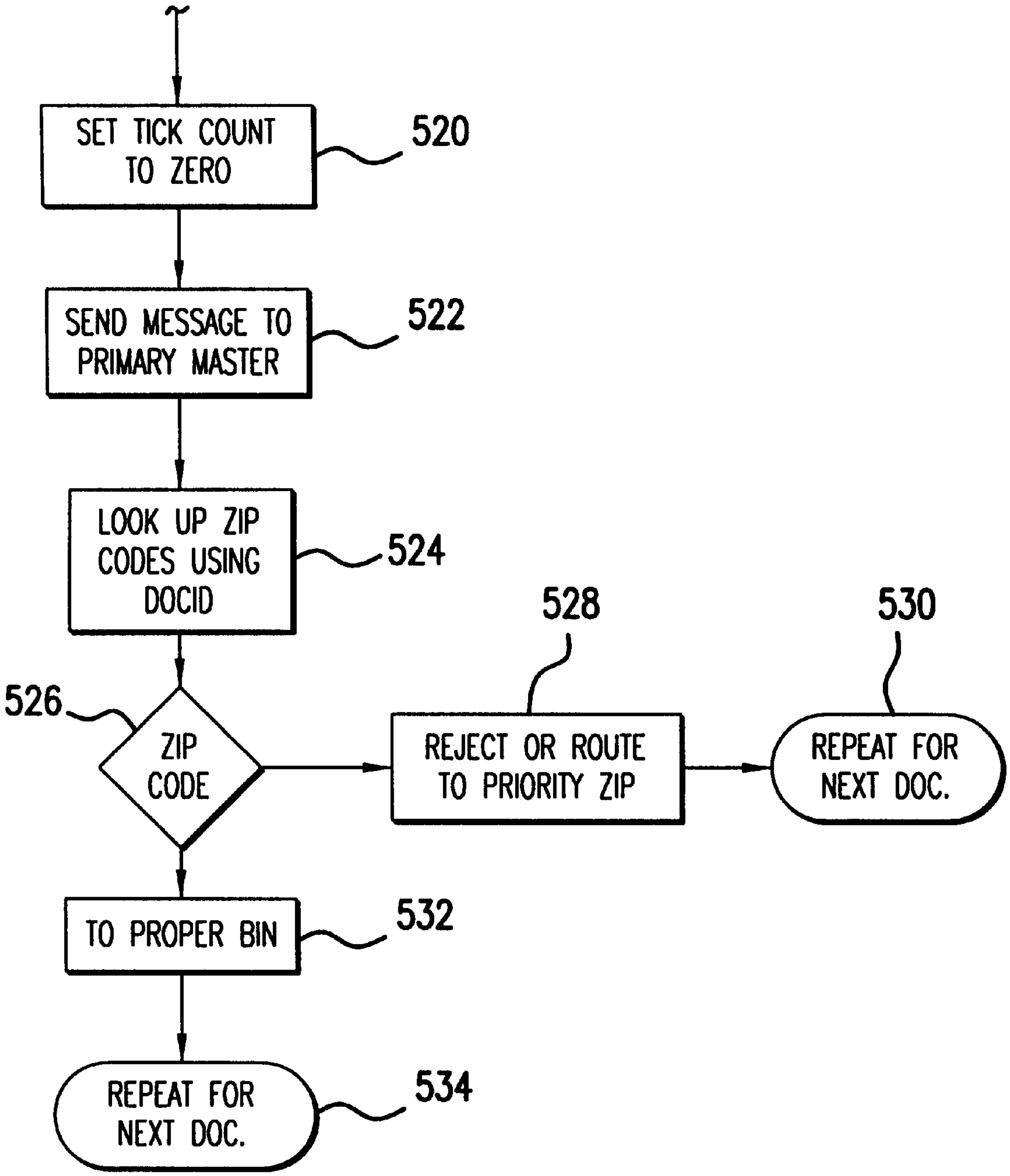

In the event that the sensor is the last sensor in the last station (module) at steps 427, 453, 465, 477 or 507, the processing control branches to step 520 of FIG. 4G where the shaft encoder tick count is set to zero in the message frame. The message frame is then sent to the primary master processor board 225 as illustrated at block 522, and the DOCID from that message, which identifies the document, is used to look up the zip code for that document (step 524). During the processing of the document in the illustrated embodiment, the address on the document is read by the OCR and the zip code is obtained (e.g., by reading it off the document or by obtaining the zip code based upon the address via the computer 134 from an address/zip code data base) and put into a table in the primary master processor memory with its associated DOCID. In addition, at the BCR station, the zip code is read again after having been written in bar code onto the document by the Ink Jet printer and is put into another table with the associated DOCID. When the master processor receives the message with the DOCID from the last station, both zip code tables are accessed using the DOCID and the two zip codes are compared as illustrated by block 526, to determine if they are the same. If they are the same, the document is routed to the proper bin for that zip code at step 532. If they are not the same, the document is rejected, or alternatively may be routed to the bin of the zip code of a preselected one of the two zip code tables at step 528. For example, if the OCR table is designated as the priority table, then the document would be routed to the zip code of the OCR zip code table if the zip codes don't match. The process is then repeated for the next document as illustrated by blocks 530 and 534.

From the foregoing description, it is apparent that each sensor is used as a jam detection and document separation detector. The system continues to operate and track separated documents and does not flush the transport path when a separation occurs. In addition, the adjustment of the message queue provides for proper identification of the document as it travels along the transport path according to jam and separation events.

Figure 5A:
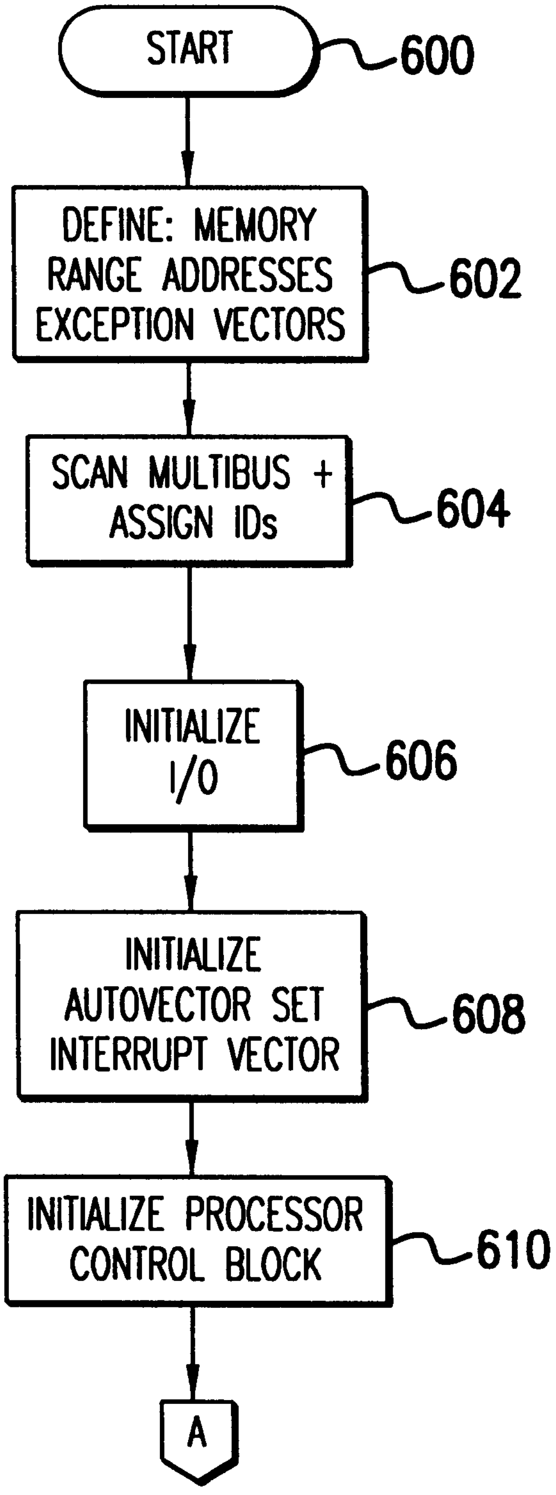
FIGS. 5A and 5B are detailed flow charts illustrating the methodology and logical flow of a specific embodiment of a multi-tasking operating system in accordance with the invention.
Figure 5B:
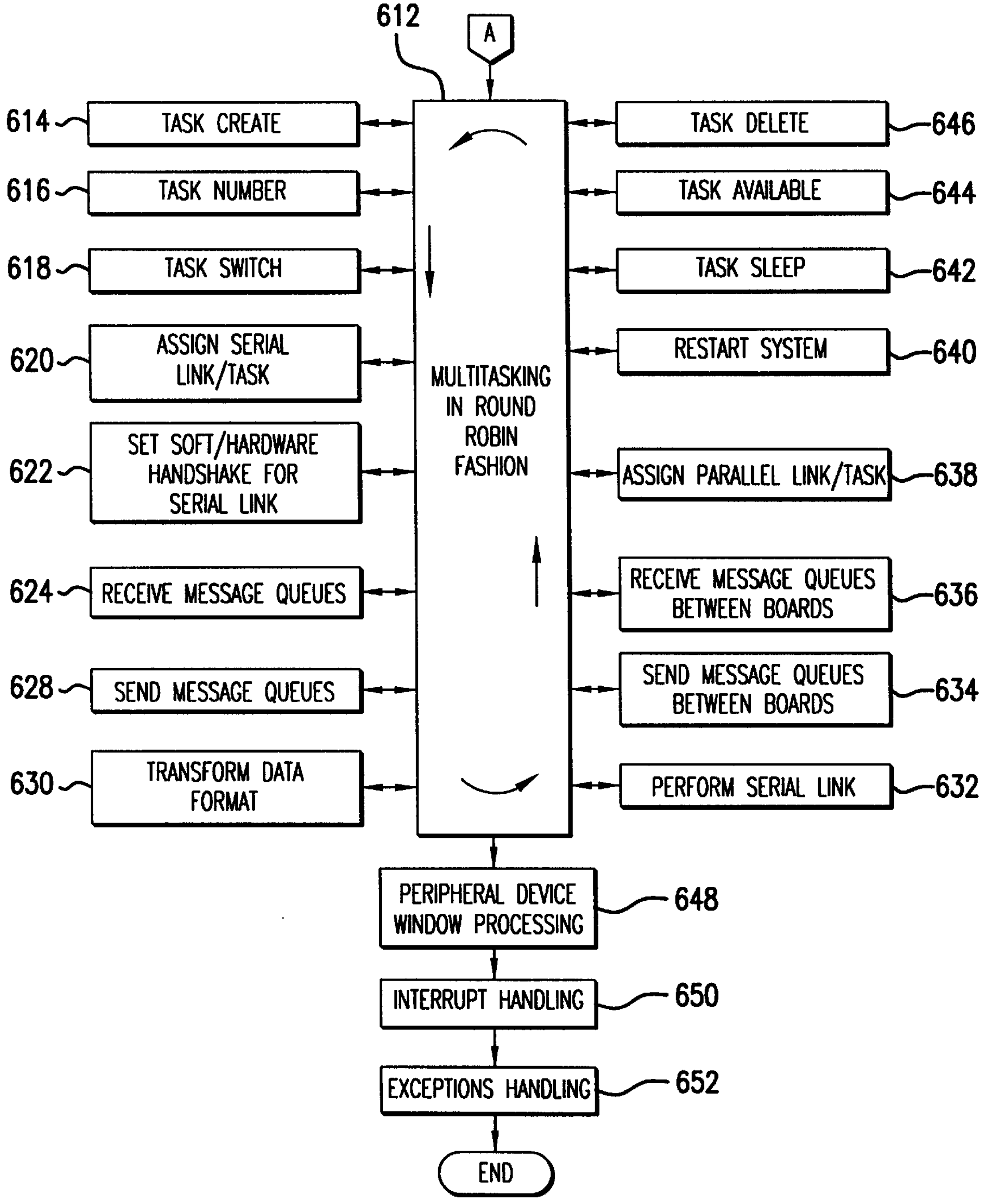

In the illustrated embodiment, the process of FIGS. 3A, 3B and 4A–F is run as a task for each sensor. Thus, each secondary master processor, as well as the primary master processor, is operating in a multi-tasking mode with multiple tasks running simultaneously under a multi-tasking operating system. The multi-tasking operating system creates and deletes tasks, as well as input and output for the tasks, and transmits, receives and stores the data. This multi-tasking operating system permits faster tracking of documents and faster processing of data. FIGS. 5A and 5B show a detailed flow chart illustrating the methodology and logical flow of a specific embodiment of a multi-tasking operating system to be loaded and run on the primary master processor 225 and each of the secondary multi-processors in accordance with the invention. An implementation of the operating system kernel (in 6K of memory) is shown in hexadecimal format in Appendix II.

Referring to FIG. 5A, the operating system is started at block 600, as shown, and blocks 602–610 illustrate various initializing functions. Hardware-related definitions are made, as illustrated by block 602, including definition of memory range and availability, definition of addresses related to serial and parallel parts and definition of exception vectors. The existing hardware in the Multibus cage is then scanned and an ID assigned to each processor (step 604) followed by initialization of the Input/Output (I/O) devices including the I/O serial controllers, the I/O parallel controllers and the I/O timer controllers as illustrated by block 606. An autovector table is then initialized and interrupt vectors set in step 608 after which the processor control block is initialized assigning I/O capability per task and assigning message queues and key ID capability per task in step 610.

Once initialization is complete, the processing of multiple tasks proceeds as illustrated by block 612 of FIG. 5B. Multi-tasking performed with Round-Robin process as shown in a counterclockwise order in FIG. 5B. Task creation, task number assignment, task switching and assignment of a serial link to a task are performed as shown by blocks 614, 616, 618 and 620, respectively, and the software and hardware handshaking for serial links is set in step 622. Receiving message queues between tasks (Step 624) and sending of message queues between tasks (Step 628) may then be performed after which transformation of parallel received data to the required format is performed as illustrated by block 630. Next, the serial link to the host computer (e.g., IBM PC) may be performed as illustrated by block 632, and the sending and receiving of message queues between processor boards may be performed as indicated by blocks 634 and 636. A parallel link to a task may be assigned as illustrated by block 638, and all existing tasks may be terminated and the system restarted, as indicated by block 640. A task may also be suspended (put to "sleep"), made available or deleted, as illustrated by blocks 642, 644 and 646.

The operating system may also read and process window information for peripheral devices such as the optical character reader, the bar code reader and the Ink Jet printer, as illustrated by block 648. Subsequently, interrupts may be served directly by the operating system for all interrupts, including the shaft encoder interrupt, serial receive/transmit interrupt, parallel receive transmit interrupts, bus interrupt and time clock interrupt. Subsequently, processor exceptions processing occurs at step 652.

The operating system is user switchable for tasks to permit a task to initiate the switch to another task. In addition, interrupt handling is incorporated into the operating system to increase task switching speed (e.g., as illustrated embodiment, task to task switching can be performed in 27 microseconds) so that when an event causes an interrupt, the interrupt handling routine at step 650 functions without the processing overhead needed to call or separate interrupt handling routines. Thus, the interrupt drivers are incorporated as part of the operating system kernel instead of separate interrupt handling routines as in the prior art. As a result, a shaft encode pulse interrupt can be handled every 200 microseconds in the illustrated embodiment. The operating system also increases speed by eliminating other overhead intensive functions such as memory management and DMA control.

Appendix I is a hexadecimal object code listing of an optical sensor task program (see FIGS. 3A–C and 4A–F) for practice of the invention in the illustrated embodiment wherein the secondary master processor boards are Model M68K10-5 processor boards each using a Motorola 68000 processor. Appendix II is a hexadecimal object code listing of the multi-tasking operating system (see FIGS. 5A–B) for practice of the invention in the illustrated embodiment using the Model M680K10-5 processor boards. These listings contain material which is subject to copyright protection. The copyright owner has no objection to the facsimile reproduction by anyone of the patent document or the patent disclosure as it appears in the Patent and Trademark office patent file, but otherwise reserves all copyright rights whatsoever.

Although the illustrated embodiment is directed toward document surveillance, the invention is equally suited for surveillance of any object having a beginning and ending point such as packages, fruits etc.

Specific embodiments of novel methods and apparatus for automated surveillance and sorting of objects has been described for the purposes of illustrating the manner in which the invention may be used and made. It should be understood that the implementation of other variations and modifications of the invention in its various aspects will be apparent to those skilled in art, and that the invention is not limited by the specific embodiments described. It is therefore contemplated to cover by the present invention any and all modifications, variations, or equivalents that fall within true spirit and scope of the basic underlying principles disclosed and claimed herein.

APPENDIX I

Code of Optical Sensor Task

Mar-16-99 02:06pm From-MILLEN, WH , ZELANO & BRANIGAN 7032436410 T-713 P.03 F-776

Intelligent Tracking Application Hex Dump

```
S224FC0000000010C6200FC01041239000010 10B23C0054660822790000100C4ED161000C66AB
S224FC00206 1000AB043F900FC17C961000678303900001022 80FC000A61000658484061 00E4
S224FC0040065243F900FC17E8610006 5A2279000010246100065042074 5F90000102847F9CA
S224FC00600000103E49F90000105E43F900FC17EF61000622181967 0A101A6100060E530412
S224FC008066F6143C0008103C002061000622530266F8103C004461000616100761 0005F485
S224FC00A0103C00296100060810 3C00206100060020 1B61000 5C8143C0008103C00206100FA
S224FC00C005EE530266F8103C0041610005E21007610005C0103C002961 0005D4103C00204C
S224FC00E06100 05CC201C61000594103C000D6100 05BE103C000A610005B65207BE3C00084D
S224FC01006600FF6E4FF900010C6246FC2700223C0007EFFF227C000010001 2FC0000538108
S224FC012066F861000B6061000 9AA41F900FD01061 0BC009A303CFFFF534066FC43F900FC45
S224FC014016FB6100056020 3C0000FFFF538066FC13FC00FF00001013 13FC0054000 0101084
S224FC016042390000101142790000102242B90000100043B9000010 1C42390000102123FCF8
S224FC018000FC0198000 0100C43F90017FFF012BC00FF4EF900FC01A813FC000100001020 72
S224FC01A013FC005400001021 08B9000100001 01308F90001000010 1123FC00FC01D20000B4
S224FC01C0100C43F90027FFF012BC00FF4EF900FC01EE1239000010 21B23C005467 2013FC5D
S224FC01E00002000010201 3FC0054000010 21088900020000101308F90002000010 1123FC0F
S224FC020000FC021800001 00C43F90037FFF012BC00FF4EF900FC023412390000102 1B23C99
S224FC02200054672013FC0003000010 2013FC0054000010 2108B9000300001013 08F900032 1
S224FC024000001011 23FC00FC025E0000100C43F90047FFF012BC00FF4EF900FC027A12399C
S224FC0260000010 21B23C0054672013FC000400001020 13FC00540000102108B90004 0000E7
S224FC028010 1308F900040000101123FC00FC02A40000100C43F90057FFF012BC00FF4EF9A1
S224FC02A000FC02C01239000010 21B23C005467 2013FC00050000102013FC0054000010 2162
S224FC02C008B90005000010130 8F900050000101142814 5F90001 0C66123C0014157900 00A9
S224FC02E010200004157900001 0110005D5FC00000 80057C9FFE84279000010 2213FC000039
S224FC030000FD08001 3FC00000000101061 0007C4610008726100088061000936 43F900FCE0
S224FC032017BC6100038013F90000101300FD08006110 42572F3C00FC18B861 0000 90616CD2
S224FC03404E4E223C0000F00043F90000107E4219538166FA43F90000107E45F90001AC663E
S224FC036042B900001004123C0014257C00FC03AA000C234A0016234A0012D3FC00000C00D8
S224FC038057C9FFF0428143F900010C66123C0014422900063 2BC07F7337C07F70002D3FC9E
S224FC03A00000008005 7C9FFEA4E754E4D48E7FFFE23CF000010082279000010042 3C90000FC
S224FC03C010002E514CDF78F84E754E4F322F0008B27C0014650470024E75340 1C2FC0C004A
S224FC03E0068100001 07E22414A290011670470014E75137C000100111342001045E90BFC26
S224FC0400253C00FC03CA252F000448E21F1E228A20390000100466 0A200923490004234964
S224FC0420000823C900001004204023480008246800042 34A00042149000425490008428039
S224FC04404E7532 2F0004B27C0014650470024E75C2FC0C00068100001 07E22414280102956
S224FC046000114E752079000010002068001 6206800084280101 04E752079000010002068FA
S224FC04800012206800084280 10104E7522790000100043801029001 04E75322F0004B27C08
S224FC04A0001465047002 4E75C2FC0C00068100001 07E28414A2C0011660470034E7542 2CAC
S224FC04C000112 26C0004246C000825490004234A000823C900001004B9C96612428900000 4
S224FC04E010042E790000100 84CDF78F84E75B9F9000010006 60C23C9000010002E514CDFF0
S224FC050078F842804E7543F90000108F42804A116710D3FC00000C00528 0B07C0014 65EE36
S224FC052070FF4E7548E71F1E2279000010002 28F2269000423C9000010002E514CDF78F81B
S224FC05404E7522790000100022 2F0004D2B900001 01464027 2FF2341000C61C82239 0000 5D
S224FC0560101422790000100 0B2A9000C65EC4E7522790000100023 6F00040012 4E7522797F
S224FC0580000010002 36F0004001 64E75322F0004226F0006342F000AB27C0001661 24A423F
S224FC05A0670A08D10000089100 016034089100 00B27C0002662A4A4267160 8D10003089 1EB
S224FC05C0000222690008 12BC00031 2BC00E1601000891000322690008 12BC00031 2BC00C106
S224FC05E042804E75382F0008286F0004B87C000864060 9D410044E7570FF4E75382F000870
S224FC0600286F0004B87C00086406099410044E7570FF4E75206F00044280 10104E75302F5B
S224FC0620000 8206F00041080 4E752079000010002268001 62269000C4ED12068001 6226 8A4
S224FC0640000808110002660C6100FEDA207900001 00060E608100001 66181 36F0005FFFCC3
S224FC06600C2F000A000566081F7C000D000560D24E756100FEB0103C00134E75143C00049A
S224FC0680E1986106530266F84E751200E81861021001020000 0F0600003 00C00003A650E7D
S224FC06A05E00600A10196704610460F84E75083900020 0FD000667F6B03C000A6608323CE8
S224FC06C08000534166FC13C000FD00024E756100FE54207900001 000222F0004D2B90000D2
S224FC06E010146402 72FF2141000C0CA80001AC76001266124A790001B8B6671C42790001BE
S224FC0700B8B670FE60624A790001B8BA670A42790001B8BA70FE6050206800123228000251
S224FC0720B2680004661A6100FDFC207900001 00022390000101 4B2A8000C65DC70FF6028FA
S224FC07404280103010105368000264063168000600020 81000026710089000002117C0005F1
S224FC07600000811 7C00EA000A4E754E4E322F0004302F0006206F0008342F000C48E71E1C59
S224FC078036003802264 8B27C0006650870FA4CDF38784E75B67C0014650870FB4CDF3878D8
S224FC07A04E75C6FC080006830001 0C662843032C0003660870F94CDF38784E75B22C0004B9
S224FC07C0670E42A0D0BC00100000530166F6D680C78C4EF900FC0808302F0004206F0006A1
```

Mar-16-99 02:07pm From-MILLEN, Wh ZELAND & BRANIGAN 7032436410 T-713 P.04/38 F-776

S224FC07E0342F000A48E71E1C410038022648B67C0014650870FB4C32BA7B4E75C6FC0800BE
S224FC0800068300010C66C7BC4A2C00066702260F8197C006200063A143C2C0002428272025E
S224FC0820200041400E182E0801400200282BC7C07F766047C006002524 6BC4567341980600BD3
S224FC0840E080534166E6BC7C07F766047C00600252 46BC45671A199B6008534466E839463F
S224FC08600002197C000000006700004CDF3A784E7570FE197C000000064CDF3B784E75322FC4
S224FC0880000422 6F0006342F000A48E71800B27C0014650870FB4CDF00184E75C2FC08002E
S224FC08A00068100010C66C3884A28000667026 0F8117C006300063010322800024283780 2E9
S224FC08C0B2406752B07C07F766047000600252 40E18316300008530466E6B443640E70FC4A
S224FC08E0117C000000064CDF00184E75B2406726B07C07F7660470006002524012F00008DD
S224FC09005244534366E630802004117C00000000 64CDF00184E7570FD117C000000064CDFC6
S224FC092000184E75302F00040C400000660E41F900FC12FA23C80001B88C4E750C40000136
S224FC0940660E41F900FC12E223C80001B88C4E750C40000 2660C41F900FC12F423C800011D
S224FC0960B88C4E75222F0004302F000841F90001B4764A406750007C0700B2B90000101CF3
S224FC09806E0452816 0F40281000001FF08300000100067081 1BC000710006006 11BC000369
S224FC09A0100046FC2000534067165241028100000 1FF11BC00011000534067045241 60ECE3
S224FC09C008F0000210004E75222F0004302F0008007C0700B2B90000101C6E0452816 0F4DA
S224FC09E00281000001FF41F90001B47611801000 46FC20004E75206F0004302F0008222FFD
S224FC0A00000A43F90001B68C4A40673640C2007C0700B2B90000101C6E04528160F40281ED
S224FC0A2000001FF139810005241534046C24A4067100281000001FF1398100052415340 67
S224FC0A4060EC4E756100FADE41F90001B68C323900 01B688B279000 1B68A671A4280103027
S224FC0A6010005241B27C02006604323C000033C10001B6884E7570FD4E75302F00040C0035
S224FC0A80000660A21FC00FC0D52007860380C000001660A21FC00FC0D6E007860280C0040
S224FC0AA0000 3660A21FC00FC0E2C007860180C00000 3660A21FC00FC0E80007860082 1FC5D
S224FC0AC000FC0EE800784E7518044403C105EA011D00227C0001AC76303C03E733400006 27
S224FC0AE0334000023340000 4237C00FD0004000B237C00FC063A000C12BC0000227C00010D
S224FC0B00B076303C03E7334000063340000 2334000 04237C00FD00060008237C00FC063A6E
S224FC0B20000C12BC00043F900FD000445F900FD00064A114A1247F900FC0AC8223C000039
S224FC0B400008149312 9B51C9FFFA43F90001B89045F90001B8A272114231100042321000 7D
S224FC0B6051C9FFF6427900 01B8B44279000 1B8B64279000 1B8B84279000 1B8BA4279000 1FD
S224FC0B80B8BC4E7513FC00B000FD010613FC000900FD01064E750C3900010000102066 2A75
S224FC0BA013FC008B00FD030613FC00FF00FD030013FC008900FD040613FC00FF00FD0400D8
S224FC0BC013FC00FF00FD04024E754279000 1B688427900 01B68A4279000 1B67642B9000166
S224FC0BE0B67842B90001B67C23FC00FC12FA0001B88C303C02004 1F90001B68C53406B083B
S224FC0C0011BC00000000 60F441F90001B476303C020053406B0811BC00000000 60F413FCA9
S224FC0C20008B00FD030613FC00FF00FD030013FC00B000FD040613FC000900FD040613FC20
S224FC0C40004000FD040213FC008B00FD05064E7541F900FD02061 0BC007041F900FD020235
S224FC0C60303C004E1080E048108042B90000101442B90000101813FC00C70000101246FCF5
S224FC0C8030004E7541F800020FC00010C6220FC00FC000843F900FC0CD22019 2219670C8F
S224FC0CA05381 20C0548051C9FFFA60EE4298429821FC00FC0D52007A21FC00FC0F3C0074CE
S224FC0CC021FC00FC1274007021FC00FC13FC00684E7500FC13660000000100FC137A0000B3
S224FC0CE0000100FC138E0000000100FC13A20000000100FC13B60000000100FC13CA000003
S224FC0D0000000100FC13DE0000000100FC13F20000000100FC14060000000100FC141A0000A0
S224FC0D20000100FC142E0000000C00FC14640000000100FC147A0000000600FC1486 0000CC
S224FC0D40000100FC149C00000010000000000000000003F0052B90000101C103900FD050024
S224FC0D6000879000700001 0134CDF00014E7348E7C080103900FD050052B90000101C203990
S224FC0D80000101C028000001FF41F90001B47612300004230000008010002672842793 6
S224FC0DA00001B67641F90001B68C30390001B68A11BC0003000052 40B07C0200660242 4064
S224FC0DC033C00001B68A08010001672A41F90001B68C30390001B68A11BC00020000524 0BB
S224FC0DE0B07C020066024240 33C00001B68A33FC00010001B67608010000 67120BF90000C6
S224FC0E0000FD040208B9000100FD040260100 8B9000000FD04020BF9000100FD040208794F
S224FC0E20000700001 0134CDF01034E7348E7C080103900FD050052B90000101C203900004D
S224FC0E40101C028000001FF41F90001B47612300004230000008010000670802 3900BF5B
S224FC0E6000FD040208010001670800 39004000FD04020879000700001 0134CDF01034E73DE
S224FC0E8048E7C080103900FD050052B90000101C20390000101C028000001FF41F900011E
S224FC0EA0B68C12300000020100206 60A08B9000500FD0300600808F9000500FD030012 30A4
S224FC0EC0000002010040 4601C33900FD030046 01833900FD030042300000087900070000 8E
S224FC0EE010134CDF01034E7348E7C080103900FD050052B90000101C20390000101C0280E6
S224FC0F000000 01FF41F90001B476123000004230000008010000670800390040 00FD0402C3
S224FC0F2008010001670802 3900BF00FD04020879000700001 0134CDF01034E7348E7E0C0D0
S224FC0F40207C00FD0006701C428110BC0002121 0B23C001F6612527900 01B8BC117C003828
S224FC0F60FFFE4CDF03074E73C001068000FC0F76C18922514ED100FC110E00FC111E00FC97
S224FC0F80120200FC11BA00FC0F9600FC0FA800FC109800FC104A117C0028FFFE117C0038B0
S224FC0FA0FFFE4CDF03074E7352790001B89A1028FFFE117C0010FFFE122AFFFEB1010800 5F
S224FC0FC00007661 44A790001B8B4672A4279000 1B8B4122AFFFA601E52790001B896527910
S224FC0FE00001B89833FC00010001B8B433FC00010001B8B6604808010003671208000003 2B
S224FC1000660C5279000 1B89052790001B89808010004671208000004670C52790001B89410

S224FC102052790001B898080000056712080000056 70C52790001B91052790001B898117CCD
S224FC10400038FFFE4CDF03074E7352790001B8A0117C0001FFFE1028FFFE08000005670EFE
S224FC106033FC00010001B8B652790001B89C08000006670E33FC00010001B8B652790001C2
S224FC1080B89E4A28FFFA117C0030FFFE117C0038FFFE4CDF03074E731028FFFA227C00014C
S224FC10A0AC76B03C0013675AB03C00116748322900043401534164043229000613802010ED
S224FC10C0334100040811000367209269000264O4D26900060C410004641008D10002117C21
S224FC10E00005FFFE117C00E8FFFE117C0038FFFE4CDF03074E730811000067B208910001F7
S224FC110060E80811000067A608D1000160DC10BC0028117C0038FFFE4CDF03074E735279D3
S224FC11200001B8AC101010BC00101210B10108000007661 44A790001B8B8672A427900016F
S224FC1140B8B81228FFFC601E52790001B8A852790001B8AA33FC00010001B8B833FC000140
S224FC11600001B8BA6048080100036712080000 03660C52790001B8A252790001B8AA0801F4
S224FC118000046712080000046 70C52790001B8A652790001B8AA0801000567120800000566
S224FC11A0670C52790001B8A452790001B8AA117C0038FFFE4CDF03074E7352790001B8B277
S224FC11C010BC000110100800000567 0E33FC00010001B8BA52790001B8AE0800000670E47
S224FC11E033FC00010001B8BA52790001B8B04A28FFFC10BC0030117C0038FFFE4CDF0307B7
S224FC12004E731028FFFC227C0001B076B03C00136756B03C00116744322900043401534188
S224FC122064043229000613802010334100040811000367 1C926900026404D26900060C4117
S224FC12400004640C08D1000210BC000510BC00E8117C0038FFFE4CDF03074E7308110000E8
S224FC126067B60891000160E80811000067AA08D1000160DC007C070048E7C0C04A7900013B
S224FC1280B67666104A3900FD040008F9000300FD0402604041F90001B68C20390001B68A59
S224FC12A0123900FD040008F9000300FD040222790001B88C4E91118100005240B07C0200C9
S224FC12C06604303C0000B0790001B688670633C00001B68A08B9000300FD04024CDF030336
S224FC12E04E7308010001670612 3C003060041 23C00314E750201007F4E754E7548E780805A
S224FC130041F900FD0206007C070010BC004041F900FD02021010E1481010E158D07C004C89
S224FC13201080E048108052B9000010184A39000010126626 52B90000101408790000000050
S224FC1340101313F90000101300FD080013FC00C7000010124CDF01014E735339000010 12A1
S224FC13604CDF01014E7348F9FFFF0000103E43F900FC1578720260000 1A448F9FFFF000074
S224FC1380103E43F900FC15877203600001 9048F9FFFF0000103E43F900FC159972046000 7B
S224FC13A0017C48F9FFFF0000103E43F900FC15B37205600001 6848F9FFFF0000103E43F919
S224FC13C000FC15C8720660000154 48F9FFFF0000103E43F900FC15DE7207600001 4048F9F3
S224FC13E0FFFF0000103E43F900FC15ED720860000 12C48F9FFFF0000103E43F900FC16077D
S224FC14007209600001 1848F9FFFF0000103E43F900FC161D720A6000010448F9FFFF0000BF
S224FC1420103E43F900FC1632720B600000F06118611661146112611061 0E610C610A610817
S224FC14406106610461024E7148F9FFFF0000103E45F900FC143043F900FC1647343C000C81
S224FC1460600000AC48F9FFFF0000103E43F900FC1663323C0018600000A44E734E734E7354
S224FC14804E734E734E7348F9FFFF0000103E43F900FC1676323C001960000082612061 1E4E
S224FC14A0611C611A6118611661146112611061 0E610C610A6108610661046102 4E7148F987
S224FC14C0FFFF0000103E45F900FC149E43F900FC168D343C0020603648F9FFFF0000103E45
S224FC14E043F900FC16A4722D602248F9FFFF0000103E43F900FC168D722E602048F9FFFFD1
S224FC15000000103E43F900FC16E2722F600E46FC2700205F91CA3208E249D24246FC270018
S224FC1520204F4FF900010C624282428226430C0100046406341826583618548824580C0299
S224FC1540000466023612 49F90000102238C128C938CA28C828CB38C338C22679000 01000FF
S224FC156028CB1028001080FC000A1200E9014840820018C16000EA924D756C7469627573 96
S224FC158020457272 6F72004F646420416464726573732045727 26F7200496C6C6567616C3F
S224FC15A020496E737472756374696F6E204572726F720044697669646520627920 5A65729D
S224FC15C06F204572726F72004348 4B20496E737472756374696F6E204572726F72004F76EA
S224FC15E06572666C6F77204572726F720050726976696C656765205669 6F6C6174696F6EB5
S224FC16002045727 26F7200547261636520457863657074696F6E204572726F7200496C6C96
S224FC16206567616C204F702D436F646520313031300049 6C6C6567616C204F702D436F648B
S224FC164065203131313100 4D6F746F726F6C61205265736572766564204 96E746572727 58A
S224FC1660707400537075726 96F757320496E746572727570740 04E6F74204D61736B61628E
S224FC16806C6520496E746572727570740054726170 20496E737472756374696F6E2045725B
S224FC16A0726F72004E6F20506F727420446566696E656420466F72205461736B004E6F20AE
S224FC16C046757274686572205461736B696E672E20416C6C205461736B73204B696C6C659A
S224FC16E06400496C6C6567616C2052657475726E2046726F6D205461736B000D0A0D0A0DB9
S224FC17000A436F7079726967687420284329204245 4C4C2B484F57454C4C205068696C6CF6
S224FC172069707362757267 20436F6D70616E792031393930 0D0A5068696C6C69707362758F
S224FC1740726720536F7274696E672053797374656D730D0A496E74656C6C6967656E7420DB
S224FC17604F7065726174696E672053797374656D202849544F53290D0A5772697474656E66
S224FC1780206279204D616E6F6C6973204E2E204761767269 6C6F73202D2D2056657273 69B4
S224FC17A06F6E20312E300D0A0A496E697469616C697A6174696F6E2E2E2E2E00436F6D706C
S224FC17C06C6574652E0D0A0A000D0A0A457863657074696F6E2050726F63657373696E6702
S224FC17E0205B4E6F2E2007005D202D2D2D20000D0A0A50726F6772616D20436F756E7465B0
S224FC180072202E2E2E200004537461636B20506F696E746572202E2E2E2E2E2000044164C1
S224FC18206472657373202E2E2E2E2E2E2E2E2E2E2E2000044F702D436F6465202E2E2E2E09
S224FC18402E2E2E2E2E2E2E2E2E2E2E20000246756E6374696F6E20436F6465202E2E2E2EB2

S224FC18602E2E2E2E2E2E20052750726F63657373204 36E74726C201B8C6F632E20000045461B6
S224FC1880736B204E756D6265732202E2E2E2E2E2E2E2E2E2E2E2E2E2E2E200001202020202020089
S224FC18A0202020202020202020202020202020202020202020202020000004E56FF682EBC000171
S224FC18C0B0764EB900FC05702EBC0001B0764EB900FC057E2EBC00012F3C0001B0763F3CCA
S224FC18E000014EB900FC058C5C8F23FC00032ADE00032A7E20790032A7E4290427900 01C0
S224FC1900F7D84279001F7DC2D7C00010C66FFF8206EFFF813E80004002D7E0206EFFF893
S224FC192013E80005000326024EB900FC048C33C000032A88426EFFFE10390002D7E04880C9
S224FC19404BC06000011 0203C00200000D0BC00032ADE23C000032A7E610002C0526EFFFE8C
S224FC19604EB900FC05063F00306EFFFED1C8D1FC00032A88309F306EFFFED1C8223C0003FF
S224FC19802A883EB018002F3C00FC5A304EB900FC03CC588F3D40FFFC67343EBC00024EB9CE
S224FC19A000FC8710306EFFFED1C8223C00032A883EB018002F3C00FF00584EB900FCDD881C
S224FC19C0588F4279001F7DC4EB900FC076A4EB900FC7BA860000963EBC00082F3C000192
S224FC19E0BFC23F3C000F4EB900FC087E5C8F4A806FE63EBC003E2F3C00032610 2F3C000EE3
S224FC1A004EB900FC0A7E5C8F4A806FE60C39000200 02D7E0671 2203C0020000 0D0BC0003AE
S224FC1A202ADE23C000032A7E2EBC000000034EB900FC054261546034 2EBC00FF007A4EB925
S224FC1A4000FCDD884EB900FC048C3E804EB900FC049A601853 80B0BC000000462DAE580D6
S224FC1A602040D1FC00FF000020504ED02EBC00FF009C4EB900FCDD884EB900FC048C3E806D
S224FC1A804EB900FC049A4E5E4E754E56FFF6426EFFFE426EFFFC6076526EFFFE4EB900FCAE
S224FC1AA00506 3F00306EFFFED1C8D1FC00032A88309F306EFFFED1C8223C00032A883EB021
S224FC1AC018002F3C00FC247C4EB900FC03CC588F3D40FFFA67243EBC00024EB900FC871086
S224FC1AE0306EFFFED1C8223C00032A883EB018002F3C00FF00CA4EB900FCDD8858 8F42795A
S224FC1B00001F7DC4EB900FC076A526EFFFC30390003261 0B06EFFFC6E00FF7E0C390002D4
S224FC1B20002D7E0660C1039000 1BFC248803E80615E0C39000300 02D7E0660C103900 01AC
S224FC1B40BFC348803E806148 0C39000400 02D7E0663A0C39004E0001BFC467200C3900332B
S224FC1B600001BFC3660C3EBC00024EB900FC7D90600A3EBC00014EB900FC7D900C390005A4
S224FC1B80002D7E066064EB900FCC5BA4E5E4E754E56FFFC102E00094880 48C0605C4EB9B5
S224FC1BA000FC876E600000704EB900FC78446066 3EBC00024EB900FC3522605A3EBC0001D3
S224FC1BC04EB900FC3522604E4EB900FC78546 0464EB900FC784C603E3EBC00AA4EB900FC7B
S224FC1BE0C9B460323EBC02134EB900FCC9B460264EB900FC876E601E601C90BC00000 03150
S224FC1C00B0BC00000008 62E8E5802040D1FC00FF001420504ED04E5E4E754E56FFB43D7C53
S224FC1C200001FFBC60282E8E0697FFFFFFC84EB900FCC8003D40FFB86F140C3E0043FFC97A
S224FC1C406708610005EA6006600 4426EFFBC4A6EFFBC66D213EEFFCA0001BFC213EEFFCBCD
S224FC1C600001BFC313EEFFCC0001BFC4102EFFCD488033C00001BFC613EEFFCE0001BFC8EF
S224FC1C8013EEFFCF0001BFC9303900 01BFC6C07C000FE94033C000032A544A7900032A54D0
S224FC1CA0660833FC008000032A541D7C0043FFBF1D7C0006FFC03EBC00023F3C00023F0ED7
S224FC1CC00697FFFFFFBE2F0E0697FFFFFFBF4EB900FCC738DFFC0000000A3D40FFBA3EAE0C
S224FC1CE0FFBA2F0E0697FFFFFFBE4EB900FCC706588F10390001BFC9488048C0600000A834
S224FC1D00427900025A1833FC00010002 5A1660000 0B2427900025A1833FC0003000 25A160C
S224FC1D2033FC00020002 5A5633FC00010002 5A546000009042790002 5A1833FC000400028B
S224FC1D405A1633FC000400025A5633FC00010002 5A5433FC00020002 5A9433FC00030002F8
S224FC1D605A92605E427900025A1833FC000500025A1633FC000400025A5633FC00010002CC
S224FC1D805A5433FC000500025A9433FC000300025A9233FC000200025AD233FC00040002BC
S224FC1DA05AD0601E601C90BC0000003 0B0BC00000007620EE5802040D1FC00FF0038205066
S224FC1DC04ED00C390030000 1BFC2670000E03D7C0001FFBC60302E8E0697FFFFFFC84EB97C
S224FC1DE000FCC8003D40FFB86F1C0C2E0050FFC967102E8E0697FFFFFFBE61000470600647
S224FC1E006004426EFFBC4A6EFFBC66CA1D7C0050FFBF1D7C0031FFC01D7C0006FFC13EBCC6
S224FC1E200023F3C00032F0E0697FFFFFFBE2F0E0697FFFFFFBF4EB900FCC738DFFC000019
S224FC1E40000A3D40FFBA3EAEFFBA2F0E0697FFFFFFBE4EB900FCC706588F083900020 0030A
S224FC1E6026026748 3EBC00082F3C0001BFC23F3C000F3F3C00024EB900FC076C508F2E8E83
S224FC1E800697FFFFFFC82F3C000259DC6100042258 8F3EBC003E2F3C000259DC3F3C000E6C
S224FC1EA03F3C00024EB900FC076C508F0C3900300001BFC3670000E03D7C0001FFBC60300B
S224FC1EC02E8E0697FFFFFFC84EB900FCC8003D40FFB86F1C0C2E0050FFC967102E8E069737
S224FC1EE0FFFFFFBE61000386600 66004426EFFBC4A6EFFBC66CA1D7C0050FFBF1D7C0032F2
S224FC1F00FFC01D7C0006FFC13EBC00023F3C00032F0E0697FFFFFFBE2F0E0697FFFFFFBFFD
S224FC1F204EB900FCC738DFFC0000000A3D40FFBA3EAEFFBA2F0E0697FFFFFFBE4EB900FC46
S224FC1F40C706588F083900030003 26026748 3EBC00082F3C0001BFC23F3C000F3F3C0003B7
S224FC1F604EB900FC076C508F2E8E0697FFFFFFC82F3C00025A1A6100033858 8F3EBC003E51
S224FC1F802F3C00025A1A3F3C000E3F3C00034EB900FC076C508F0C39004E0001BFC4670085
S224FC1FA000E03D7C0001FF8C60302E8E0697FFFFFFC84EB900FCC8003D40FFB86F1C0C2E59
S224FC1FC00050FFC967102E8E0697FFFFFFBE6100029C60066004426EFFBC4A6EFFBC66CA86
S224FC1FE01D7C0050FFBF1D7C0032FFC01D7C0006FFC13EBC00023F3C00032F0E0697FFFFFD
S224FC2000FFBE2F0E0697FFFFFFBF4EB900FCC738DFFC0000000A3D40FFBA3EAEFFBA2F0E6D
S224FC20200697FFFFFFBE4EB900FCC706588F0839000400032602674 83EBC00082F3C000103
S224FC2040BFC23F3C000F3F3C00044EB900FC076C508F2E8E0697FFFFFFC82F3C00025A5863
S224FC20606100024E588F3EBC003E2F3C00025A583F3C000E3F3C00044EB900FC076C508F13
S224FC20800C39004E0001BFC8670000E03D7C0001FFBC60302E8E0697FFFFFFC84EB900FCB7

S224FC20A0C8003D40FFBB62080C2E0050FFC967102E8E0697FFF900BE6100018260066004DD
S224FC20C0426EFFBC4A6EFFBC66CA1D7C0050FFBF1D7C0034FFC01D7C0006FFC13EBC000263
S224FC20E03F3C00032F0E0697FFFFFFBE2F0E0697FFFFFFBF4EB900FCC738DFFC0000000A4F
S224FC21003D40FFBA3EAEFFBA2F0E0697FFFFFFBE4EB900FCC706588F083900050003260226
S224FC212067483EBC00082F3C0001BFC23F3C000F2F3C00054EB900FC076C508F2E8E069748
S224FC2140FFFFFFC82F3C00025A9661000164588F3EBC003E2F3C00025A963F3C000E3F3C16
S224FC2160000054EB900FC076C508F4E5E4E754E56FFF82D6E0008FFFC0839000200032602EE
S224FC2180671E203C00200000D1AEFFFC3EAE000C2F2E00082F2EFFFC4EB900FC4022508FCA
S224FC21A02D6E0008FFFC0839000300032602671E203C00300000D1AEFFFC3EAE000C2F2E31
S224FC21C000082F2EFFFC4EB900FC4022508F2D6E0008FFFC0839000400032602671E203C6B
S224FC21E000400000D1AEFFFC3EAE000C2F2E00082F2EFFFC4EB900FC4022508F2D6E000888
S224FC2200FFFC0839000500032602671E203C00500000D1AEFFFC3EAE000C2F2E00082F2EEC
S224FC2220FFFC4EB900FC4022508F4E5E4E754E56FFF41D7C0043FFFB3EBC00023F3C00010A
S224FC22402F0E5D972F0E5B974EB900FCC738DFFC0000000A3D40FFF83EAEFFF82F0E5D97AE
S224FC22604EB900FCC706588F4E5E4E754E56FFFA206E0008117C005000013EBC00023F3CAF
S224FC228000012F2E00082F2E000853974EB900FCC738DFFC0000000A3D40FFFE3EAEFFFE3F
S224FC22A02F2E00084EB900FCC706588F4E5E4E754E56FFEC206E000C102800034880C07C2A
S224FC22C0000F226E000832803D7C0003FFFE426EFFFA602A526EFFFE206E000C222EFFFE04
S224FC22E048C1103018004880C07C000F326EFFFAD3C9D3EE000833400002526EFFFA306EAF
S224FC230000083010806EFFFA6ECA526EFFFE306EFFFED1EE000C1D50FFF0306EFFFED1EE4C
S224FC2320000C1D680001FFF11D7C002EFFF2306EFFFED1EE000C1D680002FFF3306EFFFEE8
S224FC2340D1EE000C1D680003FFF4422EFFF52E8E0697FFFFFFF04EB900FCD3002F012F0057
S224FC23604EB900FCD9D0508F2F00206E0008215F0012302EFFFE58403D40FFFC426EFFFA66
S224FC238060000008302EFFFAE540D06EFFFC3D40FFFE306EFFFED1EE000C1D50FFF0306ECD
S224FC23A0FFFED1EE000C1D680001FFF11D7C002EFFF2306EFFFED1EE000C1D680002FFF347
S224FC23C0306EFFFED1EE000C1D680003FFF4422EFFF52E8E0697FFFFFFF04EB900FCD3009B
S224FC23E02F012F004EB900FCD9D0508F2F00306EFFFAD1C8D1C8D1EE0008215F0016526EDD
S224FC2400FFFA206E00083010B06EFFFA6E00FF76586EFFFE306EFFFED1EE000C1D50FFF06D
S224FC2420306EFFFED1EE000C1D680001FFF11D7C002EFFF2306EFFFED1EE000C1D6800021A
S224FC2440FFF3306EFFFED1EE000C1D680003FFF4422EFFF52E8E0697FFFFFFF04EB900FCFB
S224FC2460D3002F012F004EB900FCD9D0508F2F00206E0008215F00364E5E4E754E56FFA071
S224FC24802EBC0001B0764EB900FC05702EBC0001B0764EB900FC057E3EBC00013F3C0001B4
S224FC24A0B0763F3C00014EB900FC058C5C8F33FC000200032AD023FC0001F7DC0001F7CA17
S224FC24C0426EFFDA6044306EFFDAD1C8D1C8D1FC0001F7DE4290306EFFDAD1C8D1C8D1FC3A
S224FC24E00001F8064290306EFFDAD1C8D1C8D1FC00032AA84290306EFFDAD1C8D1C8D1FC77
S224FC250000032A564290526EFFDA0C6E000AFFDA6DB44EB900FC048C3D40FFDE13FC000151
S224FC25200002D7D413FC00020002D7D513FC00040002D7D613FC00080002D7D713FC001086
S224FC25400002D7D813FC00200002D7D913FC00400002D7DA13FC00800002D7DB4239000226
S224FC2560D7DC30390003264A48C07214E3A0D0BC0000101C2D40FFAA0C3900020002D7E0EC
S224FC25806F00032C0C6E0001FFDE660001F030390003264C48C07214E3A0D0BC0003261039
S224FC25A0D0BC00000362D40FFAE2F3C41A800002F3900032626206EFFAE2F104EB900FCB6
S224FC25C0DAE8508F2F004EB900FCDC7C508F2F004EB900FCDD52588F3D40FFE03D6EFFE0C2
S224FC25E0FFB22F3C000000002F3C3FE800002F3C42C800002F3C417000002F3900032626E4
S224FC2600306EFFAE2F104EB900FCDAE8508F2F002F3C42A000004EB900FCDBA6508F2F008D
S224FC26204EB900FCDAE8508F2F004EB900FCDBA6508F2F002F3C3F8000004EB900FCDADE4F
S224FC26405 08F2F00302EFFE048C02F004EB900FCDA14588F2F004EB900FCDC7C508F2F0087
S224FC26604EB900FCDD2A588F2F012F004EB900FCD820DFFC000000102F012F004EB900FCC1
S224FC2680D998508F3D40FFB42F3C000000002F3C3FF400002F3C3F8000002F3C42C8000011
S224FC26A02F3C417000002F3900032626206EFFAE2F104EB900FCDAE8508F2F002F3C42A0AC
S224FC26C000004EB900FCDBA6508F2F004EB900FCDAE8508F2F004EB900FCDBA6508F2F0002
S224FC26E04EB900FCDAE8508F2F00302EFFE048C02F004EB900FCDA14588F2F004EB900FC88
S224FC2700DC7C508F2F004EB900FCDD2A588F2F012F004EB900FCD820DFFC000000102F01EC
S224FC27202F004EB900FCD998508F3D40FFB62F3C000000002F3C3FF000002F390003262628
S224FC2740206EFFAE2F104EB900FCDAE8508F2F004EB900FCDD2A588F2F012F004EB900FCD8
S224FC2760D69EDFFC000000106C0E426EFFB4302EFFE0E3403D40FFB6600001302F3C41A8A5
S224FC27800000306EFFDE5348D1C8D1C8223C000326102F3018164EB900FCDC7C508F2F0063
S224FC27A04EB900FCDD52588F3D40FFE03D6EFFE0FFB22F3C42C800002F3C41700000306E39
S224FC27C0FFDE5348D1C8D1C8223C000326102F3018162F3C42A000004EB900FCDBA6508F7A
S224FC27E02F004EB900FCDAE8508F2F004EB900FCDBA6508F2F002F3C3F8000004EB900FC17
S224FC2800DADE508F2F00302EFFE048C02F004EB900FCDA14588F2F004EB900FCDC7C508F3C
S224FC28202F004EB900FCDD52588F3D40FFB42F3C3F8000002F3C42C800002F3C4170000064
S224FC2840306EFFDE5348D1C8D1C8223C000326102F3018162F3C42A000004EB900FCDBA63A
S224FC2860508F2F004EB900FCDAE8508F2F004EB900FCDBA6508F2F004EB900FCDAE8508F40
S224FC28802F00302EFFE048C02F004EB900FCDA14588F2F004EB900FCDC7C508F2F004EB91D
S224FC28A000FCDD52588F3D40FFB6600001782F3C41A80000306EFFDE5348D1C8D1C8223C00
S224FC28C0000326102F3018164EB900FCDC7C508F2F004EB900FCDD52588F3D40FFE03D6EA8

Mar-16-99 02:10pm From-MILLEN, WH ZELAND & BRANIGAN 7032436410 T-713 P.08/38 F-776

S224FC28E0FFE0FFB22F3C427900002F3C41700000306EFFDE534E1B88D1C8223C00032610D7
S224FC29002F3018162F3C42A000004EB900FCDBA6508F2F004EB900FCDAE8508F2F004EB970
S224FC292000FCDBA6508F2F002F3C3F8000004EB900FCDADE508F2F00302EFFE048C02F00A4
S224FC29404EB900FCDA14588F2F004EB900FCDC7C508F2F004EB900FCDD52588F3D40FFB4BD
S224FC29602F3C3F8000002F3C42C800002F3C41700000306EFFDE5348D1C8D1C8223C0003F2
S224FC298026102F3018162F3C43A000004EB900FCDBA6508F2F004EB900FCDAE8508F2F00C1
S224FC29A04EB900FCDBA6508F2F004EB900FCDAE8508F2F00302EFFE048C02F004EB900FC3A
S224FC29C0DA14588F2F004EB900FCDC7C508F2F004EB900FCDD52588F3D40FFB62F3C0000D3
S224FC29E000002F3C3FF00000306EFFDE5348D1C8D1C8223C000326102F3018164EB900FCCD
S224FC2A00DD2A588F2F012F004EB900FCD69EDFFC000000106C0E426EFFB4302EFFE0E340C9
S224FC2A203D40FFB63D6EFFDEFFB8302EFFDE52403D40FFBA303900032610B06EFFDE660618
S224FC2A403D7C0001FFBA42802D40FFA62D40FFEC42403D40FFA41D40FFE43D40FFDC2D79F6
S224FC2A6000000101CFFF42EBC00FD03024EB900FC06144640326EFFDE5349D3FC0002D7D412
S224FC2A8012114881C041C07C00FF670003B64A2EFFE46700007E20390000101CB0AEFFECDF
S224FC2AA06366303900032AFEC1FC000302800000FFFFD0B90000101C2D40FFEC306EFFDEF0
S224FC2AC0D1C8D1C8D1FC0001F7DE52901D790002D7E0FFE6302EFFDE48801D40FFE71D7C3B
S224FC2AE00001FFE8422EFFE93EBC00062F0E0697FFFFFFE642673F3C00014EB900FC076C3D
S224FC2B00508F3D7C0001FFDC4EB900FC0524600004702D790000101CFFFC303900032AFEDF
S224FC2B2002800000FFFFD0AEFFFC2D40FFEC1D7C0001FFE44A6EFFA4660000FC3EBC000A05
S224FC2B402F0E0697FFFFFFC63F2EFFB84EB900FC087E5C8F3D40FFE04A6EFFE06F064A6E1F
S224FC2B60FFC66702600260D44A6EFFE06C0000C8207900032A7E5290207900032A7E2D50DE
S224FC2B80FFA63D7C0001FFC62D6EFFA6FFC82D6EFFFCFFCC306EFFDE5348D1C8D1FC000329
S224FC2BA026100C6800020002661023EEFFFC0001B68023EEFFC80001B67830390003261004
S224FC2BC0B06EFFDE6628206EFFAA2D50FFCC3EBC000A2F0E0697FFFFFFC63F2EFFBA3F39AD
S224FC2BE00003264A4EB900FC076C508F60183EBC000A2F0E0697FFFFFFC63F2EFFBA4EB9C6
S224FC2C0000FC07D85C8F0C3900020002D7E06E120C3900020002D7E066180C6E0001FFDE97
S224FC2C206710306EFFDED1C8D1C8D1FC00032AA852906000034C202EFFFC90AEFFCC2D407D
S224FC2C40FFF0302EFFB602800000FFFFB0AEFFF0640000D43EBC000A2F0E0697FFFFFFD0C1
S224FC2C603F2EFFB84EB900FC087E5C8F3D40FFE04A6EFFE06C00007C306EFFDE5348D1C831
S224FC2C80D1FC000326100C6800020002661023EEFFFC0001B68023EEFFC80001B67830398C
S224FC2CA000032610B06EFFDE6628206EFFAA2D50FFCC3EBC000A2F0E0697FFFFFFC63F2EC4
S224FC2CC0FFBA3F390003264A4EB900FC076C508F601E2D6EFFFCFFCC3EBC000A2F0E06973D
S224FC2CE0FFFFFFC63F2EFFBA4EB900FC07D85C8F602C3EBC000A2F0E0697FFFFFFC63F2E83
S224FC2D00FFB84EB900FC087E5C8F306EFFDED1C8D1C8D1FC00032A5652906000FF1A426E7F
S224FC2D20FFA46000011A302EFFB402800000FFFFB0AEFFF06300008C207900032A7E529081
S224FC2D40207900032A7E2D50FFA63D7C0001FFBC2D6EFFA6FFBE2D6EFFFCFFC23039000 3D7
S224FC2D6032610B06EFFDE6628206EFFAA2D50FFC23EBC000A2F0E0697FFFFFFBC3F2EFFBA61
S224FC2D803F390003264A4EB900FC076C508F60183EBC000A2F0E0697FFFFFFBC3F2EFFBABD
S224FC2DA04EB900FC07D85C8F306EFFDED1C8D1C8D1FC00032AA852903D7C0001FFA4600057
S224FC2DC0007E306EFFDE5348D1C8D1FC000326100C6800020002661023EEFFFC0001B6808E
S224FC2DE023EEFFC80001B678303900032610B06EFFDE6628206EFFAA2D50FFCC3EBC000A1D
S224FC2E002F0E0697FFFFFFC63F2EFFBA3F390003264A4EB900FC076C508F601E2D6EFFFC9A
S224FC2E20FFCC3EBC000A2F0E0697FFFFFFC63F2EFFBA4EB900FC07D85C8F426EFFA460007F
S224FC2E40013A4A2EFFE4660A4EB900FC0524600001302D790000101CFFF84A6EFFDC6738B3
S224FC2E601D790002D7E0FFE6302EFFDE48801D40FFE7422EFFE8422EFFE93EBC00062F0EE8
S224FC2E800697FFFFFFE642673F3C00014EB900FC076C508F426EFFDC202EFFFB90AEFFFC2E
S224FC2EA0B0BC00000064641C202EFFF4B0B90000101C6710306EFFDED1C8D1C8D1FC0001F9
S224FC2EC0F80652904AAEFFA6661E3EBC000A2F0E0697FFFFFFD03F2EFFB84EB900FC087E98
S224FC2EE05C8F3D40FFE060062D6EFFA6FFD22D6EFFF8FFD6426EFFD0306EFFDE5348D1C87E
S224FC2F00D1FC000326100C6800020002661023EEFFF80001B68423EEFFD20001B67C3039FB
S224FC2F2000032610B06EFFDE6628206EFFAA2D50FFD63EBC000A2F0E0697FFFFFFD03F2E2D
S224FC2F40FFBA3F390003264A4EB900FC076C508F60183EBC000A2F0E0697FFFFFFD03F2EE7
S224FC2F60FFBA4EB900FC07D85C8F42AEFFA6422EFFE42D790000101CFFF44EB900FC0524F1
S224FC2F806000FAE44E5E4E754E56FFF60C7900010001F7CE6650426EFFFC603A306EFFFC0A
S224FC2FA0D1EE000C1D50FFFA306EFFFCD1EE000C326E0010534992EEFFFCD3EE000C109146
S224FC2FC0306E0010534890EEFFFCD1EE000C10AEFFFA526EFFFC302E001048C081FC0002FC
S224FC2FE0806EFFFC6EB60C6E004500106D5C2EAE000C3F3C00202F2E0008610000D45C8FF3
S224FC30003D40FFFE0C6E0002FFFE6F064240600000BC2EAE000C0697000000203F3C002564
S224FC30202F2E00085697610000A85C8F3D40FFFE0C6E0002FFFE6F08700560000090600614
S224FC30407009600000088600000820C6E003400106D282EAE000C3F3C00342F2E000861007C
S224FC306000705C8F3D40FFFE0C6E0002FFFE6F06424060586004700960520C6E0028001011
S224FC30806F120C6E003400106C0A3D7C0004FFFE424060380C6E002000106D2E0C6E0028BF
S224FC30A000106E262EAE000C3F3C00202F2E0008611E5C8F3D40FFFE0C6E0002FFFE6F06B1
S224FC30C04240600860047005600242404E5E4E754E56FFE4206E000E0C1000316706700389
S224FC30E0600000A6306E000C5348D1EE000E0C100031670670036000009052AE000E302E2E
S224FC3100000C534048C081FC00053D40FFEA426EFFEE604E306EFFEED1CE422BFFF0426E9F

Mar-16-99 02:11pm From-MILLEN, WH. ZELANO & BRANIGAN 7032436410 T-713 P.09/38 F-776

S224FC3120FFEC6032306801EED1CE1028FFF0E3401140FFF02527000E0C10003140C052AE74
S224FC3140000E44C0660C306EFFFEED1CE0028001FFF0526EFFE30C6E0005FFEC6DC6526EA0
S224FC3160FFEE302EFFEEB06EFFEA6DA82E8E0697FFFFFFF03F2EFFEA2F2E000B610E5C8F9F
S224FC31803D40FFE8302EFFE84E5E4E754E56FFE6426EFFF8426EFFF0426EFFEC426EFFFA03
S224FC31A0600000E6206E000E322EFFFA48C1102018004B803D40FFF2302EFFF2C1FC00052B
S224FC31C0204022 3C00FF013C10301800024000FF3D40FFEE0C6E000AFFEE6C1E302EFFEEAB
S224FC31E0807C0030326EFFFAD3EE000812803 02EFFEED16EFFEC6000008C302EFFEE48C0FA
S224FC3200606 6302EFFF048C0603A3D6EFFFAFFFE302EFFEEC07C000F3D40FFF4526EFFF0A2
S224FC322060363D6EFFFAFFFC302EFFEEC07C000F3D40FFF6526EFFF0601E700660000 1BE8E
S224FC3240601660144A8067C2B0BC0000000167D2B0BC0000000267E2602A3D6EFFFAFFFC0A
S224FC3260526EFFF8601E601C908C000000F0B0BC0000000F620EE5802040D1FC00FF00EAFA
S224FC32802050 4ED0526EFFFA302EFFFAB06E000C6D00FF12700A322EFFEC48C183FC000A90
S224FC32A04841904148C081FC000A48403D40FFEA306E000C5348D1EE000842100C6E00015D
S224FC32C0FFF86F06700660000134302EFFF048C0600001104A6EFFF8671 8302EFFEAD07CEF
S224FC32E00030326EFFFCD3EE0008128070016000010C4A6EFFEA67067005600001004240 63
S224FC33006 00000FA600000F64A6EFFF8670670066 00000EA302EFFEAD07C0030326EFFFEC0
S224FC3320D3EE0008128070016000000D2600000CE302EFFEAC1FC01C2322EFFF4C3FC001E69
S224FC3340D081322EFFF648C1E381D081D0BC00FF01DC20400C50FFFF66067006600000 9E06
S224FC3360302EFFEAC1FC01C2322EFFF4C3FC001ED081322EFFF648C1E381D081204022 3C33
S224FC338000FF01DC30301800E048D07C0030C07C00FF326EFFFED3EE000812 80302EFFEABA
S224FC33A0C1FC01C2322EFFF4C3FC001ED081322EFFF648C1E381D0812040223C00FF01DC5E
S224FC33C0303018 00C07C00FFD07C0030C07C00FF326EFFFCD3EE0008128070026 01E601C20
S224FC33E0601A4A806700FEEEB0BC0000000 16700FF18B0BC0000000 26700FF364E5E4E75D1
S224FC34004E56FFF6426EFFFE600000EA306EFFFED1EE00081 0BC0003302E0010322EFFFE1F
S224FC3420C3FC00039041B07C00036C10302E0010322EFFFEC3FC000390416002700 33D409D
S224FC3440FFFA426EFFFC60000078306EFFFED1EE00081010E5481080206E000C322EFFFEB9
S224FC3460C3FC0003342EFFFC48C2D2821030180002400 0FF0280000000FF6026306EFFFE93
S224FC3480D1EE00085610603 4306EFFFED1EE000806100000 6026306EFFFED1EE00085410A6
S224FC34A0601AB0BC0000002067ECB0BC0000003067D6B0BC00000031 67C260DA526EFFFC1E
S224FC34C0302EFFFCB06EFFFA6D80601C306EFFFED1EE0008101 0E5481080306EFFFED1EE79
S224FC34E0000852105 26EFFFC0C6E0003FFFC6DDC526EFFFE302EFFFEC1FC0003B06E0010DF
S224FC35006D00FF0A2EAE0008 3F2EFFFE2F3C00FF012A4EB900FCDD885C8F302EFFFE4E5EF7
S224FC35204E754E56FEFA33EE0008 0001F7CE23F9000326 22 0001B8C40C790003 0001F7CE0B
S224FC354066 1A2F3C40800000 2F3900 01B8C44EB900FCDADE508F23C0000 1B8C43EBC0001E5
S224FC35604EB900FC09243EBC00014EB900FC0A7A0C79000 20001F7CE663E4AB90001B67C71
S224FC358067343EB9000 1B8C03039000 1B8BE02800000FFFFD0B9000 1B6842F004EB900FCC9
S224FC35A00964588F2EB90001B67C4EB900FC4EE442B90001B67C603C4AB90001B67867 34D0
S224FC35C03EB90001B8C03039000 1B8BE02800000FFFFD0B90001B6802F004EB900FC0964BB
S224FC35E0588F2EB90001B6784EB900FC4EE443B90001B6783EBC00FF42672F0E0697FFFFF4
S224FC3600FEFE4EB900FC40925C8F2E8E0697FFFFFEFE4EB900FC4F503D40FFFE4A6EFFFEC9
S224FC36206F123EAEFFFE2F0E0697FFFFFEFE61000 1E0588F3EBC01002F0E0697FFFFFEFE53
S224FC36403F3C00134EB900FC0A7E5C8F3D40FFFE4A6EFFFE6F103EAEFFFE2F0E0697FFFFF8
S224FC3660FEFE6110588F4EB900FC05246000FF024E5E4E754E56FFE8206E00080C2800 5252
S224FC3680000166 0000C8206E0008102800034880 48C060000096 3EAE000C2F2E00086100A5
S224FC36A004C8588F600000A2610002 6C6000009A2EBC0001B8C24EB900FC79F41D7C0052CA
S224FC36C0FFF51039000 2D7E0488053 40807C003048801D40FFF61D7C0045FFF71D7C0006DF
S224FC36E0FFF83EBC00023F3C00042F0E0697FFFFFFF42F0E0697FFFFFFF54EB900FCC73BBE
S224FC3700DFFC0000000A3D40FFFE3EAEFFFE3F0E0697FFFFFFF43F3C00133F3C00014EB984
S224FC372000FC076C508F6020601EB0BC000000316700FF64B0BC000000346700FF6CB0BCF7
S224FC37400000000456700FF6A600000C2206E0008102800014880 48C06000009E4EB900FC91
S224FC37604154600000A84EB900FC49266000009E206E0008102800024B8048C060564EB9DE
S224FC378000FC4228605E206E00080C28005100046638 3EBC00022F2E00085A972F0E06971B
S224FC37A0FFFFFFFEE4EB900FC40BE508F2E8E0697FFFFFFEE4EB900FCEFA03D40FFEC3EAE13
S224FC37C0FFEC4EB900FC049A60064EB900FC4D6C60126010B0BC0000005367A2B0BC000024
S224FC37E0005467A260264EB900FC470A601E4EB900FC076A60166014207C00FF1370720520
S224FC3800B09857C9FFFC206800144ED04E5E4E754E56FF7048E70700536E000C206E00086F
S224FC38200C100002660852AE0008536E000C1D7C0044FF8010390002D7E048805340807C71
S224FC38400003048A01D40FF814EB900FC4F0E2D40FF822D7CFFFFFFFFF86422EFF8A3EBC27
S224FC3860000093F3C00202F0E0697FFFFFF8B4EB900FC40925C8F1D7C0015FF8B3EBC000946
S224FC388042672F0E0697FFFFFF764EB900FC40925C8F3EAE000C2F2E00082F0E0697FFFF3C
S224FC38A0FF764EB900FC2F88508F3E002E8E0697FFFFFF764EB900FCF0923D40FF700C79F9
S224FC38C0000100032AE26600009A30390002464EC07C000FD079000246525340 3D40FF7229
S224FC38E0BE6EFF726D7A3EB900024652303900024 64EC07C000F534048C0D08E2F000697A3
S224FC3900FFFFFF762F0E0697FFFFFF8B4EB900FC4022508F3EB9000246522F0E0697FFFF24
S224FC3920FF8B2F0E0697FFFFFF764EB900FC4022508F3C2EFF70600C3046D1CE117C002054
S224FC3940FF765246BC7C00096DEE422EFF7F2E8E0697FFFFFF764EB900FCF00C2D40FF8612

Mar-16-99 02:11pm From-MILLEN, WH . ZELANO & BRANIGAN 7032436410 T-713 P.10/38 F-776

S224FC396060584A476F5410072F0E0697FFFFFF762F0E0697FF1B8F8B4EB900FC4022508F82
S224FC39803C2EFF70600C3046D1CE117C0030FF765246BC7C00096DEE422EFF7F2E8E06971F
S224FC39A0FFFFFF764EB900FCF00C2D40FF86BE7C000966061D7C0002FF8A3EBC006C4267C0
S224FC39C02F0E0697FFFFFF944EB900FC40925C8F3EAE000C2F2E00082F0E0697FFFFFF94F3
S224FC39E04EB900FC3400508F3D40FF743EAEFF74065700142F0E0697FFFFFF803F3C00120C
S224FC3A003F3C00014EB900FC076C508F4A9F4CDF00C04E5E4E754E56FFDA3EBC00203F3C7F
S224FC3A2000302F0E0697FFFFFFDE4EB900FC40925C8F1D7C0052FFDF10390002D7E048804D
S224FC3A405340807C003048801D40FFE01D7C0034FFE130390001B8C248C081FC03E8807CA5
S224FC3A60003048801D40FFE230390001B8C248C081FC006448C081FC000A4840807C0030FF
S224FC3A8048801D40FFE330390001B8C248C081FC000A48C081FC000A4840807C00304880A0
S224FC3AA01D40FFE4303900032AF048C081FC000A807C003048801D40FFE5303900032AF0F5
S224FC3AC048C081FC000A4840807C003048801D40FFE6303900032AD848C081FC000A807C9F
S224FC3AE0003048801D40FFE8303900032AD848C081FC000A4840807C003048801D40FFE9CB
S224FC3B001D7900032606FFF430390002D7DE48801D40FFF530390002464E48801D40FFF69A
S224FC3B203EBC00023F3C00192F0E0697FFFFFFDE2F0E0697FFFFFFDF4EB900FCC738DFFCAC
S224FC3B400000000A3D40FFFE3EAEFFFE2F0E0697FFFFFFDE3F3C00133F3C00014EB900FC35
S224FC3B60076C508F4E5E4E754E56FFE2426EFFFE33FC00010001B8C01D7C0052FFF3103982
S224FC3B800002D7E04880534080 7C003048801D40FFF41D7C0031FFF51D7C0006FFF62EBC90
S224FC3BA000032ADC2F2E00085E973F3C00034EB900FCC9405C8FB07C000167061D7C0015E4
S224FC3BC0FFF62EBC00032AE62F2E000806970000000A3F3C00034EB900FCC9405C8FB07C45
S224FC3BE0000167061D7C0015FFF6206E000813E8001600032ADA206E0008102800174880 58
S224FC3C0033C000032AF2206E000810280018488033C000032A820C2E0006FFF6660001763F
S224FC3C2013F900032ADA0003260633F900032AF20002D7DE33F900032A820002464E33F9A2
S224FC3C4000032ADC00032AF033F900032AE600032AD82F3C000000002F3C40590000303921
S224FC3C6000032AF048C02F004EB900FCDA14588F2F004EB900FCDD2A588F2F012F004EB991
S224FC3C8000FCD6D6DFFC000000102F012F004EB900FCD9D0508F2D40FFEA2F3C00000000E5
S224FC3CA02F3C40590000303900032AD848C02F004EB900FCDA14588F2F004EB900FCDD2A49
S224FC3CC0588F2F012F004EB900FCD6D6DFFC000000102F012F004EB900FCD9D0508F2D40AC
S224FC3CE0FFE62F3C000000002F3C403500002F390001B8C44EB900FCDD2A588F2F012F005E
S224FC3D004EB900FCD820DFFC000000102F012F002F3C000000002F3C403500002F2EFFEACC
S224FC3D204EB900FCDD2A588F2F012F004EB900FCD820DFFC000000102F012F004EB900FCEA
S224FC3D40D560DFFC000000102F012F004EB900FCD998508F33C00001B8BE2F3C00000000BB
S224FC3D602F3C403500002F2EFFE64EB900FCDD2A588F2F012F004EB900FCD820DFFC0000FA
S224FC3D8000102F012F004EB900FCD998508F33C00001B8C03EBC00023F3C00042F0E06979F
S224FC3DA0FFFFFFF22F0E0697FFFFFFF34EB900FCC738DFFC0000000A3D40FFFC3EAEFFFC03
S224FC3DC02F0E0697FFFFFFF23F3C00133F3C00014EB900FC076C508F4E5E4E754E56FFF880
S224FC3DE0426EFFFC600000924A2EFFFE6D0A0C2E0008FFFE6D0000820C2E0008FFFE6F0855
S224FC3E000C2E0020FFFE6D700C2E007FFFFE6E68102EFFFE488048C0604C4A6EFFFC6F58B0
S224FC3E203EBC00083F3C00203F3C00082F3C00FF14204EB900FCDD88508F53AE0008536EB2
S224FC3E40FFFC6034206E000810AEFFFE52AE0008102EFFFE48803E804EB900FC062A526EC5
S224FC3E60FFFC60146012B0BC0000000867ACB0BC0000007F67A460CC2EBCFFFFFFFF4EB9CA
S224FC3E8000FC06CE1D40FFFEB07C000D6600FF5A206E00084210302EFFFC4E5E4E754E56AB
S224FC3EA0FFFE48E703004247603030 6E000C90C75348D1EE00081D50FFFE306E000C90C7EB
S224FC3EC05348D1EE00083247D3EE000810913047D1EE000810AEFFFE5247302E000C48C098
S224FC3EE081FC0002BE406DC2202E00084A9F4CDF00804E5E4E754E56FFFA2EAE00084EB934
S224FC3F0000FCF0923D40FFFE3EAEFFFE2F2E0008618C588F202E00084E5E4E754E56FFF826
S224FC3F2048E703004AAE000866082D790001B8C8000860342D6E000CFFFC6018206E00086D
S224FC3F40101048802 26EFFFC12114881B041670C52AEFFFC206EFFFC4A1066E0206EFFFCF0
S224FC3F604A10670C52AE0008206E00084A1066C4206E00084A10660442806064 2D6E0008CE
S224FC3F80FFF852AE000860442D6E000CFFFC6030206E00081010488022 6EFFFC1211488156
S224FC3FA0B0416618206E00084210202E0008528023C00001B8C8202EFFF8602452AEFFFC59
S224FC3FC0206EFFFC4A1066C852AE0008206E00084A1066B423EE00080001B8C8202EFFF8DE
S224FC3FE04A9F4CDF00804E5E4E754E56FFFC600452AE0008206E00084A1066F4206E0008D2
S224FC4000226E000C109152AE0008206E000C1010488052AE000C4A0066E2202E00084E5E38
S224FC40204E754E56000048E703004A6E00106606202E00086052302E0010534002800000 27
S224FC4040FFFFD0AE000CB0AE0008651E3E2E001053476010 3047D1EE00083247D3EE000CE4
S224FC406010915347 4A476CEC601A424760103047D1EE00083247D3EE000C10915247BE6E8E
S224FC4080001065EA202E00084A9F4CDF00804E5E4E754E56000048E703004247600C304725
S224FC40A0D1EE000810AE000D5247BE6E000E65EE202E00084A9F4CDF00804E5E4E754E564A
S224FC40C0000048E703004247601A3047D1EE00083247D3EE000C10913047D1EE00084A10ED
S224FC40E067085247BE6E00106DE04A9F4CDF00804E5E4E754E56000048E70300424760422A
S224FC4100206E0008320748C1103018004880 3247D3EE000C12114881B0416C0470FF602A1A
S224FC4120206E0008320748C11030180048803247D3EE000C12114881B0416F047001600A15
S224FC41405247BE6E00106DB842404A9F4CDF00804E5E4E754E56FFEE1D7C0042FFF7103934
S224FC41600002D7E048805340807C003048801D40FFF81D7C0006FFF91D7C0030FFFA1D7CF0
S224FC41800030FFFB3EBC00023F3C00052F0E0697FFFFFFF62F0E0697FFFFFFF74EB900FCDA

S224FC41A0C738DFFC0000046A3D40FFF43EAEFFF42F0E0697FFF05FF63F3C00133F3C0001F4
S224FC41C04EB900FC076C508F4E5E4E754E56FFEE1D7C004BFFF71D7C0006FFF8422EFFF9B1
S224FC41E03EBC00023F3C00022F0E0697FFFFFFF62F0E0697FFFFFFF74EB900FCC738DFFCCD
S224FC4200000000A3D40FFF43EAEFFF42F0E0697FFFFFFF63F3C00133F3C00014EB900FC6A
S224FC4220076C508F4E5E4E754E56FF641D7C0054FF6B1D7C0053FF6C10390002D7E048803D
S224FC42405340807C003048801D40FF6D426EFF6860000466302EFF68E9403040D1CE2F08F8
S224FC42602F3C000003E82F3C00002710306EFF685248D1C8D1C8223C0001F7DE2F301800C9
S224FC42804EB900FCEEAA508F2F004EB900FCEF40508F80BC0000030225F1340FF6E302E58
S224FC42A0FF68E9403040D1CE2F082F3C0000000642F3C000003E8306EFF685248D1C8D1C821
S224FC42C0223C0001F7DE2F3018004EB900FCEEAA508F2F004EB900FCEF40508F80BC00003C
S224FC42E00030225F1340FF6F302EFF68E9403040D1CE2F082F3C0000000A2F3C00000064D3
S224FC4300306EFF685248D1C8D1C8223C0001F7DE2F3018004EB900FCEEAA508F2F004EB970
S224FC432000FCEF40508F80BC0000030225F1340FF70302EFF68E9403040D1CE2F082F3C24
S224FC4340000000000A306EFF685248D1C8D1C8223C0001F7DE2F3018004EB900FCEEAA508F5C
S224FC436080BC0000030225F1340FF71302EFF68E9403040D1CE2F082F3C000003E82F3C97
S224FC438000002710306EFF685248D1C8D1C8223C00032A562F3018004EB900FCEEAA508F42
S224FC43A02F004EB900FCEF40508F80BC0000030225F1340FF72302EFF68E9403040D1CE0E
S224FC43C02F082F3C0000000642F3C000003E8306EFF685248D1C8D1C8223C00032A562F306F
S224FC43E018004EB900FCEEAA508F2F004EB900FCEF40508F80BC0000030225F1340FF7338
S224FC4400302EFF68E9403040D1CE2F082F3C0000000A2F3C00000064306EFF685248D1C8EB
S224FC4420D1C8223C00032A562F3018004EB900FCEEAA508F2F004EB900FCEF40508F80BC94
S224FC44400000000030225F1340FF74302EFF68E9403040D1CE2F082F3C0000000A306EFF6836
S224FC44605248D1C8D1C8223C00032A562F3018004EB900FCEEAA508F80BC0000030225FB0
S224FC44801340FF75302EFF68E9403040D1CE2F082F3C000003E82F3C00002710306EFF6823
S224FC44A05248D1C8D1C8223C00032AA82F3018004EB900FCEEAA508F2F004EB900FCEF40AA
S224FC44C0508F80BC0000030225F1340FF76302EFF68E9403040D1CE2F082F3C0000006444
S224FC44E02F3C000003E8306EFF685248D1C8D1C8223C00032AA82F3018004EB900FCEEAA4F
S224FC4500508F2F004EB900FCEF40508F80BC0000030225F1340FF77302EFF68E940304067
S224FC4520D1CE2F082F3C0000000A2F3C00000064306EFF685248D1C8D1C8223C00032AA85C
S224FC45402F3018004EB900FCEEAA508F2F004EB900FCEF40508F80BC0000030225F1340E9
S224FC4560FF78302EFF68E9403040D1CE2F082F3C0000000A306EFF685248D1C8D1C8223CEB
S224FC458000032AA82F3018004EB900FCEEAA508F80BC0000030225F1340FF79302EFF68D7
S224FC45A0E9403040D1CE2F082F3C000003E82F3C00002710306EFF685248D1C8D1C8223C64
S224FC45C00001F8062F3018004EB900FCEEAA508F2F004EB900FCEF40508F80BC000000303E
S224FC45E0225F1340FF7A302EFF68E9403040D1CE2F082F3C00000642F3C000003E8306E76
S224FC4600FF685248D1C8D1C8223C0001F8062F3018004EB900FCEEAA508F2F004EB900FCE6
S224FC4620EF40508F80BC0000030225F1340FF7B302EFF68E9403040D1CE2F082F3C000012
S224FC4640000A2F3C00000064306EFF685248D1C8D1C8223C0001F8062F3018004EB900FCD8
S224FC4660EEAA508F2F004EB900FCEF40508F80BC0000030225F1340FF7C302EFF68E940D9
S224FC46803040D1CE2F082F3C0000000A306EFF685248D1C8D1C8223C0001F8062F301800B9
S224FC46A04EB900FCEEAA508F80BC0000030225F1340FF7D526EFF680C6E0008FF686D0046
S224FC46C0FB943EBC00023F3C00832F0E0697FFFFFF6A2F0E0697FFFFFF6B4EB900FCC738CB
S224FC46E0DFFC0000000A3D40FF683EAEFF682F0E0697FFFFFF6A3F3C00133F3C00014EB94B
S224FC470000FC076C508F4E5E4E754E56FF761D7C0055FF811D7C0020FF8210390002D7E018
S224FC472048805340807C003048801D40FF833D7C0001B890FF7A426EFF7E600000C0206E04
S224FC4740FF7A322EFF7E48C1E3813030180048C081FC2710484048C081FC03E8807C00303D
S224FC4760326EFF7ED2C9D2C9D3CE1340FF84206EFF7A322EFF7E48C1E3813030180048C09D
S224FC478081FC03E8484048C081FC0064807C0030326EFF7ED2C9D2C9D3CE1340FF85206EBA
S224FC47A0FF7A322EFF7E48C1E3813030180048C081FC0064484048C081FC000A807C003091
S224FC47C0326EFF7ED2C9D2C9D3CE1340FF86206EFF7A322EFF7E48C1E3813030180048C03B
S224FC47E081FC000A4840807C0030326EFF7ED2C9D2C9D3CE1340FF87526EFF7E0C6E0009F0
S224FC4800FF7E6D00FF3A2D7C0001B8A2FF7A426EFF7E600000C0206EFF7A322EFF7E48C1BD
S224FC4820E3813030180048C081FC2710484048C081FC03E8807C0030326EFF7ED2C9D2C968
S224FC4840D3CE1340FFA8206EFF7A322EFF7E48C1E3813030180048C081FC03E8484048C0F3
S224FC486081FC0064807C0030326EFF7ED2C9D2C9D3CE1340FFA9206EFF7A322EFF7E48C14E
S224FC4880E3813030180048C081FC0064484048C081FC000A807C0030326EFF7ED2C9D2C9BC
S224FC48A0D3CE1340FFAA206EFF7A322EFF7E48C1E3813030180048C081FC000A4840807C7E
S224FC48C00030326EFF7ED2C9D2C9D3CE1340FFAB526EFF7E0C6E0009FF7E6D00FF3A3EBCD9
S224FC48E000023F3C004B2F0E0697FFFFFF802F0E0697FFFFFF814EB900FCC738DFFC000063
S224FC4900000A3D40FF7E3EAEFF7E2F0E0697FFFFFF803F3C00133F3C00014EB900FC076C52
S224FC4920508F4E5E4E754E56FFB81D7C0050FFBF10390002D7E048805340807C00304880D5
S224FC49401D40FFC030390003261048808 07C003048801D40FFC13D7C0003FFFC426EFFFE5B
S224FC49606028526EFFFC306EFFFED1C8223C0003261030301802488080 7C0030326EFFFC1F
S224FC4980D3CE1340FFBE526EFFFE303900032610B06EFFFE6ECC526EFFFC206EFFFCD1CEBE
S224FC49A02F082F3C424000002F3C447A00002F3C42C800002F39000326224EB900FCDC7C26
S224FC49C0508F2F004EB900FCDBA6508F2F004EB900FCDAE8508F2F004EB900FCDD52588F4A

S224FC49E04880225F13990FBE306EFFFCD1CE2F082F3C42C80C502F39000326224EB900FCC3
S224FC4A00DC7C508F2F004EB900FCDD52588F48C081FC03E8484048C081FC0064D07C0030B9
S224FC4A204880225F1340FFBF306EFFFCD1CE2F082F3C42C800002F39000326224EB900FC81
S224FC4A40DC7C508F2F004EB900FCDD52588F48C081FC0064484048C081FC000AD07C00305A
S224FC4A604880225F1340FFC0306EFFFCD1CE2F082F3C42C800002F39000326224EB900FC40
S224FC4A80DC7C508F2F004EB900FCDD52588F48C081FC000A4840D07C00304880225F134067
S224FC4AA0FFC1302EFFFC58403D40FFFA426EFFFE600014C302EFFFEE540D06EFFFA3D4040
S224FC4AC0FFFC306EFFFCD1CE2F082F3C424000002F3C447A00002F3C42C80000306EFFFE45
S224FC4AE0D1C8D1C8223C000326102F3018164EB900FCDC7C508F2F004EB900FCDBA6508F93
S224FC4B002F004EB900FCDAE8508F2F004EB900FCDD52588F4880225F1340FFBE306EFFFCB7
S224FC4B20D1CE2F082F3C42C80000306EFFFED1C8D1C8223C000326102F3018164EB900FC35
S224FC4B40DC7C508F2F004EB900FCDD52588F48C081FC03E8484048C081FC0064D07C003078
S224FC4B604880225F1340FFBF306EFFFCD1CE2F082F3C42C80000306EFFFED1C8D1C8223CCB
S224FC4B80000326102F3018164EB900FCDC7C508F2F004EB900FCDD52588F48C081FC0064E3
S224FC4BA0484048C081FC000AD07C00304880225F1340FFC0306EFFFCD1CE2F082F3C42C822
S224FC4BC00000306EFFFED1C8D1C8223C000326102F3018164EB900FCDC7C508F2F004EB973
S224FC4BE000FCDD52588F48C081FC000A4840D07C00304880225F1340FFC1526EFFFE30398D
S224FC4C0000032610B06EFFFE6E00FEAA586EFFFC306EFFFCD1CE2F082F3C424000002F3CA1
S224FC4C20447A00002F3C42C800002F39000326464EB900FCDC7C508F2F004EB900FCDBA67C
S224FC4C40508F2F004EB900FCDAE8508F2F004EB900FCDD52588F4880225F1340FFBE306E62
S224FC4C60FFFCD1CE2F082F3C42C800002F39000326464EB900FCDC7C508F2F004EB900FCAA
S224FC4C80DD52588F48C081FC03E8484048C081FC0064D07C00304880225F1340FFBF306EA8
S224FC4CA0FFFCD1CE2F082F3C42C800002F39000326464EB900FCDC7C508F2F004EB900FC6A
S224FC4CC0DD52588F48C081FC0064484048C081FC000AD07C00304880225F1340FFC0306E48
S224FC4CE0FFFCD1CE2F082F3C42C800002F39000326464EB900FCDC7C508F2F004EB900FC2A
S224FC4D00DD52588F48C081FC000A4840D07C00304880225F1340FFC1306EFFFCD1CE4228EB
S224FC4D20FFC23EBC00023F2EFFFC56572F0E0697FFFFFFBE2F0E0697FFFFFFBF4EB900FC72
S224FC4D40C738DFFC0000000A3D40FFFE3EAEFFFE2F0E0697FFFFFFBE3F3C00133F3C00016C
S224FC4D604EB900FC076C508F4E5E4E754E56FFFA4EB900FC05063D40FFFE0C6EFFF8FFFEDB
S224FC4D8067123EAEFFFE2F3C00FC4D984EB900FC03CC588F4E5E4E754E56FFDA4EB900FCBC
S224FC4DA0048C3D40FFDE2D790000101CFFF8203900001018D0BC000003E82D40FFFC600679
S224FC4DC04EB900FC0524202EFFFCB0B90000101862EE2D790000101CFFF4202EFFF490AE38
S224FC4DE0FFF82D40FFF0202EFFF080FC001502800000FFFF3D40FFEE1D7C0054FFE11D7C41
S224FC4E000054FFE210390002D7E048805340807C003048801D40FFE3302EFFFE48C081FCFC
S224FC4E2003E8484048C081FC0064807C003048801D40FFE4302EFFFE48C081FC0064484035
S224FC4E4048C081FC000A807C003048801D40FFE5302EFFFE48C081FC000A4840807C0030FF
S224FC4E6048801D40FFE6302EFFDE48C081FC0064484048C081FC000A807C003048801D409B
S224FC4E80FFE7302EFFDE48C081FC000A4840807C003048801D40FFEB3EBC00023F3C000822
S224FC4EA02F0E0697FFFFFFE02F0E0697FFFFFFE14EB900FCC738DFFC0000000A3D40FFEC33
S224FC4EC03EAEFFEC2F0E0697FFFFFFE03F3C00133F3C00014EB900FC076C508F6000FEC8BE
S224FC4EE04E5E4E754E56FFFC30790001B94CD1C8D1C8D1FC0001B8CC20AE000852790001CE
S224FC4F00B94C0279001F0001B94C4E5E4E754E56FFF830390001B94CB0790001B94E672AB0
S224FC4F2030790001B94ED1C8D1C8D1FC0001B8CC2D50FFFC52790001B94E0279001F000155
S224FC4F40B94E202EFFFC60046002428004E5E4E754E56FFF4603A202EFFFC4880327900011B
S224FC4F60B950D3FC0001B95212805279000 1B9500C790080000 1B950660A42790001B950A1
S224FC4F8070FF6054202EFFFC4880807C0003670C4EB900FC0A442D40FFFC6CBA202EFFFC12
S224FC4FA04880807C0003662E3EB90001B9502F3C0001B9522F2E00084EB900FC40BE508FA8
S224FC4FC03D790001B950FFF842790001B950302EFFF86004600242404E5E4E754E56FFD4D1
S224FC4FE0206E0008102800014880 48C060000360206E00080C2800300002660C3EBC0001E5
S224FC50004EB900FC7AF6600842574EB900FC7AF63EAE000C2F2E00083F3C00133F3C000240
S224FC50204EB900FC076C508F60000340206E00080C28005000026610 3EAE000C2F2E000888
S224FC504061000370588F6032206E0008102800024880C07C000F524048801D40FFFE3EAE7F
S224FC5060000C2F2E00083F3C0013102EFFFE48803F004EB900FC076C508F600002EE1D7CB0
S224FC50800043FFDB10390001BFC24880807C003048801D40FFDC10390001BFC34880807CA3
S224FC50A0003048801D40FFDD10390001BFC44880807C003048801D40FFDE30390001BFC60C
S224FC50C04880807C003048801D40FFDF422EFFE03EBC00023F3C00052F0E0697FFFFFFDA5C
S224FC50E02F0E0697FFFFFFDB4EB900FCC738DFFC0000000A3D40FFD83EAEFFD82F0E069725
S224FC5100FFFFFFDA4EB900FCC706588F6000025C206E0008102800024880C07C000F5240CD
S224FC512048801D40FFFE3EAE000C2F2E00083F3C0013102EFFFE48803F004EB900FC076CA9
S224FC5140508F60000226206E0008102800024880C07C000F524048801D40FFFE3EAE000C58
S224FC51602F2E00083F3C0013102EFFFE48803F004EB900FC076C508F600001F03EAE000C5B
S224FC51802F2E000861000376588F600001DE3EAE000C2F2E000861000438588F600001CC9B
S224FC51A0206E0008102800024880C07C000F524048801D40FFFE0C2E0001FFFE6F1E3EAEA6
S224FC51C0000C2F2E00083F3C0013102EFFFE48803F004EB900FC076C508F60064EB900FCCF
S224FC51E0470A60000186206E0008102800024880C07C000F524048801D40FFFE0C2E0001A4
S224FC5200FFFE6F1E3EAE000C2F2E00083F3C0013102EFFFE48803F004EB900FC076C508F81

S224FC522060064EB900F67154600001403EAE000C2F2E0008498000FCB0C2588F6000012C8B
S224FC52401D7C0059FFDB1D7C0006FFDC1D7C0030FFDD3EBC00023F3C00022F0E0697FFFF11
S224FC5260FFDA2F0E0697FFFFFFDB4EB900FCC738DFFC0000000A3D40FFDA3EAEFFD82F0E67
S224FC52800697FFFFFFDA4EB900FCC706588F3EAE000C2F2E00083F3C00133F3C00024EB973
S224FC52A000FC076C508F3EAE000C2F2E00083F3C00133F3C00034EB900FC076C508F3EAEF5
S224FC52C0000C2F2E00083F3C00133F3C00044EB900FC076C508F3EAE000C2F2E00083F3C22
S224FC52E000133F3C00054EB900FC076C508F4EB900FC076A60743EBC00102F3C00FF14E411
S224FC53002F0E0697FFFFFFE54EB900FC4022508F3EBC00023F3C00102F0E0697FFFFFFE44A
S224FC53202F0E0697FFFFFFE54EB900FCC738DFFC0000000A3D40FFFC3EAEFFFC2F0E069790
S224FC5340FFFFFFE44EB900FCC706588F601C90BC00000042B0BC00000017629AE580204066
S224FC5360D1FC00FF142820504ED04E5E4E754E56FFFC206E000810280001488048C0601277
S224FC53803EAE000C2F2E00084EB900FCC706588F601C90BC00000045B0BC0000001062E02D
S224FC53A0E5802040D1FC00FF148820504ED04E5E4E754E56FFE61D7C0052FFEB1D7C00507B
S224FC53C0FFEC1D7C0006FFED3D7C0001FFF63D7C0001FFF42E8E55972F2E00085A973F3C81
S224FC53E000044EB900FCC9405C8F3D40FFF62E8E59972F2E000806970000000D3F3C000306
S224FC54004EB900FCC9405C8F3D40FFF42E8E5D972F2E00080697000000103F3C00034EB9DD
S224FC542000FCC9405C8F3D40FFF20C6E0001FFF666100C6E0001FFF466080C6E0001FFF2DF
S224FC544067081D7C0015FFED607233EEFFFE00032AF4206E000813E8000300032AF8206EEA
S224FC5460000813E8000400032AF9206E000813E8000900032AFA206E000813E8000A00039F
S224FC54802AFB206E000813E8000B00032AFC33EEFFFC00032AF633EEFFFA00032AFE206E0F
S224FC54A0000813E8001300032B003EBC000E2F3C00032AF44EB900FC216E588F3EBC00029E
S224FC54C03F3C00032F0E0697FFFFFFEA2F0E0697FFFFFFEB4EB900FCC738DFFC0000000AE3
S224FC54E03D40FFF83EAEFFF82F0E0697FFFFFFEA4EB900FCC706588F4E5E4E754E56FFF2D8
S224FC5500426EFFF642403D40FFF83D40FFFA3D40FFFC0C6E0009000C6D202E8E59972F2EDC
S224FC5520000856973F3C00034EB900FCC9405C8F4A4066063D7C0001FFF60C6E000C000CC9
S224FC55406D264A6EFFF666202E8E5D972F2E00085C973F3C00034EB900FCC9405C8F4A407D
S224FC556066063D7C0001FFF60C6E000F000C6D2A4A6EFFF666242E8E51972F2E0008069706
S224FC55800000000093F3C00034EB900FCC9405C8F4A4066063D7C0001FFF64A6EFFF6662CA8
S224FC55A033EEFFFC0001F7D033EEFFFA0001F7D233EEFFF80001F7D4206E0008102800026E
S224FC55C04880D07CFFD033C00001F7D64E5E4E754E56FFFA206E0008102800034880C07C45
S224FC55E0000F524048801D40FFFE206E00080C28005400026600031A206E00081028000273
S224FC5600488048C0600002E2206E00080C28005400026654206E00080C28005300046648CC
S224FC56204A7900032AE866403EBC00014EB900FC7B563EBC00014EB900FC7AF63EBC0001B3
S224FC5640610015C23EAE000C2F2E00083F3C0013102EFFFE48803F004EB900FC076C508F8F
S224FC566033FC000100032AE8206E00080C28005400026648206E00080C2800510004663C55
S224FC56800C79000100032AE8663242574EB900FC7B5642574EB900FC7AF63EAE000C2F2E08
S224FC56A000083F3C0013102EFFFE48803F004EB900FC076C508F427900032AE86000025238
S224FC56C0206E00080C28005400026654206E00080C280053000466484A7900032AEA6640A0
S224FC56E03EBC00014EB900FC7B563EBC00014EB900FC7AF63EBC00016100150A3EAE000CF9
S224FC57002F2E00083F3C0013102EFFFE48803F004EB900FC076C508F33FC000100032AEAB7
S224FC5720206E00080C28005400026648206E00080C2800510004663C0C79000100032AEA3C
S224FC5740663242574EB900FC7B5642574EB900FC7AF63EAE000C2F2E00083F3C0013102E0E
S224FC5760FFFE48803F004EB900FC076C508F427900032AEA6000019A206E00080C280054E4
S224FC578000026654206E00080C280053000466484A7900032AEC66403EBC00014EB900FCFD
S224FC57A07B563EBC00014EB900FC7AF63EBC0001610014523EAE000C2F2E00083F3C0013FC
S224FC57C0102EFFFE48803F004EB900FC076C508F33FC000100032AEC206E00080C280054CA
S224FC57E000026648206E00080C2800510004663C0C79000100032AEC663242574EB900FC64
S224FC58007B5642574EB900FC7AF63EAE000C2F2E00083F3C0013102EFFFE48803F004EB976
S224FC582000FC076C508F427900032AEC600000E2206E00080C28005400026654206E000893
S224FC58400C280053000466484A7900032AEE66403EBC00014EB900FC7B563EBC00014EB989
S224FC586000FC7AF63EBC00016100139A3EAE000C2F2E00083F3C0013102EFFFE48803F0085
S224FC58804EB900FC076C508F33FC000100032AEE206E00080C28005400026648206E000803
S224FC58A00C2800510004663C0C79000100032AEE663242574EB900FC7B5642574EB900FC7A
S224FC58C07AF63EAE000C2F2E00083F3C0013102EFFFE48803F004EB900FC076C508F42791A
S224FC58E000032AEE602A6028B0BC000000316700FD18B0BC000000326700FDC6B0BC00002D
S224FC590000336700FE74B0BC000000346700FF22206E00080C28005400016628206E00080F
S224FC59200C2800530002661C3EAE000C2F2E00083F3C0013102EFFFE48803F004EB900FC2B
S224FC5940076C508F4E5E4E754E56FEFA4A790001B9D267481D7C004DFF001D7C0006FF0167
S224FC59603EBC00023F3C00022F0E0697FFFFFF802F0E0697FFFFFF004EB900FCC738DFFCA2
S224FC59800000000A3D40FEFE3EAEFEFE2F0E0697FFFFFF804EB900FCC706588F33FC00015D
S224FC59A00001B9D22E8E0697FFFFFF004EB900FCC8003D40FEFE4A6EFEFE6F300C2E004DE6
S224FC59C0FF0166163EAEFEFE2F0E0697FFFFFF006100FB2A588F605460123EAEFEFE2F0ED3
S224FC59E00697FFFFFF006100F5F4588F4A6EFEFE3EBC01002F0E0697FFFFFF003F3C0013C7
S224FC5A004EB900FC087E5C8F3D40FEFE4A6EFEFE6F123EAEFEFE2F0E0697FFFFFF00610043
S224FC5A20F94E588F4A6EFEFE6000FF7A4E5E4E754E56FFFC2EBC000180764EB900FC057013
S224FC5A402EBC0001B0764EB900FC057E3EBC00012F3C0001B0763F3C00014EB900FC058C11

Mar-16-99 02:15pm From-MILLEN, WI ZELANO & BRANIGAN 7032436410 T-713 P.14/38 F-776

S224FC5A605C8F4279000905D630790001F7D6D1C8D1C8227C000004CC207098004E9060E83D
S224FC5A804E5E4E754E56FFFC0C39003300032AF86600014A206E00082028001 4226E00081F
S224FC5AA022290026B0816600011A206E00084AA800186D0000D0206E00084AA8002A6D00C6
S224FC5AC000C4103900032AFA488048C060000096206E00085488123900032AFA4881C27CE0
S224FC5AE0000FC3FC0012D2AE000854812241720830D951C9FFFC6000008A206E00082028A5
S224FC5B000018226E00082229002AB081661A206E00085488226E0008D3FC00000026720835
S224FC5B2030D951C9FFFC6038206E0008117C0015000B3EBC00083F3C00202F2E00080697CC
S224FC5B400000000C4EB900FC40925C8F206E00084228000A206E0008217CFFFFFFFF000639
S224FC5B606020601EB0BC000000316700FF64B0BC000000326700FF5AB0BC0000003367005B
S224FC5B80FF7A603C206E00084AA800186D1A206E00085488226E0008D3FC00000014720861
S224FC5BA030D951C9FFFC6018206E00085488226E0008D3FC00000026720830D951C9FFFCB7
S224FC5BC06018206E00085488226E0008D3FC00000026720830D951C9FFFC6026206E000899
S224FC5BE05488123900032AF84881C27C000FC3FC0012D2AE000854812241720830D951C914
S224FC5C00FFFC4E5E4E754E56FFE6206E00082D680014FFEC206E00085488226E0008D3FC8D
S224FC5C20000000014720830D951C9FFFC0C79000100032AE26668206E00080C280015001D58
S224FC5C406718206E00080C280002001C670C206E00080C280003001C660E1D7C0053FFF031
S224FC5C603D7C0005FFEA60321D7C005AFFF03EB9000246522F2E000806970000001D2F0E1B
S224FC5C800697FFFFFFF14EB900FC4022508F3039000246535A403D40FFEA60000134306E0E
S224FC5CA000080C280015001D6718206E00080C280002001C670C206E00080C280003001CB2
S224FC5CC066101D7C0053FFF03D7C0005FFEA60000100206E00080C2800300022660000C830
S224FC5CE00C39003100032AF9660000AE206E00080C280001001C66740C39003300032AFC92
S224FC5D00663E206E0008117C0015000B206E0008317CFFFFFFFF00063EBC00083F3C0020C9
S224FC5D202F2E000806970000000C4EB900FC40925C8F1D7C0053FFF03D7C0005FFEA602A88
S224FC5D403EBC00052F2E000806970000001D2F0E0697FFFFFFF14EB900FC4022508F1D7C7F
S224FC5D60005AFFF03D7C000AFFEA602A3EBC00052F2E000806970000001D2F0E0697FFFFAD
S224FC5D80FFF14EB900FC4022508F1D7C005AFFF03D7C000AFFEA600C1D7C0053FFF03D7C40
S224FC5DA00005FFEA603A1D7C005AFFF03EBC00092F2E000806970000001D2F0E0697FFFF8E
S224FC5DC0FFF14EB900FC4022508F3D7C000EFFEA3EAEFFEA2F0E0697FFFFFFEC3F3C0012B9
S224FC5DE03F3C00044EB900FC076C508F4E5E4E754E56FEB448E7030042476030426EFFFA15
S224FC5E00603030 07C1FC0038322EFFFAC3FC0012D081D0BC0001BFCA204043A80002526E38
S224FC5E20FFFA0C6E0003FFFA6DD85247BE7C01006DCA103900032AF84B80C07C000F3D40A4
S224FC5E40FFE30C6E0003FFE266063D7C0002FFE23D7C7D00FFEA2D7C00025AD4FEC0426E94
S224FC5E60FFEE426EFFEC422EFEB442403D40FFE43D40FFE63D40FFF03EBC01002F0E0697F3
S224FC5E80FFFFFED83F3C00124EB900FC087E5C8F4A806EE43EBC01002F0E0697FFFFFED867
S224FC5EA03F3C00014EB900FC087E5C8F4A806EE43EBC01002F0E0697FFFFFED83F3C0011A0
S224FC5EC04EB900FC087E5C8F4A806EE41D7C004DFFD91D7C0006FFDA3EBC00023F3C000282
S224FC5EE02F0E0697FFFFFFD82F0E0697FFFFFFD94EB900FCC738DFFC0000000A3E003E8758
S224FC5F002F0E0697FFFFFFD84EB900FCC706588F3EBC00014EB900FC7856203900001014CE
S224FC5F20D0BC0000000F3D40FEBC4A790003260C66244A3EFEB4661E203900001014D0BC65
S224FC5F400000000F3D40FEBC42574EB900FC7AF61D7C0001FEB44A790001F7DA6600007A3D
S224FC5F600C7900010003260C666E4A6EFFEC66684EB900FC7ACA4A40675E202EFEBCB0B919
S224FC5F800000101464523EBC00014EB900FC7AF6422EFEB41D7C004AFFD91D7C0030FFDA39
S224FC5FA03EBC00023F3C00022F0E0697FFFFFFD82F0E0697FFFFFFD94EB900FCC738DFFC2B
S224FC5FC00000000A3E003E872F0E0697FFFFFFD84EB900FCC706588F3EBC01002F0E069778
S224FC5FE0FFFFFED83F3C00124EB900FC087E5C8F3D40FFF86F0001500C3E0044FED86600DD
S224FC6000012C102EFED9024000FFC07C000F3D40FFE82D6EFEDAFEB8202EFEB8C0BC0000A4
S224FC602000FF3D40FFDE302EFFDEC1FC003AD0BC0001BFCA2D40FFFC302EFFE8C1FC001244
S224FC6040D0AEFFFC5480224ED3FCFFFFFEDA3040720830D951C9FFFC302EFFE8B06EFFE2A1
S224FC6060660000AE0C39003100032AF9670A0C39003200032AF966462EAEFEB82F2EFFFCCB
S224FC608061000A14588FB07C0033662C526EFFF2303900032AF4B06EFFF26E1A42574EB936
S224FC60A000FC7AF63D7C0033FFF03D7C0001FFEE42790001F7D66004426EFFF260082EAE1F
S224FC60C0FFFC6100F9C0206EFFFC4AA80066D30206EFFFC2EA800064EB900FCC2443F00DF
S224FC60E0206EFFFC309F206EFFFC4A506610103900032AD2024000FF226EFFFC3280601078
S224FC6100103900032608024000FF236EFFFC32800C6E0001FFE866120C39003300032AF90E
S224FC612067082EAEFFFC6100FADE601A3D7C0030FFF042574EB900FC7AF63D7C0001FFEEDA
S224FC614042790001F7D63EBC01002F0E0697FFFFFED83F3C00014EB900FC087E5C8F3D409F
S224FC6160FFF86F0002720C6E0001FED8660002682D6EFEDAFEB8202EFEB8C0BC000000FF7B
S224FC61803D40FFDE302EFFDEC1FC0038D0BC0001BFCA2D40FFFC206EFFFC20280002B0AEC5
S224FC61A0FEB86746206EFFFC117C0015000B3EBC00083F3C00202F2EFFFC06970000000CA7
S224FC61C04EB900FC40925C8F206EFFFC4228000A103900032608024000FF226EFFFC328009
S224FC61E0206EFFFC216EFEB80002206EFFFC3E904EB900FCC40A3E8061000A0A1D7C004496
S224FC6200FED9424760123047D1CE3247D3EEFFFC1169000BFEDA5247BE7C00096DE8206E44
S224FC6220FFFC301048C081FC0064807C003048801D40FEE3206EFFFC301048C081FC006455
S224FC6240484048C081FC000A807C003048801D40FEE4206EFFFC301048C081FC000A484013
S224FC6260807C003048801D40FEE5206EFFFC102A000A4880807C003048801D40FEE60C2EE7
S224FC62A00033FEE666061D7C0030FEE61D7C0020FEE72F3C000027102F2EFEB84EB900FC77

```
S224FC62A0EF40508F80B00000000301D40FEE82F3C000003E8270C000027102F2EFEB84EB90E
S224FC62C000FCEEAA508F2F004EB900FCEF40508F80BC00000301D40FEE92F3C0000006488
S224FC62E02F3C000003E82F2EFEB84EB900FCEEAA508F2F004EB900FCEF40508F80BC00003E
S224FC63000301D40FEEA2F3C0000000A2F3C000000642F2EFEB84EB900FCEEAA508F2F0007
S224FC63204EB900FCEF40508F80BC00000301D40FEEB2F3C0000000A2F2EFEB84EB900FC0E
S224FC6340EEAA508F80BC00000301D40FEEC1D7C0020FEED3EBC00023F3C00152F0E069708
S224FC6360FFFFFED82F0E0697FFFFFED94EB900FCC738DFFC0000000A4247602430 6EFFE622
S224FC6380D1EEFEC03247D3CE10A9FED8526EFFE6302EFFE6B06EFFEA6604426EFFE652474F
S224FC63A0BE7C00196DD6302EFFE6906EFFE43D40FFF44A6EFFF46C08302EFFEAD16EFFF41A
S224FC63C00C6E7530FFF46F0E3D7C0001FFEC42574EB900FC7AF64A6EFFF06638 3EBC001429
S224FC63E02F0E0697FFFFFEC53F3C00114EB900FC087E5C8F3D40FFF66F1A42574EB900FC6A
S224FC64007AF63D7C0001FFEE3D7C0001FFF04279000 1F7D62E8E0697FFFFFED84EB900FC02
S224FC6420C8003D40FFF86F360C2E004DFED966143EAEFFF82F0E0697FFFFFED86100F0BE02
S224FC644058 8F600C3D7C0030FFF04279000 1F7D642574EB900FC7AF63D7C0001FFEE60462E
S224FC64604EB900FC0464C07C00046744206EFEC0322EFFE448C11030180002 4000FF3E80D6
S224FC64804EB900FC062A48801D40FEB60C2E0013FEB6671C526EFFE4302EFFE4B06EFFEA80
S224FC64A06604426EFFE4302EFFE6B06EFFE466B04A6EFFEC6726302EFFE6906EFFE43D40B3
S224FC64C0FFF44A6EFFF46C08302EFFEAD16EFFF40C6E3E80FFF46C04426EFFEC4A6EFFEE55
S224FC64E06700008 0302EFFE6B06EFFE4667442574EB900FC7AF64A6EFFF067640C6E00336B
S224FC6500FFF06620 3EBC00142F3C00FF14F62F0E0697FFFFFEC54EB900FC4022508F3D7CEB
S224FC65200014FFF63EBC00023F2EFFF62F0E0697FFFFFEC42F0E0697FFFFFEC54EB900FCBB
S224FC6540C738DFFC0000000A3D40FFF63EAEFFF62F0E0697FFFFFEC44EB900FCC706588FB2
S224FC65606004600 0F9C64A9F4CDF00804E5E4E754E56FE3048E70300424760 30426EFFFACE
S224FC6580602030 07C1FC0038322EFFFAC3FC0012D081D0BC0001BFCA204042A8000252 6EB1
S224FC65A0FFFA0C6E0003FFFA6DD85247BE7C01006DCA1039000 32AF84880C07C000F3D401D
S224FC65C0FFE20C6E0003FFE266063D7C0002FFE23D7C7D00FFEA2D7C00025AD4FE3C426E91
S224FC65E0FFEE426EFFEC422EFE3042403D40FFE43D40FFE63D40FFF03EBC01002F0E0697EF
S224FC6600FFFFFE543F3C00124EB900FC087E5C8F4A806EE43EBC01002F0E0697FFFFFE54E7
S224FC66203F3C00014EB900FC087E5C8F4A806EE43EBC01002F0E0697FFFFFE543F3C00119C
S224FC66404EB900FC087E5C8F4A806EE41D7C004DFFD51D7C0006FFD63EBC00023F3C000202
S224FC66602F0E0697FFFFFFD42F0E0697FFFFFFD54EB900FCC738DFFC0000000A3E003E87D8
S224FC66802F0E0697FFFFFFD44EB900FCC706588F3EBC00014EB900FC7B56203900001 0144B
S224FC66A0D0BC0000000F2D40FE384A79000 3260C66244A2EFE30661E2039000 01014D0BCE6
S224FC66C0000000 0F2D40FE3842574EB900FC7AF61D7C0001FE304A79000 1F7DA6600007ABE
S224FC66E00C790001000 3260C666E4A6EFFEC66684EB900FC7ACA4A40675E202EFE38B0B916
S224FC67000000101464523EBC00014EB900FC7AF6422EFE301D7C004AFFD51D7C0030FFD63D
S224FC67203EBC00023F3C00022F0E0697FFFFFFD42F0E0697FFFFFFD54EB900FCC738DFFCAB
S224FC6740000000 0A3E003E872F0E0697FFFFFFD44EB900FCC706588F3EBC01002F0E0697F4
S224FC6760FFFFFE543F3C00124EB900FC087E5C8F3D40FFF86F00017E0C2E0044FE5466002F
S224FC678001 5A102EFE55024000FFC07C000F3D40FFE82D6EFE56FE34202EFE34C0BC0000FF
S224FC67A000FF3D40FFDE302EFFDEC1FC0038D0BC0001BFCA2D40FFFC302EFFE8C1FC0013BD
S224FC67C0D0AEFFFC5480224ED3FCFFFFFE56204072083 0D951C9FFFC0C390033000 32AF845
S224FC67E0671E0C39003300032AF96614103900032AF84880C07C000FB06EFFE8660000C04F
S224FC68001D6EFE54FF551D6EFE55FF567E0B6018304751 48D1CE3247D3CE1169FE54FF542A
S224FC6820BE7C007C67085247BE6EFFF86DE23007D07CFFF73D40FFF83EBC00023F2EFFF8DA
S224FC68402F0E0697FFFFFF542F0E0697FFFFFF554EB900FCC738DFFC0000000A3D40FFF885
S224FC686042476024306EFFE6D1EEFE3C3247D3CE10A9FF54526EFFE6302EFFE6B06EFFEA79
S224FC68806604426EFFE65247BE6EFFF86DD6302EFFE6906EFFE43D40FFF44A6EFFF46C0846
S224FC68A0302EFFEAD16EFFF40C6E7530FFF46F0E3D7C0001FFEC42574EB900FC7AF60C6EA4
S224FC68C00001FFE866120C390033000 32AF96708 2EAEFFFC6100F33060 1A3D7C0030FFF09D
S224FC68E042574EB900FC7AF63D7C0001FFEE42790001F7D63EBC01002F0E0697FFFFFE5436
S224FC69003F3C00014EB900FC087E5C8F3D40FFF86F100C6E0001FE546608 3EBC000 16100FC
S224FC692002E44A6EFFF066383EBC00142F0E0697FFFFFE413F3C00114EB900FC087E5C8F06
S224FC69403D40FFF66F1A42574EB900FC7AF63D7C0001FFEE3D7C0001FFF04279000 1F7D656
S224FC69602E8E0697FFFFFE544EB900FCC8003D40FFF86F360C2E004DFE5566143EAEFFF852
S224FC69802F0E0697FFFFFE546100EB72588F600C3D7C0030FFF04279000 1F7D642574EB9BA
S224FC69A000FC7AF63D7C0001FFEE604A4EB900FC0464C07C00046748206EFE3C322EFFE4B4
S224FC69C048C1103018000 24000FF3E804EB900FC062A48801D40FE320C2E0013FE326604E7
S224FC69E0601E6004526EFFE4302EFFE4B06EFFEA6604426EFFE4302EFFE6B06EFFE466AC76
S224FC6A004A6EFFEC6726302EFFE6906EFFE43D40FFF44A6EFFF46C08302EFFEAD16EFFF419
S224FC6A200C6E3E80FFF46C04426EFFEC4A6EFFEE6756302EFFE6B06EFFE4664C42574EB927
S224FC6A4000FC7AF64A6EFFF0673C3EBC00023F2EFFF62F0E0697FFFFFE402F0E0697FFFF33
S224FC6A60FE414EB900FCC738DFFC0000000A3D40FFF63EAEFFF62F0E0697FFFFFE404EB97F
S224FC6A8000FCC706588F60046000FC204A9F4CDF00804E5E4E754E56FFFC0C39003100034A
S224FC6AA02AF8670A0C39003200032AF8663E206E00084228000A206E00082 17CFFFFFFFFC9
S224FC6AC00006206E0008117C0015000B3EBC00083F3C00202F2E00080697000000 0C4EB9BA
```

S224FC6AE000FC40925C8B4033600000D0206E0008202800002B01E000C660C206E00080C2883
S224FC6B00001500086642206E0008202800002B0AE000C671A206E000854B8226E0008D3FC08
S224FC6B200000000267208030D951C9FFFC6018206E000854B8226E0008D3FC00000014720887
S224FC6B4030D951C9FFFC60703EBC00092F2E00080697000000002F2F2E0008069700000000B05
S224FC6B604EB900FC40F4508F4A40661020600082226E000811690022E000A603C206E0008EC
S224FC6B804228000A206E0008217CFFFFFFFF0006206E0008117C0015000B3EBC00083F3C8B
S224FC6BA000202F2E00080697000000C4EB900FC40925C8F70336002424O4E5E4E754E564C
S224FC6BC0FFFA3039000032A5448C081FC0002B06E00086D12303C0101322E0008E341904 1DA
S224FC6BE03D40FFFE6016303C00FE3239000032A54926E0008E341904 13D40FFFE302EFFFE7C
S224FC6C004E5E4E754E56FFFC3EAE00086 1B03E802F3C00FD04004EB900FC061E588F4E5E7C
S224FC6C204E754E56FE9048E7030042AEFEA042AEFE9C3039000 1F7D048C081FC00023D40DF
S224FC6C40FE963D6EFE96FE9430390001F7D202800000FFFF2D40FE98424760304 26EFFFA56
S224FC6C6060203007C1FC0038322EFFFAC3FC0012D081D0BC0001BFCA204042A80002526ECA
S224FC6C80FFFA0C6E0003FFFA6DD85247BE7C01006DCA1039000032AF84880C07C000F3D4036
S224FC6CA0FFE20C6E0003FFE266063D7C0002FFE23D7C7D00FFEA2D7C00025AD4FEAC426E3A
S224FC6CC0FFEE426EFFEC422EFE9042403D40FFE43D40FFE63D40FFF03EBC01002F0E0697A8
S224FC6CE0FFFFFEB03F3C00124EB900FC087E5C8F4A806EE43EBC01002F0E0697FFFFFEB049
S224FC6D003F3C00014EB900FC087E5C8F4A806EE43EBC01002F0E0697FFFFFEB03F3C001159
S224FC6D204EB900FC087E5C8F4A806EE41D7C004DFFD91D7C0006FFDA3EBC00023F3C000213
S224FC6D402F0E0697FFFFFFD82F0E0697FFFFFFD94EB900FCC738DFFC0000000A3E003E87E9
S224FC6D602F0E0697FFFFFFD84EB900FCC7065B8F3EBC00014EB900FC7B56203900000101460
S224FC6D80D0BC0000000F3D40FEAB4A79000032 60C66244A2EFE90661E2039000010 14D0BC3F
S224FC6DA0000000F2D40FEA842574EB900FC7AF61D7C0001FE904A790001F7DA6600007A07
S224FC6DC00C79000100032 60C666E4A6EFFEC66684EB900FC7ACA4A40675E202EFEA8B0B9BF
S224FC6DE00000101464533EBC00014EB900FC7AF6422EFE901D7C004AFFD91D7C0030FFDAEF
S224FC6E003EBC00023F3C00022F0E0697FFFFFFD82F0E0697FFFFFFD94EB900FCC738DFFCBC
S224FC6E200000000A3E003E872F0E0697FFFFFFD84EB900FCC7065B8F3EBC01002F0E069709
S224FC6E40FFFFFEB03F3C00124EB900FC087E5C8F3D40FFF86F0000EC0C2E0044FEB0660023
S224FC6E6000C8102EFEB1024000FFC07C000F3D40FFE82D6EFEB2FEA4202EFEA4C0BC000013
S224FC6E8000FF3D40FFDE302EFFDEC1FC0038D0BC0001BFCA2D40FFFC302EFFFE8C1FC0012D6
S224FC6EA0D0AEFFFC5480224ED3FCFFFFFEB220407208 30D951C9FFFC302EFFFE8B06EFFE25B
S224FC6EC066642EAEFFFC6100EBBC206EFFFC4A28000A67282F2EFE982F2EFEA04EB900FC83
S224FC6EE0EF40508F48C081EEFE964840 3F005257206EFFFC309F52AEFEA0602A3F3900030D
S224FC6F002A542F2EFE982F2EFE9C4EB900FCEF40508F48C081EEFE944840915720 6EFFFCF5
S224FC6F20309F52AEFE9C601A3D7C0030FFF042574EB900FC7AF63D7C0001FFEE4279000126
S224FC6F40F7D63EBC01002F0E0697FFFFFEB03F3C00014EB900FC087E5C8F3D40FFF86F000F
S224FC6F6001B20C6E0001FEB0660001A82D6EFEB2FEA4302EFEA4C0BC000000FF3D40FFDE73
S224FC6F80302EFFDEC1FC0038D0BC0001BFCA2D40FFFC206EFFFC2038000 2B0AEFEA46760AB
S224FC6FA0206EFFFC117C0015000B3EBC00083F3C00202F2EFFFC06970000000C4EB900FCF9
S224FC6FC040925C8F206EFFFC4228000A3F3900032A542F2EFE982F2EFE9C4EB900FCEF40E1
S224FC6FE0508F48C081EEFE9448409157206EFFFC309F52AEFE9C206EFFFC216EFEA40003 8A
S224FC7000206EFFFC3E906100FBFC1D7C0044FEB142476012 3047D1CE3247D3EEFFFC116974
S224FC7020000BFEB35247BE7C00096DE8206EFFFC301048C081FC0064807C003048801D4060
S224FC7040FEBB206EFFFC301048C081FC00644840 48C081FC000A807C003048801D40FEBCA2
S224FC7060206EFFFC301048C081FC000A4840807C003048801D40FEBD206EFFFC1038000A58
S224FC70804880807C003048801D40FEBE422EFEBF3EBC00023F3C000F2F0E0697FFFFFEB0E1
S224FC70A02F0E0697FFFFFEB14EB900FCC738DFFC000000A42476024306EFFE6D1EEFEAC68
S224FC70C03247D3CE10A9FEB0526EFFE6302EFFE6B06EFFEA6604426EFFE65247BE7C001459
S224FC70E06DD6302EFFE6906EFFE43D40FFF44A6EFFF46C08302EFFEAD16EFFF40C6E753001
S224FC7100FFF46F0E3D7C0001FFEC42574EB900FC7AF64A6EFFF066383EBC00142F0E069720
S224FC7120FFFFFFB13F3C00114EB900FC087E5C8F3D40FFF66F1A42574EB900FC7AF63D7CE0
S224FC71400001FFEE3D7C0001FFF042790001F7D62E8E0697FFFFFEB04EB900FCC8003D40C1
S224FC7160FFF86F360C2E004DFEB166143EAEFFF82F0E0697FFFFFEB06100E3825 8 8F600C40
S224FC71803D7C0030FFF042790001F7D642574EB900FC7AF63D7C0001FFEE60464EB900FC31
S224FC71A00464C07C00046744206EFEAC322EFFE448C110301800024000FF3E804EB900FC9D
S224FC71C0062A48801D40FE920C3E0013FE92671C526EFFE4302EFFE4806EFFEA6604426E64
S224FC71E0FFE4302EFFE6B06EFFE466B04A6EFFEC6726302EFFE6906EFFE43D40FFF44A6ED5
S224FC7200FFF46C08302EFFEAD16EFFF40C6E3E80FFF46C04426EFFEC4A6EFFEE6756302E97
S224FC7220FFE6B06EFFE4664C42574EB900FC7AF64A6EFFF0673C3EBC00023F2EFFF62F0EC4
S224FC72400697FFFFFFB02F0E0697FFFFFFB14EB900FCC738DFFC0000000A3D40FFF63EAE16
S224FC7260FFF62F0E0697FFFFFFB04EB900FCC7065B8F60046000FB144A9F4CDF00804E5EC7
S224FC72804E754E56FE9A48E70700424760284246601C3007C1FC003832 06C3FC0012D0811D
S224FC72A0D0BC0001BFCA204042A800025246 8C7C00036DDE5247BE7C01006DD21039000 3EE
S224FC72C02AF84880C07C000F3D40FFE20C6E0003FFE266063D7C0002FFE23D7C7D00FFEA95
S224FC72E02D7C00025AD4FE9E426EFFEE426EFFEC422EFE9A42403D40FFE43D40FFE63D4017
S224FC7300FFF03EBC01002F0E0697FFFFFEAA3F3C00124EB900FC087E5C8F4A806EE43EBCEB

S224FC732001002F0E069710FFFEAA3F3C00014EB900FC087E5C8FFA806EE43EBC01002F0E87
S224FC73400697FFFFFEAA3F3C00114EB900FC087E5C8F4A806EE41D7C004DFFD31D7C000676
S224FC7360FFD43EBC00023F3C00022F0E0697FFFFFFD22F0E0697FFFFFFD34EB900FCC7386B
S224FC7380DFFC0000000A3E003E872F0E0697FFFFFFD24EB900FCC706588F3D790001F7D026
S224FC73A0FFDC3D790001F7D2FFDA3D6EFFDCFFD83EBC00014EB900FC7B564A790003260C74
S224FC73C066244A2EFE9A661E203900001014D0BC0000000F2D40FEA642574EB900FC7AF659
S224FC73E01D7C0001FE9A4A790001F7DA600007A0C7900010003260C666E4A6EFFEC6668E5
S224FC74004EB900FC7ACA4A40675E202EFEA6B0B90000101464523EBC00014EB900FC7AF632
S224FC7420422EFE9A1D7C004AFFD31D7C0030FFD43EBC00023F3C00022F0E0697FFFFFFD2D0
S224FC74402F0E0697FFFFFFD34EB900FCC738DFFC0000000A3E003E872F0E0697FFFFFFD2EE
S224FC74604EB900FCC706588F3EBC01002F0E0697FFFFFEAA3F3C00124EB900FC087E5C8FD8
S224FC74803D40FFF86F00008E0C2E0044FEAA666A102EFEAB024000FFC07C000F3D40FFE8AD
S224FC74A02D6EFEACFEA2202EFEA2C0BC000000FF3D40FFDE302EFFDEC1FC0038D0BC000166
S224FC74C0BFCA3D40FFFC302EFFE8C1FC0012D0AEFFFC5480224ED3FCFFFFFEAC2040720898
S224FC74E030D951C9FFFC302EFFE8B06EFFE266082EAEFFFC6100E58E601A3D7C0030FFF0BE
S224FC750042574EB900FC7AF63D7C0001FFEE42790001F7D63EBC01002F0E0697FFFFFEAAB3
S224FC75203F3C00014EB900FC087E5C8F3D40FFF86F0001A20C6E0001FEAA660001982D6E17
S224FC7540FEACFEA2202EFEA2C0BC000000FF3D40FFDE302EFFDEC1FC0038D0BC0001BFCAD7
S224FC75602D40FFFC206EFFFC30AEFFD84A790001F7D4660A3EAEFFD86100F68A603C302EC7
S224FC7580FFD848C081FC000248404A40661A3EB900032A545257302EFFD848C081FC00021D
S224FC75A091576100F6606012302EFFD848C081FC00023E8052576100F64C302EFFD8B06EA0
S224FC75C0FFDA66083D6EFFDCFFD86004526EFFD81D7C0044FEAB424760123047D1CE3247FB
S224FC75E0D3EEFFFC1169000BFEAC5247BE7C00096DE8206EFFFC301048C081FC0064807CC0
S224FC7600003048801D40FEB5206EFFFC301048C081FC0064484048C081FC000A807C00306C
S224FC762048801D40FEB6206EFFFC301048C081FC000A4840807C003048801D40FEB7206EFC
S224FC7640FFFC1028000A4880807C003048801D40FEB83EBC00023F3C000E2F0E0697FFFFC0
S224FC7660FEAA2F0E0697FFFFFEAB4EB900FCC738DFFC0000000A42476024306EFFE6D1EEAA
S224FC7680FE9E3247D3CE10A9FEAA526EFFE6302EFFE6B06EFFEA6604436EFFE65247BE7C11
S224FC76A000126DD6302EFFE6906EFFE43D40FFF44A6EFFF46C08302EFFEAD16EFFF40C6ECE
S224FC76C07530FFF46F0E3D7C0001FFEC42574EB900FC7AF64A6EFFF066383EBC00143F0E53
S224FC76E00697FFFFFFAB3F3C00114EB900FC087E5C8F3D40FFF66F1A42574EB900FC7AF63D
S224FC77003D7C0001FFEE3D7C0001FFF042790001F7D62E8E0697FFFFFEAA4EB900FCC800C5
S224FC77203D40FFF86F360C2E004DFEAB66143EAEFFF82F0E0697FFFFFEAA6100DDC0588F3D
S224FC7740600C3D7C0030FFF042790001F7D642574EB900FC7AF63D7C0001FFEE60464EB9FB
S224FC776000FC0464C07C00046744206EFE9E322EFFE448C110301800024000FF3E804EB9E5
S224FC778000FC062A48801D40FE9C0C2E0013FE9C671C526EFFE4302EFFE4B06EFFEA66043E
S224FC77A0426EFFE4302EFFE6B06EFFE466B04A6EFFEC6726302EFFE6906EFFE43D40FFF417
S224FC77C04A6EFFF46C08302EFFEAD16EFFF40C6E3E80FFF46C04426EFFEC4A6EFFFE675678
S224FC77E0302EFFE6B06EFFE4664C42574EB900FC7AF64A6EFFF0673C3EBC00023F2EFFF6DE
S224FC78002F0E0697FFFFFFAA2F0E0697FFFFFFAB4EB900FCC738DFFC0000000A3D40FFF60B
S224FC78203EAEFFF62F0E0697FFFFFFAA4EB900FCC706588F60046000FB824A9F4CDF00C019
S224FC78404E5E4E754E56FFFC4E5E4E754E56FFFC4E5E4E754E56FFFC4E5E4E754E56FFFCEF
S224FC78604E5E4E754E56FFF82D7900001018FFFC60064EB900FC0524202EFFFCB0B90000F0
S224FC7880101867EE6000008820390000101858802D40FFFC3EBC00FD03004EB900FC0614BA
S224FC78A03E800257FFFE2F3C00FD03004EB900FC061E588F60064EB900FC0524102EFFFC5F
S224FC78C0B0B90000101862EE20390000101858802D40FFFC2EBC00FD03004EB900FC0614FE
S224FC78E03E80005700012F3C00FD03004EB900FC061E588F60064EB900FC0524302EFFFC1D
S224FC7900B0B90000101862EE53790001B9D44A790001B9D46E00FF7242790001B9D64EB9A9
S224FC792000FC048C3E804EB900FC049A4E5E4E754E56FFFA0C7900010001B9D6660642404B
S224FC7940600000AE33FC00010001B9D6206E000A3010B06E00086D302EBC00FD03004EB9CC
S224FC796000FC06143E80005700022F3C00FD03004EB900FC061E588F206E000A3010906E8A
S224FC7980000A3D40FFFE60302EBC00FD03004EB900FC06143E800257FFFD2F3C00FD03004F
S224FC79A04EB900FC061E588F302E0008226E000A321190413D40FFFE53EEFFFE0001B9D47E
S224FC79C04EB900FC050633C000032A843EB900032A842F3C00FC78644EB900FC03CC588F50
S224FC79E033C00001B9D8206E000A30AE000870014E5E4E754E56FFF62EBC00FD03004EB919
S224FC7A0000FC06143E80005700022F3C00FD03004EB900FC061E588F3D7C0FA0FFFE6000FA
S224FC7A2000982039000010185880 2D40FFFA2EBC00FD03004EB900FC06143E800257FFFED3
S224FC7A402F3C00FD03004EB900FC061E588F60064EB900FC0524202EFFFAB0B90000101842
S224FC7A6062EE20390000101858802D40FFFA2EBC00FD03004EB900FC06143E8000570001D9
S224FC7A802F3C00FD03004EB900FC061E588F60064EB900FC0524202EFFFAB0B90000101802
S224FC7AA062EE2EBC00FD03044EB900FC0614C07C0040660C536EFFFE4A6EFFFE6E00FF643B
S224FC7AC0206E000842504E5E4E754E56FFFA2EBC00FD04044EB900FC0614C07C000248805F
S224FC7AE01D40FFFE4A2EFFFE670642406004600270014E5E4E754E56FFFC0C6E00010008FF
S224FC7B00662A2EBC00FD04024EB900FC06143E80025700FE2F3C00FD04024EB900FC061E20
S224FC7B20588F33FC00010001F7DA60262EBC00FD04024EB900FC06143E80005700013F3C4A
S224FC7B4000FD04024EB900FC061E588F42790001F7DA4E5E4E754E56FFFC0C6E00010008F5

Mar-16-98 02:18pm From-MILLEN, WH. , ZELANO & BRANIGAN 7032436410 T-713 P.18/38 F-776

S224FC7B6066222EBC00FD0804EB900FC06143E80025700FD2F3C00FD04024EB900FC061EC9
S224FC7B80588F60203EBC00FD04024EB900FC06143E80005700022F3C00FD04024EB900FCEB
S224FC7BA0061E588F4E5E4E754E56FFE833FC00010003260C427900001F7DA700113C000188
S224FC7BC0B9DE48801 3C00001B9DA424033C000032AEE33C000032AEC33C000032AEA33C045
S224FC7BE000032AE81D7C004AFFED13F90001B9DA0001B9DC3EBC00062F0E5D9742674EB989
S224FC7C0000FC087E5C8F3D40FFF84A6EFFF86F544A2EFFFC660A13FC00010001B9DA6044E5
S224FC7C204A390001B9DC661013FC00010001B9DC33FC00010003260C42390001B9DA1D7C01
S224FC7C400032FFEE102EFFFA4880807C003048801D40FFEF102EFFFB4880807C00304880D2
S224FC7C601D40FFF013F90001B9DE0001B9E02EBC00FD04044EB900FC0614C07C0001660AC0
S224FC7C8013FC00010001B9DE601842390001B9DE1D7C0031FFEE1D7C0035FFEF1D7C00782C
S224FC7CA0FFF01039 0001B9E0B0390001B9DE661010390001B9DCB0390001B9DA670000C473
S224FC7CC04A390001B9DE67084A390001B9DA66780C79000100003260C666C2EBC00FD0402AA
S224FC7CE04EB900FC06143E80005700022F3C00FD04024EB900FC061E588F42790003260CE3
S224FC7D0042790001F7DA422EFFF13EBC00023F3C00042F0E0697FFFFFEC2F0E0697FFFF5F
S224FC7D20FFED4EB900FCC738DFFC0000000A3D40FFF63EAEFFF62F0E0697FFFFFFEC4EB952
S224FC7D4000FCC706588F603A4A790003260C66322EBC00FD04024EB900FC06143E80025727
S224FC7D6000FD2F3C00FD04024EB900FC061E588F33FC00010003260C13F90001B9DA000183
S224FC7D80B9DC4EB900FC05246000FE604E5E4E754E56FEF82EBC0001AC764EB900FC0570D5
S224FC7DA02EBC0001AC764EB900FC057E2EBC00012F3C0001AC763F3C00014EB900FC058C96
S224FC7DC05C8F33EE00080001F7CE2F3C000000002F3C403000002F39000326224EB900FCDC
S224FC7DE0DD2A588F2F012F004EB900FCD69EDFFC0000010675C2F3C000000002F3C4035C5
S224FC7E0000002F3C000000002F3C402000002F39000326224EB900FCDD2A588F2F012F0038
S224FC7E204EB900FCD550DFFC000000102F012F004EB900FCD820DFFC000000102F012F008A
S224FC7E404EB900FCD998508FD07C00223D40FEFC60063D7C0022FEFC3EBC00024EB900FCAF
S224FC7E600A7A33FC00300001B9EE4AB90001B67867243EBC0001302EFEFC02800000FFFFE6
S224FC7E80D0B90001B6802F004EB900FC09C8588F42B90001B6784AB90001B67C67243EBC52
S224FC7EA000002302EFEFC02800000FFFFD0B90001B6842F004EB900FC09C8588F42B900013D
S224FC7EC0B67C3EBC01002F0E0697FFFFFEFE3F3C00124EB900FC087E5C8F3D40FFFE4A6E6D
S224FC7EE0FFFE6F123EAEFFFE2F0E0697FFFFFEFE61000330588F2E8E0697FFFFFEFE610017
S224FC7F0004A03D40FFFE4A6EFFFE6F123EAEFFFE2F0E0697FFFFFEFE6100055C588F0C6E2C
S224FC7F20FFFFFFFE67080C6EFFFEFFFE66501D7C0045FEFE10390002D7E048805340807C79
S224FC7F4000030488 01D40FEFF3EBC00082F3C00FF153C2F0E0697FFFFFF004EB900FC4022D5
S224FC7F60508F3EBC000A2F0E0697FFFFFEFE3F3C00113F3C00014EB900FC076C508F3EBCF2
S224FC7F8001002F0E0697FFFFFEFE3F3C00134EB900FC087E5C8F3D40FFFE4A6EFFFE6F1259
S224FC7FA03EAEFFFE2F0E0697FFFFFEFE6100016A588F4EB900FC05246000FEB04E5E4E75A7
S224FC7FC04E56FFE63EBC00023F3C001B3F3C00033F3C001B2F3C00FF15462F0E0697FFFFD4
S224FC7FE0FFEA4EB900FCDDECDFFC0000000E2E8E0697FFFFFFEA4EB900FCF0923E802F0E22
S224FC80000697FFFFFFEA4EB900FCC7065A8F303900032AF6E3403E803F3C00053F3C001BA1
S224FC80202F3C00FF15502F0E0697FFFFFFEA4EB900FCDDECDFFC0000000C2E8E0697FFFFA5
S224FC8040FFEA4EB900FCF0923E802F0E0697FFFFFFEA4EB900FCC706588F0C790001 0001F4
S224FC8060F7CE66243EBC008A3F3C001B2F3C00FF155C2F0E0697FFFFFFEA4EB900FCDDEC2E
S224FC8080DFFC0000000A60223EBC008B3F3C001B2F3C00FF15622F0E0697FFFFFFEA4EB9B4
S224FC80A000FCDDECDFFC0000000A2E8E0697FFFFFFEA4EB900FCF0923E802F0E0697FFFF8A
S224FC80C0FFEA4EB900FCC706588F3EBC00043F3C001B2F3C00FF15682F0E0697FFFFFFEAC3
S224FC80E04EB900FCDDECDFFC0000000A2E8E0697FFFFFFEA4EB900FCF0923E802F0E069771
S224FC8100FFFFFFEA4EB900FCC706588F33FC00310001B9EE4E5E4E754E56FFF4206E00081C
S224FC81200C2800490001663E206E00081028000348804 8C060146100FE8860266100 0456DF
S224FC8140602061000 40A601A6018B0BC0000004967E4B0BC0000005367E8B0BC000000546F
S224FC816067DA600000BA206E0008102800014880 48C0600000964EB900FC4154600000A076
S224FC81804EB900FC492660000096206E00081028000248804 8C0604E4EB900FC4228605605
S224FC81A0206E00080C2800510004 66303EBC00022F2E00085A972F0E5D974EB900FC40BE85
S224FC81C0508F2E8E5D974EB900FCEFA03D40FFF83EAEFFF84EB900FC049A60064EB900FC1C
S224FC81E04D6C601260 10B0BC0000005367AAB0BC0000005467AA60264EB900FC470A601EEA
S224FC82004EB900FC076A60166014207C00FF150C7205B09857C9FFFC206800144ED04E5E03
S224FC82204E754E56FFE848E707041EEFFEC2D48FFE842467E04600000DE206E000832072C
S224FC824048C110301800488048C0600000AA206EFFE810BC001B52AEFFE8206EFFE810BC5E
S224FC8260008C52AEFFE8206EFFE810BC001B52AEFFE8206EFFE810BC008852AEFFE8600037
S224FC82800094206EFFE810BC001B52AEFFE8206EFFE810BC00AD52AEFFE8206EFFE810BC10
S224FC82A0001B52AEFFE8206EFFE810BC008852AEFFE86060206EFFE810BC002052AEFFE803
S224FC82C0206EFFE810BC002052AEFFE86046206EFFE83247D3EE0008109152AEFFE8206EE2
S224FC82E00008320748C1103018004880C07C000FDC406020601EB0BC0000005367B6B0BC66
S224FC830000000000596700FF7CB0BC0000005A6700FF3E60BA5247BE6E000C6D00FF1E0C2E08
S224FC8320001BFFEC663E48C68DFC000A4846700A90463C0048C68DFC000A48463006807C76
S224FC83400030226EFFE8128052AEFFE8206EFFE810BC001B52AEFFE8206EFFE810BC0089EF
S224FC836052AEFFE8206EFFE810BC000D52AEFFE8206EFFE842102E8E0697FFFFFFEC4EB9D0
S224FC838000FCF0923E802F0E0697FFFFFFEC4EB900FCC706588F4A9F4CDF00C04E5E4E75E3

Mar-16-99 02:19pm From-MILLEN, WH. , ZELANO & BRANIGAN 7032436410 T-713 P.19/38 F-776

S224FC83A04E56FFF46060002EFFFC488032790001BA08D3FC0001BA0A128052790001BA082C
S224FC83C00CAEFFFFFFFEFFFC660C42790001BA0870FE6000009E0C7900080001BA08660C56
S224FC83E042790001BA0870FF60000088202EFFFC4880B07C000A672A0C7900030001B9EE71
S224FC840067200C7900020001B9EE671642974EB900FC06CE48C02D40FFFCB08CFFFFFFFF70
S224FC84206684202EFFFC4880B07C000A67140C7900030001B9EE670A0C7900020001B9EE61
S224FC8440662E2EB90001BA082F3C0001BA0A2F2E00084EB900FC40BE508F2D790001BA08DF
S224FC8460FFF842790001BA08202EFFF86004600242404E5E4E754E56FFFC30390001B9EECA
S224FC848048C0600000A4206E00080C100045664E206E000810BC004510390002D7E04880B3
S224FC84A05340807C0030226E0008134000013EBC00062F3C00FF156E2F2E000854974EB9CC
S224FC84C000FC4022508F3EBC00082F2E00083F3C00113F3C00014EB900FC076C508F206E0C
S224FC84E000080C100041661C0C7900010001B9F266123EB90001B9F02F3C0001B9F46100CF
S224FC8500FD22588F603C3EAE000C2F2E0008610000DE588F602C3EAE000C2F2E00086100EB
S224FC85200168588F601C601AB0BC000000306700FF56B0BC0000003167CCB0BC000000322E
S224FC854067D433FC00300001B9EE4E5E4E754E56FFF43EBC00043F3C001B2F3C00FF157649
S224FC85602F0E51974EB900FCDDECDFFC0000000A2E8E51974EB900FCF0923E802F0E519718
S224FC85804EB900FCC706588F33FC00320001B9EE4E5E4E754E56FFFA33FC00010001B9F232
S224FC85A0302E000C5F4033C00001B9F03EB90001B9F02F2E000858972F3C0001B9F84EB9FB
S224FC85C000FC40BE508F426EFFFE60163EB90001B9F02F3C0001B9F46100FC48588F526E98
S224FC85E0FFFE0C6E0009FFFE6DE24E5E4E754E56FFF01D7C0049FFF710390002D7E048800A
S224FC86005340807C003048801D40FFF81D7C0049FFF91D7C0006FFFA206E00080C10005901
S224FC86206618206E00080C28005900016712206E00080C28003000026706 1D7C0015FFFA0E
S224FC86403EBC00023F3C00042F0E0697FFFFFFF62F0E0697FFFFFFF74EB900FCC738DFFC36
S224FC86600000000A3D40FFF43EAEFFF42F0E0697FFFFFFF63F3C00133F3C00014EB900FCC6
S224FC8680076C508F4E5E4E754E56FFEE1D7C0049FFF510390002D7E048805340807C003038
S224FC86A048801D40FFF61D7C0053FFF7206E00081D50FFF8206E00081D680001FFF9206E31
S224FC86C000081D680002FFFA3EBC00023F3C00062F0E0697FFFFFFF42F0E0697FFFFFFF5FD
S224FC86E04EB900FCC738DFFC0000000A3D40FFF23EAEFFF22F0E0697FFFFFFF43F3C0013EE
S224FC87003F3C00014EB900FC076C508F4E5E4E754E56FFFC302E000848C0603E4A790001A9
S224FC8720F7D867084EB900FC0524600A33FC00010001F7D8603460E460304A790001F7DC65
S224FC874067084EB900FC0524600A33FC00010001F7DC601660E46012601 0B0BC0000000106
S224FC876067BAB0BC0000000267D04E5E4E754E56FEF82EBC0001AC764EB900FC05702EBC8A
S224FC87800001AC764EB900FC057E3EBC00012F3C0001AC763F3C00024EB900FC058C5C8FAA
S224FC87A03EBC0001BA8A4EB900FC79F42F3C41A800002F39000326224EB900FCDC7C508FD8
S224FC87C02F004EB900FCDD52588F3D40FEFC3EBC00024EB900FC0A7A33FC00300001BA8CB0
S224FC87E03EBC010042672F0E0697FFFFFEFE4EB900FC40925C8F2E8E0697FFFFFEFE4EB9E6
S224FC880000FCC8003D40FFFE4A6EFFFE6F143EAEFFFE2F0E0697FFFFFEFE610000FE588FDE
S224FC882060580C6EFFFEFFFE66501D7C0045FEFE10390002D7E048805340807C003048802A
S224FC88401D40FEFF3EBC00082F3C00FF163C2F0E0697FFFFFF004EB900FC4022508F3EBCEA
S224FC8860000A2F0E0697FFFFFEFE3F3C00113F3C00014EB900FC076C508F3EBC01002F0E84
S224FC888006 97FFFFFEFE3F3C00134EB900FC087E5C8F3D40FFFE4A6EFFFE6F123EAEFFFEA5
S224FC88A02F0E0697FFFFFEFE6100033C588F4AB90001B67867303EBC0001302EFEFC0280BE
S224FC88C00000FFFFD0B90001B6802F004EB900FC09C8588F2EB90001B6784EB900FC4EE4A4
S224FC88E042B90001B6784AB90001B67C67243EBC0002302EFEFC02800000FFFFD0B900013E
S224FC8900B6842F004EB900FC09C8588F42B90001B67C6000FECC4E5E4E754E56FEF0303970
S224FC89200001BA8C48C0600002963EAE000C2F2E0008610005E4588F600002A01D7C005274
S224FC8940FF8010390002D7E048805340807C003048801D40FF8130390001BA8C48801D4094
S224FC8960FF82206E00081028000148801D40FF83B07C00156634206E00081D680002FF8484
S224FC89803EBC00023F3C00052F0E0697FFFFFEF62F0E0697FFFFFF804EB900FCC738DFFC5A
S224FC89A00000000A3D40FEF460283EBC00023F3C00042F0E0697FFFFFEF62F0E0697FFFF96
S224FC89C0FF804EB900FCC738DFFC0000000A3D40FEF43EAEFEF42F0E0697FFFFFEF63F3C9C
S224FC89E000133F3C00014EB900FC076C508F600001EA1D7C0052FF8010390002D7E0488013
S224FC8A005340807C003048801D40FF8130390001BA8C48801D40FF82206E00081D6800017F
S224FC8A20FF831D7C0030FF84206E00080C280006000166 4233F900032A860003260A33F9B0
S224FC8A4000032AD600032A5233F900032AF20002D7DE33F900032A820002464E33F90003F1
S224FC8A60260E0003260433F900032AE400032AD41D7C0052FF843EBC00023F3C00052F0E2F
S224FC8A800697FFFFFEF62F0E0697FFFFFF804EB900FCC738DFFC0000000A3D40FEF43EAEAD
S224FC8AA0FEF42F0E0697FFFFFEF63F3C00133F3C00014EB900FC076C508F6000011E3EAE2D
S224FC8AC0000C2F2E0008610005F0588F6000010C1D7C0052FF8010390002D7E048805340B3
S224FC8AE0807C003048801D40FF811D7C0037FF823D7C0003FEF4306EFEF4D1CE326EFEF4E4
S224FC8B005549D3EE00081151FF80306EFEF4D1CE0C280003FF806706526EFEF460D83EBCD6
S224FC8B2000023F2EFEF42F0E0697FFFFFEF62F0E0697FFFFFF804EB900FCC738DFFC0000D3
S224FC8B40000A3D40FEF43EAEFEF42F0E0697FFFFFEF63F3C00133F3C00014EB900FC076C71
S224FC8B60508F60761D7C0001FF801D7C0058FF811D7C0030FF823EBC00023F2EFEF42F0ED3
S224FC8B800697FFFFFEF62F0E0697FFFFFF804EB900FCC738DFFC0000000A3D40FEF43EAEAC
S224FC8BA0FEF42F0E0697FFFFFEF63F3C00133F3C00014EB900FC076C508F601E601C90BC51
S224FC8BC000000030B0BC000000076298E5802040D1FC00FF157C20504ED033FC00300001E7

```
S224FC8BE0BA8C4E5E4E754527FFCA206E00080C280052000166001B54206E000810280003A8
S224FC8C00488048C06000022C6100081833FC00320001BA8C600002303EAE000C2F2E0008DD
S224FC8C2061000854588F33FC00350001BA8C600002163EAE000C2F2E00086100061A588FA7
S224FC8C4033FC00310001BA8C600001FC610007FE33FC00340001BA8C600001EC61000866E3
S224FC8C6033FC00370001BA8C600001DC610011E81D7C0052FFEA10390002D7E0488053407E
S224FC8C80807C003048801D40FFEB1D7C0049FFEC1D7C0006FFED3EBC00023F3C00042F0E88
S224FC8CA00697FFFFFFD62F0E0697FFFFFFEA4EB900FCC738DFFC0000000A3D40FFFE3EAE35
S224FC8CC0FFFE2F0E0697FFFFFFD63F3C00133F3C00014EB900FC076C508F6000016A61005E
S224FC8CE0080E600001623EAE000C2F2E000861000BC4588F600001503EAE000C2F2E000818
S224FC8D0061000CBC588F6000013E206E00080C28003000046 61E206E00080C2800300005 22
S224FC8D206612206E00081028000648803E8061001312600E3EAE000C2F2E000861000D6E33
S224FC8D40588F1D7C0052FFEA10390002D7E048805340807C003048801D40FFEB1D7C0043E3
S224FC8D60FFEC1D7C0006FFED3EBC00023F3C00042F0E0697FFFFFFD62F0E0697FFFFFFEA93
S224FC8D804EB900FCC738DFFC0000000A3D40FFFE3EAEFFFE2F0E0697FFFFFFD63F3C00134D
S224FC8DA03F3C00014EB900FC076C508F600000986100100C600000902EBC0001BA8A4EB946
S224FC8DC000FC79F41D7C0052FFEA10390002D7E048805340807C003048801D40FFEB1D7C24
S224FC8DE00045FFEC1D7C0006FFED3EBC00023F3C00042F0E0697FFFFFFD62F0E0697FFFFB7
S224FC8E00FFEA4EB900FCC738DFFC0000000A3D40FFFE3EAEFFFE2F0E0697FFFFFFD63F3CF6
S224FC8E2000133F3C00014EB900FC076C508F60166014207C00FF159C720CB09857C9FFFC36
S224FC8E40206800304ED0600000CC206E00081028000148804 8C0600000A84EB900FC4154D0
S224FC8E60600000B24EB900FC41CC600000A84EB900FC49266000009E206E00081028000287
S224FC8E80488048C060564EB900FC4228605E206E00080C28005100046638 3EBC00022F2E0A
S224FC8EA000085A972F0E0697FFFFFFD04EB900FC40BE508F2E8E0697FFFFFFD04EB900FC08
S224FC8EC0EFA02D40FFCE3EAEFFCE4EB900FC049A60064EB900FC4D6C601260100B0BC0000EE
S224FC8EE0005367A2B0BC0000005467A260264EB900FC470A601E4EB900FC076A6016601496
S224FC8F00207C00FF16047206B09857C9FFFC206800184ED04E5E4E754E56FF6048E707005A
S224FC8F20306E000CD1EE000842101D7C0044FF8010390002D7E048805340807C00304880C0
S224FC8F401D40FF814EB900FC4F0E02800000FFFF3D40FF822D7CFFFFFFFFFF86422EFF8A43
S224FC8F603EBC00093F3C00202F0E0697FFFFFF8B4EB900FC40935C8F1D7C0015FF8B3EAE0C
S224FC8F80000C55572F2E000852972F0E0697FFFFFF944EB900FC4022508F4247600E3047AD
S224FC8FA0D1EE00080C10001567085247BE6E000C6DEC3047D1EE00080C1000156676206E46
S224FC8FC00008320748C11030180148804 8C02040223C00FF13A01030180048 80C07C00173A
S224FC8FE067501D7C0045FF7010390002D7E048805340807C003048801D40FF713EBC00094B
S224FC90002F3C00FF16462F0E0697FFFFFF724EB900FC4022508F3EBC000B2F0E0697FFFF1F
S224FC9020FF703F3C00113F3C00014EB900FC076C508F605A303900032604C07C000F66184A
S224FC90403EB900032A522F2E00084EB900FCAB44588F2D40FF6260062D6E0008FF624AAE2B
S224FC9060FF62672A2E8E0697FFFFFF8A2F0E0697FFFFFF862F0E0697FFFFFF8B2F2EFF62A0
S224FC90804EB900FCAA02DFFC0000000C3E003EAE000C065700122F0E0697FFFFFF803F3CC2
S224FC90A000123F3C00014EB900FC076C508F4A9F4CDF00C04E5E4E754E56FFBA3EBC002012
S224FC90C03F3C00302F0E0697FFFFFFDE4EB900FC40925C8F1D7C0052FFDF10390002D7E0A4
S224FC90E048805340807C003048801D40FFE01D7C0034FFE130390001BA8A48C081FC03E819
S224FC9100807C003048801D40FFE230390001BA8A48C081FC006448C081FC000A4840807C72
S224FC912000304880 1D40FFE330390001BA8A48C081FC000A48C081FC000A4840807C003077
S224FC914048801D40FFE4206E00081D680002FFE5206E00081D680003FFE6206E00081D68E7
S224FC916000004FFE8206E00081D680005FFE9206E00081D680008FFEE206E00081D680007C9
S224FC9180FFF0206E00081D680006FFF2206E00081D680009FFF5206E00080C28004C000996
S224FC91A066061D7C0031FFF5206E00080C2800300009660C30390002D7DE48801D40FFF5D6
S224FC91C030390002464E48801D40FFF630390003260448801D40FFF7206E00081D68000A9F
S224FC91E0FFF8102EFFF0488033C000032A52102EFFEE488033C00003260A102EFFF54880FD
S224FC920033C00002D7DE33FC003000032AD43EBC00023F3C00192F0E0697FFFFFFBE2F0EE1
S224FC92200697FFFFFFDF4EB900FCC738DFFC0000000A3D40FFFE3EAEFFFE2F0E0697FFFF92
S224FC9240FF8E3F3C00133F3C00014EB900FC076C508F4E5E4E754E56FFE0426EFFE81D7CCF
S224FC92600001FFF41D7C0031FFF5206E00081D680007FFF6206E00081D680008FFF7206E7D
S224FC928000081D68000AFFF8206E00081D68000BFFF9206E00081D680014FFFA206E000863
S224FC92A01D680012FFFB206E00081D680011FFFC206E00080C280031001766081D7C004C90
S224FC92C0FFFD600A206E00081D680017FFFD206E00080C280030001966061D7C0030FFFDB5
S224FC92E01D7C0004FFFE2E8E0697FFFFFFE82F2E000858973F3C00034EB900FCC9405C8FCC
S224FC9300B07C00016622302EFFE8C1FC000A3D40FFE82EBC0001BA8A3F2EFFE84EB900FCA1
S224FC93207930548F3D40FFE60C6E0001FFE66670206E000810280012488033C000032AD66A
S224FC9340206E000810280011488033C000032A86206E000810280017488033C000032AF200
S224FC9360206E000810280018488033C000032A82206E000810280019488033C00003260EC3
S224FC938033FC003000032AE43EBC000B2F0E0697FFFFFF444EB900FCC706588F6000008 0F5
S224FC93A01D7C0052FFEA10390002D7E048805340807C003048801D40FFEB30390001BA8C90
S224FC93C048801D40FFEC1D7C0015FFED1D7C0045FFEE3EBC00023F3C00052F0E0697FFFFC3
S224FC93E0FFF42F0E0697FFFFFFEA4EB900FCC738DFFC0000000A3D40FFE43EAEFFE42F0E65
S224FC94000697FFFFFFF43F3C00133F3C00014EB900FC076C508F33FC00300001BA8C4E5E0C
```

S224FC94204E754E56FFFA107C0001FFFC1D7C0032FFFD1D7C0080FFFE3EBC00032F0E5997AD
S224FC94404EB900FCC706588F4E5E4E754E56FFF81D7C0001FFFC1D7C0034FFFD1D7C00044F
S224FC9460FFFE3EBC00032F0E59974EB900FCC706588F4E5E4E754E56FEFC1D7C0001FF0067
S224FC94803EAE000C5D572F3E000856972F0E0697FFFFFF014EB900FC4022508F306E000C07
S224FC94A05848D1CE117C0004FF003EAE000C59572F0E0697FFFFFF004EB900FCC706588FA3
S224FC94C04E5E4E754E56FFF81D7C0001FFFC1D7C0037FFFD1D7C0004FFFE3EBC00032F0E4C
S224FC94E059974EB900FCC706588F4E5E4E754E56FE744257610000A8E3EBC00803F3C003583
S224FC95002F0E0697FFFFFF784EB900FC40925C8F426EFFFE60163EBC00802F0E0697FFFFC6
S224FC9520FF7861000CD8588F526EFFFE0C6E0200FFFE6DE2426EFFF842576100A48426E5F
S224FC9540FFFE6000014E3EBC00802F0E0697FFFFFF7861000BFE588F426EFFFC6000012612
S224FC9560306EFFFCD1CE0C280035FF78670001125 26EFFF8302EFFF8B07C03E86D000102C5
S224FC95801D7C0052FEF810390002D7E048805340807C003048801D40FEF91D7C004DFEFA66
S224FC95A01D7C0015FEFB302EFFFE48C081FC0064807C003048801D40FEFC302EFFFE48C011
S224FC95C081FC006448404 8C081FC000A807C003048801D40FEFD302EFFFE48C081FC000A5C
S224FC95E04840807C003048801D40FEFE302EFFFC48C081FC0064807C003048801D40FEFF05
S224FC9600302EFFFC48C081FC006448404 8C081FC000A807C003048801D40FF00302EFFFC47
S224FC962048C081FC000A4840807C003048801D40FF011D7C0035FF023EBC00023F3C000B70
S224FC96402F0E0697FFFFFE782F0E0697FFFFFEF84EB900FCC738DFFC0000000A3D40FFFA90
S224FC96603EAEFFFA2F0E0697FFFFFE783F3C00133F3C00014EB900FC076C508F600002 3 2EC2
S224FC9680526EFFFC0C6E0080FFFC6D00FED4526EFFFE0C6E0200FFFE6D00FEAC425761 00 93
S224FC96A008E43EBC00803F3C003A2F0E0697FFFFFF784EB900FC40925C8F426EFFFE60165C
S224FC96C03EBC00802F0E0697FFFFFF7861000B2E588F526EFFFE0C6E0200FFFE6DE2426E0A
S224FC96E0FFF8425761000 89E426EFFFE6000014E3EBC00802F0E0697FFFFFF7861000A54EE
S224FC970058 8F426EFFFC6000012630 6EFFFCD1CE0C28003AFF78670001125 26EFFF8302E83
S224FC9720FFF8B07C03E86D0001021D7C0052FEF810390002D7E048805340807C0030488078
S224FC97401D40FEF91D7C004DFEFA1D7C0015FEFB302EFFFE48C081FC0064807C00304880F7
S224FC97601D40FEFC302EFFFE48C081FC006448404 8C081FC000A807C003048801D40FEFDEA
S224FC9780302EFFFE48C081FC000A4840807C003048801D40FEFE302EFFFC48C081FC0064C7
S224FC97A0807C003048801D40FEFF302EFFFC48C081FC006448404 8C081FC000A807C0030D5
S224FC97C048801D40FF00302EFFFC48C081FC000A4840807C003048801D40FF011D7C0041C9
S224FC97E0FF023EBC00023F3C000B2F0E0697FFFFFE782F0E0697FFFFFEF84EB900FCC738C7
S224FC9800DFFC0000000A3D40FFFA3EAEFFFA2F0E0697FFFFFE783F3C00133F3C00014EB9A8
S224FC982000FC076C508F600000885 26EFFFC0C6E0080FFFC6D00FED4526EFFFE0C6E0200C9
S224FC9840FFFE6D00FEAC1D7C0052FEF810390002D7E048805340807C003048801D40FEF96D
S224FC98601D7C004DFEFA1D7C0006FEFB3EBC00023F3C00042F0E0697FFFFFE782F0E0697CE
S224FC9880FFFFFEF84EB900FCC738DFFC0000000A3D40FFFA3EAEFFFA2F0E0697FFFFFE7843
S224FC98A03F3C00133F3C00014EB900FC076C508F4E5E4E754E56FEE0426EFEE6426EFEE431
S224FC98C06052302EFEE6E9483D40FEE6306EFEE4D1EE00080C28004100046D1C206E000822
S224FC98E0322EFEE448C1103018044880 5F40C07C000FD16EFEE6601820 6E0008322EFEE49B
S224FC990048C1103018044880C07C000FD16EFEE6526EFEE40C6E0004FEE46DA64A6EFEE6FA
S224FC992066083EAEFEE661000 65C3EBC00802F0E0697FFFFFF7861000 81A588F1D7C005204
S224FC9940FF7410390002D7E048805340807C003048801D40FF751D7C0058FF763EBC00040D
S224FC99602F2E000858972F0E0697FFFFFF774EB900FC4022508F3EBC00023F3C00872F0EC5
S224FC99800697FFFFFEE82F0E0697FFFFFF744EB900FCC738DFFC0000000A3D40FEE43EAEC8
S224FC99A0FEE42F0E0697FFFFFEE83F3C00133F3C00014EB900FC076C508F4E5E4E754E5694
S224FC99C0FFE8426EFFEE426EFFEC6052302EFFEEE9483D40FFEE306EFFECD1EE00080C284B
S224FC99E0004100046D1C206E0008322EFFEC48C1103018044880 5F40C07C000FD16EFFEE74
S224FC9A00601820 6E0008322EFFEC48C1103018044880C07C000FD16EFFEE526EFFEC0C6E23
S224FC9A200004FFEC6DA63EAEFFEE61000 55A3EAE000C0657FFF72F2E000850976100 07BECF
S224FC9A40588F1D7C0052FFF810390002D7E048805340807C003048801D40FFF91D7C0054A9
S224FC9A60FFFA1D7C0006FFFB3EBC00023F3C00042F0E0697FFFFFFF02F0E51974EB900FCE9
S224FC9A80C738DFFC0000000A3D40FFEC3EAEFFEC2F0E0697FFFFFFF03F3C00133F3C0001D1
S224FC9AA04EB900FC076C508F4E5E4E754E56FFFA3EBC00882F3C00FD04064EB900FC061E29
S224FC9AC0588F425761 0004BE1D7C00CFFFFE102EFFFE48803E802F3C00FD04024EB900FC4B
S224FC9AE0061E588F1D7C00CDFFFE102EFFFE48803E802F3C00FD04024EB900FC061E588FBA
S224FC9B00206E0008102800044880 3E800257000F2F3C00FD04004EB900FC061E588F102ECC
S224FC9B20FFFE48803E80005700202F3C00FD04024EB900FC061E588F102EFFFE48803E80ED
S224FC9B402F3C00FD04024EB900FC061E588F206E00081028000548804 8C0600002401D7CAA
S224FC9B6000CEFFFE102EFFFE48803E802F3C00FD04024EB900FC061E588F103C000C4880BC
S224FC9B803E802F3C00FD04004EB900FC061E588F102EFFFE48803E80005700202F3C00FDEC
S224FC9BA004024EB900FC061E588F102EFFFE48803E802F3C00FD04024EB900FC061E588F53
S224FC9BC02EBC00000024EB900FC0542103C000448803E802F3C00FD04004EB900FC061EE5
S224FC9BE0588F102EFFFE48803E80005700202F3C00FD04024EB900FC061E588F102EFFFE8E
S224FC9C0048803E802F3C00FD04024EB900FC061E588F1D7C00CFFFFE102EFFFE48803E801B
S224FC9C202F3C00FD04024EB900FC061E588F1D7C00C0FFFE102EFFFE48803E802F3C00FD28
S224FC9C4004024EB900FC061E588F6000016E1D7C00CEFFFE102EFFFE48803E802F3C00FD93

S224FC9C6004024EB900F0001E588F42572F3C00FD04004EB90010061E588F102EFFFE4880B9
S224FC9C803E80005700202F3C00FD04024EB900FC061E588F102EFFFE48803E802F3C00FDE9
S224FC9CA004024EB900FC061E588F2EBC00000024EB900FC05421D7C00CFFFFE102EFFFEB9
S224FC9CC048803E802F3C00FD04024EB900FC061E588F1D7C0050FFFE102EFFFE48803E80DA
S224FC9CE02F3C00FD04024EB900FC061E588F600000CA1D7C00CFFFFE102EFFFE48803E8097
S224FC9D002F3C00FD04024EB900FC061E588F103C000348803E802F3C00FD04004EB900FC82
S224FC9D20061E588F102EFFFE48803E80005700202F3C00FD04024EB900FC061E588F102E25
S224FC9D40FFFE48803E802F3C00FD04024EB900FC061E588F2EBC00000024EB900FC0542CC
S224FC9D601D7C00CFFFFE102EFFFE48803E802F3C00FD04024EB900FC061E588F1D7C005057
S224FC9D80FFFE102EFFFE48803E802F3C00FD04024EB900FC061E588F6020601EB0BC00001E
S224FC9DA000316700FDBAB0BC000000326700FEA0B0BC000000336700FF3A4E5E4E754E565E
S224FC9DC0FFE61D7C0052FFF610390002D7E048805340807C003048801D40FFF71D7C00423E
S224FC9DE0FFF82EBC00FD04044EB900FC0614488013C00001BA8E10390001BA8E4880C07CE5
S224FC9E000040EC40807C003048801D40FFF93EBC00023F3C00042F0E0697FFFFFFEC2F0E11
S224FC9E200697FFFFFFF64EB900FCC738DFFC0000000A3D40FFEA3EAEFFEA2F0E0697FFFF97
S224FC9E40FFEC3F3C00133F3C00014EB900FC076C508F4E5E4E754E56FFFA3EBC00882F3CBE
S224FC9E6000FD04064EB900FC061E588F1D7C00CFFFFE102EFFFE48803E802F3C00FD040238
S224FC9E804EB900FC061E588F1D7C00CDFFFE102EFFFE48803E802F3C00FD04024EB900FC1E
S224FC9EA0061E588F42572F3C00FD04004EB900FC061E588F102EFFFE48803E80005700204B
S224FC9EC02F3C00FD04024EB900FC061E588F102EFFFE48803E802F3C00FD04024EB900FCD3
S224FC9EE0061E588F1D7C00CEFFFE102EFFFE48803E802F3C00FD04024EB900FC061E588FB5
S224FC9F003EBC00072F3C00FD04004EB900FC061E588F102EFFFE48803E80005700202F3C22
S224FC9F2000FD04024EB900FC061E588F102EFFFE48803E802F3C00FD04024EB900FC061EB9
S224FC9F40588F1D7C00CFFFFE102EFFFE48803E802F3C00FD04024EB900FC061E588F4257DE
S224FC9F602F3C00FD04004EB900FC061E588F3EBC00402F3C00FD04024EB900FC061E588FB0
S224FC9F804E5E4E754E56FFF61D7C00CFFFFC102EFFFC48803E802F3C00FD04024EB900FC25
S224FC9FA0061E588F426EFFFA60000086302E0008322EFFFAE541E268C07C000F48801D4067
S224FC9FC0FFFE302EFFFA807C00C848801D40FFFC102EFFFC48803E802F3C00FD04024EB914
S224FC9FE000FC061E588F102EFFFE48803E802F3C00FD04004EB900FC061E588F102EFFFCE5
S224FCA00048803E80005700202F3C00FD04024EB900FC061E588F102EFFFC48803E802F3C9C
S224FCA02000FD04024EB900FC061E588F526EFFFA0C6E0004FFFA6D00FF746100FE1A4E5ED9
S224FCA0404E754E56FFF642576100FF3A1D7C00CFFFFA102EFFFA48803E802F3C00FD0402E4
S224FCA0604EB900FC061E588F1D7C00CEFFFA102EFFFA48803E802F3C00FD04024EB900FC43
S224FCA080061E588F3EBC00012F3C00FD04004EB900FC061E588F102EFFFA48803E8000572B
S224FCA0A000202F3C00FD04024EB900FC061E588F1D7C00CFFFFA102EFFFA48803E802F3C7A
S224FCA0C000FD04024EB900FC061E588F1D7C00C0FFFA102EFFFA48803E802F3C00FD0402F1
S224FCA0E04EB900FC061E588F102E0009024000FF3E800257000F2F3C00FD04004EB900FC34
S224FCA10061E588F42AEFFFC6034102EFFFA48803E80005700202F3C00FD04024EB900FC0F
S224FCA120061E588F102EFFFA48803E802F3C00FD04024EB900FC061E588F52AEFFFC202E91
S224FCA140FFFCB0BC000100006DC06100FD0A4E5E4E754E56FFF81D7C00CFFFFC102EFFFC5B
S224FCA16048803E802F3C00FD04024EB900FC061E588F6100FCE21D7C0040FFFC102EFFFC90
S224FCA18048803E802F3C00FD04024EB900FC061E588F426EFFFE6056102EFFFC48803E809A
S224FCA1A0005700202F3C00FD04024EB900FC061E588F102EFFFC48803E802F3C00FD04027E
S224FCA1C04EB900FC061E588F2F2E00082F3C00FD04004EB900FC0614588FC07C000F807C54
S224FCA1E00020225F128052AE0008526EFFFE302EFFFEB06E000C65A04E5E4E754E56FFF8C2
S224FCA2001D7C00CFFFFC102EFFFC48803E802F3C00FD04024EB900FC061E588F1D7C00CE38
S224FCA220FFFC102EFFFC48803E802F3C00FD04024EB900FC061E588F3EBC00012F3C00FD84
S224FCA24004004EB900FC061E588F102EFFFC48803E80005700202F3C00FD04024EB900FC44
S224FCA260061E588F1D7C00CFFFFC102EFFFC48803E802F3C00FD04024EB900FC061E588F34
S224FCA2801D7C00C0FFFC102EFFFC48803E802F3C00FD04024EB900FC061E588F426EFFFE81
S224FCA2A06054206E0008101048803E800657FFD02F3C00FD04004EB900FC061E588F52AE07
S224FCA2C00008102EFFFC48803E80005700202F3C00FD04024EB900FC061E588F102EFFFC8A
S224FCA2E048803E802F3C00FD04024EB900FC061E588F526EFFFE302EFFFEB06E000C65A212
S224FCA3006100FB544E5E4E754E56FF6C48E7030030390002464EC07C000F3D40FFFC3EAE2E
S224FCA32000182F2E00082F0E0697FFFFFF7A4EB900FC4022508F2E8E0697FFFFFF6C2F0E0B
S224FCA3400697FFFFFF7A2F0E0697FFFFFF6E6100015E508F3D40FFFE4A6EFFFE66064240E7
S224FCA3606000001420C2E0001FF6C662E306E00185748D1EE00080C10004266140C39003195
S224FCA38000032B00660A206E001410BC00026008206E001410BC0001602A306E00185748F8
S224FCA3A0D1EE00080C10004266140C39003100032B00660A206E001410BC00036006206E84
S224FCA3C0001442100C79000100032AE266000088302EFFFCD079000246525340B06EFFFEA9
S224FCA3E06F064240600000BE424760183047D1CE326EFFFC53493447D3CAD3CE1169FF6E59
S224FCA400FF6E5247BE79000246526DE0600C3047D1CE117C0030FF6E5247BE7C00096DEE34
S224FCA420422EFF772E8E0697FFFFFF6E4EB900FCF00C2F00206E0010209F3EB90002465255
S224FCA4402F0E0697FFFFFF6E2F2E000C4EB900FC4022508F604A3E2EFFFE600C3047D1CE74
S224FCA460117C0030FF6E5247BE7C00096DEE422EFF772E8E0697FFFFFF6E4EB900FCF00CD1
S224FCA4802F00206E0010209F3EAEFFFE2F0E0697FFFFFF6E2F2E000C4EB900FC4022508F54

S224FCA4A0302EFFFE4A9F48FF00804E5E4E754E56FFFC4BE7070896FC00200001BA9013FCDF
S224FCA4C000020001BA9113FC00030001BA9213FC007F0001BA9313FC002A0001BA9413FC5B
S224FCA4E0002D0001BA9513FC002A0001BA9613FC00420001BA9742390001BA980C7900302E
S224FCA5000003260A66047C0160024246303900032AD4D07CFFD03206B340670A2EAE000C2D
S224FCA5204EB900FC3EF6206E001042100C79003100002D7DE660E3D7C0001FFFE3D7C00059D
S224FCA540FFFC60120426EFFFE30390002D7DEC07C000F3D40FFFC2EBC0001BA902F2E000C5F
S224FCA5604EB900FC3F1C588F23C00001BA9A42B90001BA9E600004762EB90001BA9A4EB9EC
S224FCA58000FCF0923E004A6EFFFE67000218BE7C0005660002103EBC00052F390001BA9A55
S224FCA5A04EB900FCC6C4588F4A40662423F90001BA9A0001BA9E2EBC0001BA9042A74EB923
S224FCA5C000FC3F1C588F23C00001BA9A6000041E4A46670000F02EB90001BA9A4EB900FC5C
S224FCA5E03EF62EB90001BA9A2F2E00084EB900FCF0B6588F4AB90001BA9E660E2EAE000841
S224FCA6004EB900FCF092600003F02EB90001BA9E4EB900FCF092B07C0004660000A43EBC68
S224FCA62000042F390001BA9E4EB900FCC6C4588F4A4067362EB90001BA9E4EB900FC3EF642
S224FCA6402EB90001BA9E2F2E00084EB900FC3FEA588F206E001010BC00012EAE00084EB9EB
S224FCA66000FCF09260000392605610390003 2AFB488048C060302EAE00084EB900FCF09276
S224FCA6806000037660 3A206E001010BC00012EAE00084EB900FCF0926000035E60224240AD
S224FCA6A060000356601AB0BC0000000167CAB0BC0000000267D0B0BC0000000367E060DE31
S224FCA6C0600000E32EB90001BA9A2F2E00084EB900FCF0B6588F3EBC0001BA9042A74EB9E1
S224FCA6E000FC3F1C588F23C00001BAA22EB90001BAA24EB900FCF092B07C000466000098E4
S224FCA7003EBC00042F390001BAA24EB900FCC6C4588F4A40672A2EB90001BAA22F2E00083D
S224FCA7204EB900FC3FEA588F206E001010BC00012EAE00084EB900FCF092600002BC60565D
S224FCA7401039000 33AFB488048C060302EAE00084EB900FCF092600002A0603A206E001084
S224FCA76010BC00012EAE00084EB900FCF092600002886022424060000280601AB0BC0000EC
S224FCA780000167C8B0BC0000000267D0B0BC0000000367E060DE2EAE00084EB900FCF09286
S224FCA7A06000025 64A6EFFFE670000EEBE7C000A660000E64A46670C2EB90001BA9A4EB900
S224FCA7C000FC3EF63EBC00052F390001BA9A4EB900FCC6C4588F4A40670000BE20790001CF
S224FCA7E0BA9A1028000548804 8C0D0BC00FF13A0204008100002660000A020790001BA9A4B
S224FCA80042280005 3EBC00042F390001BA9A5C974EB900FCC6C4588F4A4067202EB90001AD
S224FCA820BA9A5C972F390001BA9A4EB900FC3FEA588F206E001010BC0001603A10390003AF
S224FCA8402AFB488048C06014602C206E001010BC0001602242406000 01A0601AB0BC0000AC
S224FCA860000167E4B0BC0000000267DEB0BC0000000367E060DE2EB90001BA9A2F2E000843
S224FCA8804EB900FCF0B6588F3EB90001BA9A4EB900FCF092600001624A6EFFFE6756BE7CF7
S224FCA8A000096 6504A46670C3EB90001BA9A4EB900FC3EF63EBC00092F390001BA9A4EB99B
S224FCA8C000FCC6C4588F4A40672A206E001010BC00013EB90001BA9A2F2E00084EB900FCE0
S224FCA8E0F0B6588F2EB90001BA9A4EB900FCF09260000 1064A6EFFFE6700007CBE7C0005CB
S224FCA9006F748E7C000A6C6E4A46670C2EB90001BA9A4EB900FC3EF63EBC00052F3900 0157
S224FCA920BA9A4EB900FCC6C4588F4A40674820790001BA9A1028000548804 8C0D0BC00FF8F
S224FCA9401 3A020400810000266 2C2079000 1BA9A4228000 52EB90001BA9A2F3E00084EB932
S224FCA96000FCF0B6588F2EB90001BA9A4EB900FCF092600000844A6EFFFE6650BE6EFFFC16
S224FCA980664A3E872F390001BA9A4EB900FCC6C4588F4A4067324A46670C2EB90001BA9AAE
S224FCA9A04EB900FC3EF62EB90001BA9A2F2E00084EB900FCF0B6588F2EB90001BA9A4EB9EB
S224FCA9C000FCF0926032600442406 02C23F90001BA9A0001BA9E3EBC0001BA9042A74EB905
S224FCA9E000FC3F1C588F23C00001BA9A4AB90001BA9A6600FB844240 4A9F4CDF00C04E5EA1
S224FCAA004E754E56FFEE48E70300303900024 64EC07C000F3D40FFFC3E8E0697FFFFFFEEA9
S224FCAA202F2E00082F0E0697FFFFFFF0610001C4508F3D40FFFE4A6EFFFE660642406000 67
S224FCAA4000FA0C3E0001FFEE660A206E0014108C00016006206E0014421 00C790001000311
S224FCAA602AE266000088202EFFFCD079000246525340B06EFFFE6F064240600000BE424753
S224FCAA8060183047D1CE326EFFFC53493447D3CAD3CE1169FFF0FFF05247BE790002465275
S224FCAAA06DE0600C3047D1CE117C0030FFF05247BE7C00096DEE422EFFF93E8E0697FFFF24
S224FCAAC0FFF04EB900FCF00C2F00206E0010209F3EB9000246522F0E0697FFFFFFF02F2E46
S224FCAAE0000C4EB900FC4022508F604A3E2EFFFE600C3047D1CE117C0030FFF05247BE7CF1
S224FCAB000096DEE422EFFF92E8E0697FFFFFFF04EB900FCF00C2F00206E0010209F3EAEAB
S224FCAB20FFFE2F0E0697FFFFFFF02F2E000C4EB900FC4022508F302EFFFE4A9F4CDF0080B4
S224FCAB404E5E4E754E56FFF048E70300302E000CC07C000F3D40000C7E012D6E0008FFF46D
S224FCAB602D6E0008FFF06028206EFFF00C10000D661A206EFFF04210202EFFF0528032473D
S224FCAB80D3C9D3C9D3CE2340FFF4524752AEFFF0206EFFF00C10000366CE206EFFF042105E
S224FCABA00C6E0003000C6F22576E000CBE6E000C6C064280603260103 02E000C53404 8C036
S224FCABC0E5802036 08F46020601CBE6E000C6C06428060146010300790 6E000C48C0E580C3
S224FCABE0203608F46002428 04A9F4CDF00804E5E4E754E56FFFC48E707001 3FC00200001D6
S224FCAC00BAA613FC00020001BAA713FC00030001BAA84239000 1BAA90C790030000 3260A24
S224FCAC2066047C01600242463039000 32AD4D07CFFD03206B340670A2EAE000C4EB900FC36
S224FCAC403EF6206E001042100C790031 0002D7DE660E3D7C0001FFFE3D7C0005FFFC60120C
S224FCAC60426EFFFE30390002D7DEC07C000F3D40FFFC2EBC0001BAA62F2E000C4EB900FCBC
S224FCAC803F1C588F23C00001BAAA42B90001BAAE600004 1A2EB90001BAAA4EB900FCF09276
S224FCACA03E004A6EFFFE67000218BE7C0005660002103EBC00052F390001BAAA4EB900FC99
S224FCACC0C6C45AAF4A4066242 3F90001BAAA0001BAAE2EBC0001BAA642A74EB900FC3F1C72

S224FCACE0588F23C000FEBAAA600003C24A46670000F02EB90101BAAA4EB900FC3EF62EB9AE
S224FCAD000001BAAA2F2E00084EB900FCF0B6588F4AB90001BAAE660E2EAE00084EB900FC11
S224FCAD20F092600003942EB90001BAAE4EB900FCF092B07C0004660000A43EBC00042F3924
S224FCAD400001BAAE4EB900FCC6C4588F4A4067362EB90001BAAE4EB900FC3EF62EB900017F
S224FCAD60BAAE2F2E00084EB900FC3FEA588F206E001010BC00012EAE00084EB900FCF0921E
S224FCAD8060000326605610390003 2AFB488048C060302EAE00084EB900FCF092600003 1AAC
S224FCADA0603A206E001010BC00012EAE00084EB900FCF09260000302602242406000 02FA5F
S224FCADC0601AB0BC0000000167C8B0BC000000267D0B0BC000000367E060DE600000E281
S224FCADE02EB90001BAAA2F2E00084EB900FCF0B6588F2EBC0001BAA642A74EB900FC3F1C7F
S224FCAE00588F23C00001BAB22EB90001BAB24EB900FCF092B07C0004660000983EBC0004F5
S224FCAE202F390001BAB24EB900FCC6C4588F4A40672A2EB90001BAB22F2E00084EB900FCF1
S224FCAE403FEA588F206E001010BC00012EAE00084EB900FCF09260000260605610390003 49
S224FCAE602AFB488048C060302EAE00084EB900FCF09260000244603A206E001010BC000138
S224FCAE802EAE00084EB900FCF0926000022C602242406000022 4601AB0BC0000000167C81A
S224FCAEA080BC000000267D0B0BC000000367E060DE2EAE00084EB900FCF09260000 1FA34
S224FCAEC04A6EFFFE670000EEBE7C000A660000E64A46670C2EB90001BAAA4EB900FC3EF651
S224FCAEE03EBC00052F390001BAAA4EB900FCC6C4588F4A40670000BE2079000 1BAAA102B2C
S224FCAF000054 88048C0D0BC00FF13A020400810000266 0000A020790001BAAA422B000530
S224FCAF203EBC00042F390001BAAA5C974EB900FCC6C4588F4A4067202EB90001BAAA5C978E
S224FCAF402F390001BAAA4EB900FC3FEA588F206E001010BC0001603A1039000 32AFB4880D2
S224FCAF6048C0601460 2C206E001010BC0001602242406000014 4601AB0BC0000000167E483
S224FCAF80B0BC000000267DEB0BC000000367E060DE2EB90001BAAA2F2E00084EB900FC55
S224FCAFA0F0B6588F2EB90001BAAA4EB900FCF0926000010 64A6EFFFE6700007CBE7C0005F4
S224FCAFC06F74BE7C000A6C6E4A46670C2EB90001BAAA4EB900FC3EF63EBC00052F3900 0181
S224FCAFE0BAAA4EB900FCC6C4588F4A40674B2079000 1BAAA102800054 8804 8C0D0BC00FFA9
S224FCB00013A020400810000266 2C2079000 1BAAA422B00052EB90001BAAA2F2E00084EB94B
S224FCB02000FCF0B6588F2EB90001BAAA4EB900FCF09260000084 4A6EFFFE6650BE6EFFFC3F
S224FCB040664A3E872F390001BAAA4EB900FCC6C4588F4A4067324A46670C2EB90001BAAAC7
S224FCB0604EB900FC3EF62EB90001BAAA2F2E00084EB900FCF0B6588F2EB90001BAAA4EB504
S224FCB08000FCF09260326004424060 2C23F90001BAAA0001BAAE2EBC0001BAA642A74EB908
S224FCB0A000FC3F1C588F23C00001BAAA4AB90001BAAA6600FBE042404A9F4CDF00C04E5E5E
S224FCB0C04E754E56FFFC206E000810280002488048C06036615B60523EAE000C2F2E00080F
S224FCB0E061000E405 88F60423EAE000C2F2E000861000 14A588F60323EAE000C2F2E000838
S224FCB10061001216588F60226020B0BC000004267E6B0BC000004367BAB0BC000004441
S224FCB12067B6B0BC0000005267BE4E5E4E754E56FFF21D7C0053FFF91D7C0043FFFA1D7CB8
S224FCB1400006FFFB42790002465 0426EFFF66038306EFFF6D1C8D1C8D1FC0001F82E20BCC9
S224FCB160FFFFFFFF306EFFF6D1C8D1C8D1FC0002D7E220BCFFFFFFFF306EFFF6D1FC00024B
S224FCB18046544210526EFFF60C6E1388FFF66DC0426EFFF6606A302EFFF648C0E780D0BC19
S224FCB1A0000 3264E204042 10302EFFF648C0E780D0BC0003264E20404228000 1302EFFF682
S224FCB1C048C0E780D0BC0003264E20404228000 2302EFFF648C0E780D0BC0003264E20400B
S224FCB1E0317C00010004302EFFF648C0E780D0BC0003264E204031 7C00010006526EFFF60E
S224FCB2000C6E0080FFF66D8E3EBC00023F3C00032F0E51972F0E5F974EB900FCC738DFFC94
S224FCB220000000000A3D40FFF63EAEFFF62F0E51974EB900FCC706588F4E5E4E754E56FFDAE8
S224FCB2401D7C0053FFDF1D7C0052FFE01D7C0006FFE11D7C0030FFE2426EFFE82E8E069740
S224FCB260FFFFFFF42F0E0697FFFFFFF62F0E51972F0E59972F2E000861 0008E4DFFC000030
S224FCB28000103D40FFE60C6E0001FFE66063D7C0003FFE80C6E0002FFE66063D7C000244
S224FCB2A0FFE84A6EFFFE86640102EFFF448803E80102EFFF648803F0061000B5454 8F3D4050
S224FCB2C0FFE64A6EFFFE66604426EFFEC0C6E0001FFE66063D7C0001FFEC0C6E0002FFE614
S224FCB2E066063D7C0004FFE84A6EFFFE866000 1A84A79000246506F000194303900024650 2F
S224FCB30048C081FC00025240 3D40FFF0303900024650 48C081FC00023D40FFEE306EFFF028
S224FCB3205348D1C8D1C8223C0001F82E2030180 0B0AEFFFC630E302EFFF0906EFFEE3D40D3
S224FCB340FFF06044306EFFF05348D1C8D1C8223C0001F82E20301800B0AEFFFC622A306E8F
S224FCB360FFF05348D1C8D1C8223C0002D7E220301800B0AEFFFC640E302EFFF0D06EFFEE4C
S224FCB3803D40FFF06002601C0C6E0001FFEE6F14302EFFEE524048C081FC00023D40FFEEA9
S224FCB3A06000FF7A306EFFF05348D1C8D1C8223C0001F82E20301800B0AEFFFC620000822F
S224FCB3C0306EFFF05348D1C8D1C8223C0002D7E220301800B0AEFFFC6566306EFFF0534845
S224FCB3E0D1C8D1C8223C0002D7E220301800B0AEFFF86544306EFFF05348D1C8D1C8223CE3
S224FCB400001F82E20301800B0AEFFFC6622306EFFF05348D1C8D1C8223C0002D7E22030F8
S224FCB4201800B0AEFFF866083D7C0002FFEA60063D7C0001FFEA60063D7C0005FFE8604ACE
S224FCB440306EFFF05348D1C8D1C8223C0001F82E20301800B0AEFFFC640A302EFFF05240FE
S224FCB4603D40FFF0306EFFF05348D1C8D1C8223C0001F82E20301800B0AEFFF862083D7CA0
S224FCB480005FFE86004426EFFEA600A3D7C0001FFF0426EFFEA4A6EFFFE866000668302E45
S224FCB4A0FFEA48C0600005EC0C791388000246506C00030652790002465 03D79000246506B
S224FCB4C0FFF26062306EFFF2534 8D1C8D1C8D1FC0001F82E326EFFF25549D3C9D3C9D3FC32
S224FCB4E00001F82E2091306EFFF25348D1C8D1C8D1FC0002D7E2326EFFF25549D3C9D3C928
S224FCB500D3FC0002D7E22091306EFFF25348D1FC000246 54326EFFF25549D3FC0002465 4C2

S224FCB520109153 6EFFF2036EFFF2B06EFFF06E94306EFFF05342 71C8D1C8D1FC0001F82E0B
S224FCB54020AEFFFC306EFFF05348D1C8D1C8D1FC0002D7E220AEFFF8306EFFF05348D1FC85
S224FCB5600002465410AEFFF60C6E0001FFF06F000120306EFFF05348D1C8D1C8223C0001C8
S224FCB580F82E2030180032 6EFFF05549D3C9D3C9D3FC0002D7E22211528 1B081660000F29E
S224FCB5A0306EFFF05548223C000246541030180048 80B02EFFF6660000D8306EFFF055480B
S224FCB5C0D1C8D1C8D1FC0002D7E2326EFFF05349D3C9D3C9D3FC0002D7E2209 13D6EFFF078
S224FCB5E0FFF2605C306EFFF25348D1C8D1C8D1FC0001F82E326EFFF2D3C9D3C9D3FC0001B4
S224FCB600F82E209 1306EFFF25348D1C8D1C8D1FC0002D7E2326EFFF2D3C9D3C9D3FC0002D4
S224FCB620D7E2209 1306EFFF25348D1FC00024654326EFFF2D3FC0002465410915 26EFFF2BE
S224FCB640302EFFF2B0790002465 06D98306EFFF25348D1C8D1C8D1FC0001F82E20BCFFFFAA
S224FCB660FFFF306EFFF25348D1C8D1C8D1FC0002D7E220BCFFFFFFFF306EFFF25348D1FC18
S224FCB6800002465442105379000246505 36EFFF0302EFFF0B079000246506C00011A306E74
S224FCB6A0FFF05348D1C8D1C8223C0002D7E220301800528032 6EFFF0D3C9D3C9D3FC0001E3
S224FCB6C0F82E2211B081660000EE306EFFF0223C00024654103018004880B02EFFF66600A8
S224FCB6E000D6306EFFF05348D1C8D1C8D1FC0002D7E2326EFFF0D3C9D3C9D3FC0002D7E240
S224FCB700209 1302EFFF052403D40FFF2605C306EFFF25348D1C8D1C8D1FC0001F82E326E7E
S224FCB720FFF2D3C9D3C9D3FC0001F82E2091306EFFF25348D1C8D1C8D1FC0002D7E2326EB4
S224FCB740FFF2D3C9D3C9D3FC0002D7E2209 1306EFFF25348D1FC00024654326EFFF2D3FC91
S224FCB760000246541091526EFFF2302EFFF2B079000246506D98306EFFF25348D1C8D1C869
S224FCB780D1FC0001F82E20BCFFFFFFFF306EFFF25348D1C8D1C8D1FC0002D7E220BCFFFF1E
S224FCB7A0FFFF306EFFF25348D1FC000246544210537900024650600 63D7C0001FFE86000DA
S224FCB7C002EA306EFFF05348D1C8D1C8223C0001F82E20301800B0AEFFFC671C306EFFF0CC
S224FCB7E05348D1C8D1C8223C0002D7E220301800B0AEFFF866000 1480C7913880002465 03E
S224FCB8006C000128306EFFF05348223C00024654103018004880B02EFFF66700010E52793C
S224FCB820000246503D79000246 50FFF26062306EFFF25348D1C8D1C8D1FC0001F82E326E7E
S224FCB840FFF25549D3C9D3C9D3FC0001F82E2091306EFFF25348D1C8D1C8D1FC0002D7E295
S224FCB860326EFFF25549D3C9D3C9D3FC0002D7E2209 1306EFFF25348D1FC00024654326EF2
S224FCB880FFF25549D3FC000246541091536EFFF2302EFFF2B06EFFF06E94306EFFF05348D4
S224FCB8A0D1C8D1C8223C0001F82E20301800B0AEFFFC663C202EFFF85280326EFFF0D3C92B
S224FCB8C0D3C9D3FC0001F82E2280306EFFF05348D1C8D1C8D1FC0002D7E220AEFFF8306EEE
S224FCB8E0FFF05348D1FC0002465410AEFFF66038306EFFF0D1C8D1C8D1FC0001F82E20AE88
S224FCB900FFFC306EFFF0D1FC0002465410AEFFF6202EFFFC5380326EFFF05349D3C9D3C903
S224FCB920D3FC0002D7E22280601 00C79138800024650 6D063D7C0001FFE86000 1180C79A0
S224FCB9401387000246506D1A306EFFF05348223C00024654103018004880B02EFFF66700B1
S224FCB96000E45479000246503D79000246 50FFF26062306EFFF25348D1C8D1C8D1FC000152
S224FCB980F82E326EFFF25749D3C9D3C9D3FC0001F82E2091306EFFF25348D1C8D1C8D1FC47
S224FCB9A00002D7E2326EFFF25749D3C9D3C9D3FC0002D7E2209 1306EFFF25348D1FC00022E
S224FCB9C04654326EFFF25749D3FC000246541091536EFFF2302EFFF05240B06EFFF26D92F0
S224FCB9E0202EFFFC5380326EFFF05349D3C9D3C9D3FC0002D7E22280306EFFF0D1C8D1C8DC
S224FCBA00D1FC0001F82E20AEFFFC306EFFF0D1C8D1C8D1FC0002D7E220AEFFF8306EFFF0CF
S224FCBA20D1FC0002465410AEFFF6202EFFF85280326EFFF05249D3C9D3C9D3FC0001F82E7A
S224FCBA40228060100C791387000246506D063D7C0001FFE86054306EFFF05348D1C8D1C8FA
S224FCBA60D1FC0001F82E20AEFFFC306EFFF05348D1C8D1C8D1FC0002D7E220AEFFF8306EC3
S224FCBA80FFF05348D1FC0002465410AEFFF6601A60184A806700FA13B0BC00000016700FC
S224FCBAA0FD22B0BC0000000267AC4A6EFFE866540C6E0001FFEC664C102EFFF64880534 0E6
S224FCBAC048C0E780D0BC0003264E204010AEFFF6102EFFF6488053404 8C0E780D0BC000354
S224FCBAE0264E2040116EFFF40001102EFFF64880534048C0E780D0BC0003264E2040116E1F
S224FCBB00FFF600024A6EFFE867141D7C0015FFE1302EFFE8807C0030 48801D40FFE23EBC14
S224FCBB2000023F3C00042F0E0697FFFFFFDE2F0E0697FFFFFFDF4EB900FCC738DFFC00003B
S224FCBB40000A3D40FFF23EAEFFF22F0E0697FFFFFFDE4EB900FCC70658 8F4E5E4E754E5610
S224FCBB60FFEC206E000C4290206E0010429 0206E0014421 0206E0018421 03D7C0003FFFE58
S224FCBB80303900024652564 03D40FFFC426EFFFA600000EA206E0008322EFFFE48C1342E42
S224FCBBA0FFFA48C2D28210301800488048C0D0BC00FF13A0204008100002670000B6206EA2
S224FCBBC00008322EFFFC48C1342EFFFA48C2D28210301800488048C0D0BC00FF13A0204079
S224FCBBE00810000267 00008C2F3C0000000A206E000C2F104EB900FCF120508F2F00206E39
S224FCBC00000C209F206E0008322EFFFE48C1342EFFFA48C2D28210301800488 0C07C000F38
S224FCBC2002800000FFFF226E000CD1912F3C0000000A206E00102F104EB900FCF120508F40
S224FCBC402F00206E0010209F206E0008322EFFFC48C1342EFFFA48C2D28210301800488084
S224FCBC60C07C000F02800000FFFF226E0010D19160067001600001945 26EFFFA302EFFFA1A
S224FCBC80B079000246526D00FF0C60462F3C0000000A206E000C2F104EB900FCF120508F81
S224FCBCA02F00206E000C209F2F3C0000000A206E00102F104EB900FCF120508F2F00206EF9
S224FCBCC00010209F206E00100690000000095 26EFFFA0C6E0009FFFA6DB230390002465200
S224FCBCE0E34056403D40FFFE302EFFFE56403D40FFFC2E8E0697FFFFFFF2302EFFFE48C0FC
S224FCBD00D0AE00082F003F3C00034EB900FCC9405C8FB07C0001 66262E8E0697FFFFFFF0F9
S224FCBD20302EFFFC48C0D0AE00082F003F3C00034EB900FCC9405C8FB07C00016706 70026B
S224FCBD40600000C8302EFFF24880226E00141280302EFFF04880226E00181280206E001080

S224FCBD604A90660C20C00010226E000C2091602A206E000C28F0226E00102211B081631AB6
S224FCBD80206E00102D50FFF6206E0010226E000C2091206E000C20AEFFF6206E00184A104A
S224FCBDA0660C206E0018226E001410916032206E00141010024000FF226E001812110241B2
S224FCBDC000FFB041631A206E00181D50FFF4206E0018226E00141091206E001410AEFFF4B1
S224FCBDE0206E00144A10671C206E00140C1000806212206E00184A10670A206E00180C10DE
S224FCBE00008063047002600242404E5E4E754E56FFFA102E00094880534048C0E780D0BC3B
S224FCBE200003264E20404A10660000AE426EFFFE60000096302EFFFE48C0E780D0BC0003C0
S224FCBE40264E20404A106700007C302EFFFE48C0E7802040223C0003264E103018004880B1
S224FCBE60B02E00096E22302EFFFE48C0E7802040223C0003264E103018014880B02E000943
S224FCBE806D06700260000098302EFFFE48C0E7802040223C0003264E103018004880B02EC7
S224FCBEA0000B6E20302EFFFE48C0E7802040223C0003264E103018014880B02E000B6D046E
S224FCBEC07002605A526EFFFE0C6E0080FFFE6D00FF64700160486046102E00094880534050
S224FCBEE048C0E7802040223C0003264E103018004880B02E00096620102E000948805340 6E
S224FCBF0048C0E7802040223C0003264E103018014880B02E000B67047002600242404E5E05
S224FCBF204E754E56FFE43D7C0001FFF013FC000200032AD213FC00010003260833FC000984
S224FCBF400002465233FC000200032AE21D7C0053FFF91D7C0044FFFA1D7C0006FFFB3D7CFA
S224FCBF600001FFEE3D7C0001FFEC3D7C0002FFEA3D7C0002FFE8206E0008102800034880 4E
S224FCBF8048C0D0BC00FF13A02040081000026604426EFFF0206E00080C28003100046D0C5F
S224FCBFA0206E00080C28003200046F04426EFFF00C6E0001FFF0661E2E8E0697FFFFFFEE3C
S224FCBFC02F2E00085A973F3C00034EB900FCC9405C8F3D40FFF00C6E0001FFF0661E2E8E7F
S224FCBFE00697FFFFFFEC2F2E000850973F3C00034EB900FCC9405C8F3D40FFF00C6E000112
S224FCC000FFF066222E8E0697FFFFFFEA2F2E000806970000000B3F3C00034EB900FCC940D1
S224FCC0205C8F3D40FFF00C6E0001FFF066222E8E0697FFFFFFE82F2E000806970000000E68
S224FCC0403F3C00034EB900FCC9405C8F3D40FFF00C6E0001FFF06600008E4A6EFFEC660691
S224FCC0603D6EFFEEFFEC4A6EFFE866063D6EFFEAFFE84A6EFFEE67100C6E0080FFEE6E083D
S224FCC0800C6E0080FFEC6F04426EFFF04A6EFFEA67100C6E0080FFEA6E080C6E0080FFE856
S224FCC0A06F04426EFFF00C6E0001FFF066183EAEFFEC3F2EFFEE6100FD56548FB07C00028F
S224FCC0C06604426EFFF00C6E0001FFF066183EAEFFE83F2EFFEA6100FD36548FB07C0002A0
S224FCC0E06604426EFFF00C6E0001FFF06600011C206E0008102800034880C07C000F33C072
S224FCC10000024652 3EBC00032F3C000246524EB900FC216E588F206E000810280004488070
S224FCC1200C07C000F33C00032AE23EBC00022F3C00032AE24EB900FC216E588F302EFFEE77
S224FCC140C07C00FF322EFFEE534148C1E781D2BC0003264E22411280302EFFECC07C00FFD3
S224FCC160322EFFEC534148C1E781D2BC0003264E224113400001302EFFEEC07C00FF322ECC
S224FCC180FFEE534148C1E781D2BC0003264E224113400002302EFFEEC07C00FF13C0000293
S224FCC1A02608302EFFEAC07C00FF322EFFEA534148C1E781D2BC0003264E22411280302E28
S224FCC1C0FFE8C07C00FF322EFFE8534148C1E781D2BC0003264E224113400001302EFFEAED
S224FCC1E0C07C00FF322EFFEA534148C1E781D2BC0003264E224113400002302EFFEAC07C75
S224FCC20000FF13C000032AD260061D7C0015FFFB3EBC00023F3C00032F0E51972F0E5F976C
S224FCC2204EB900FCC738DFFC0000000A3D40FFF23EAEFFF22F0E51974EB900FCC706588FEF
S224FCC2404E5E4E754E56FFF84A7900024650670000C230390002465048C081FC00023D404A
S224FCC260FFFC3D6EFFFCFFFE306EFFFCD1C8D1C8223C0001F82E20301800B0AE0008620C93
S224FCC280302EFFFCB07900024650660E302EFFFC906EFFFE3D40FFFC6050306EFFFCD1C861
S224FCC2A0D1C8223C0001F82E20301800B0AE00086238306EFFFCD1C8D1C8223C0002D7E313
S224FCC2C020301800B0AE0008640E302EFFFCD06EFFFE3D40FFFC6012306EFFFC223C0002A6
S224FCC2E04654103018004880602A4A6EFFFE67220C6E0001FFFE6F12302EFFFE534048C0CD
S224FCC30081FC00023D40FFFE6004426EFFFE6000FF5842404E5E4E754E56FFEC3D7C000121
S224FCC320FFF42E8E0697FFFFFFF02F2E000856973F3C00034EB900FCC9405C8FB07C0001CF
S224FCC34066202E8E0697FFFFFFF22F2E00085C973F3C00034EB900FCC9405C8FB07C000114
S224FCC3606704426EFFF40C6E0001FFF4661C4A6EFFF067080C6E0080FFF06F04426EFFF4A9
S224FCC3804A6EFFF26604426EFFF40C6E0001FFF467081D7C0015FFF96030302EFFF05340F3
S224FCC3A048C0E780D0BC0003264E2040316EFFF20004302EFFF0534048C0E780D0BC000338
S224FCC3C0264E2040316EFFF200063EBC00023F3C00032F0E0697FFFFFFF62F0E0697FFFFD3
S224FCC3E0FFF74EB900FCC738DFFC0000000A3D40FFFE3EAEFFFE2F0E0697FFFFFFF64EB928
S224FCC40000FCC706588F4E5E4E754E56FFFA536E0008302E000848C0E780D0BC0003264EBE
S224FCC42020401D680002FFFE302E000848C0E780D0BC0003264E204053680006302E0008B8
S224FCC44048C0E780D0BC0003264E20404A680006302E000848C0E780D0BC0003264E204019
S224FCC460322E000848C1E781D2BC0003264E2241316900040006302E000848C0E780D0BC75
S224FCC4800003264E204052280002302E000848C0E7802040223C0003264E10301802488 01C
S224FCC4A0322E000848C1E781D2BC0003264E2241122900014881B0416F24302E000848C043
S224FCC4C0E780D0BC0003264E2040322E000848C1E781D2BC0003264E224111510002102EAE
S224FCC4E0FFFE48804E5E4E754E56FFFC302E000848C0600000A62EBC00FF166C4EB900FC86
S224FCC500DD88600000B22EBC00FF16844EB900FCDD88600000A22EBC00FF16A04EB900FC14
S224FCC520DD88600000922EBC00FF16BC4EB900FCDD884EB900FC048C3E802F3C00FF16E6C9
S224FCC5404EB900FCDD88588F606C2EBC00FF17124EB900FCDD884EB900FC048C3E802F3CA9
S224FCC56000FF17304EB900FCDD88588F60482EBC00FF175C4EB900FCDD88603A2EBC00FF36
S224FCC58017844EB900FCDD88602C2EBC00FF17A84EB900FCDD88601E601C90BCFFFFFFF8C0

S224FCC5A0B0BC000000006FFFE2E5802040D1FC00FF165020504B660E5E4E754E56FEFA42579B
S224FCC5C04EB900FC0A7A3EBC01002F0E0697FFFFFEFE3F3C00134EB900FC087E5C8F3D40B5
S224FCC5E0FFFE4A6EFFFE6F103EAEFFFE2F0E0697FFFFFEFE610E588F4EB900FC052460C6A4
S224FCC6004E5E4E754E56FFF2206E000810280001488048C0600000964EB900FC415460008B
S224FCC62000A04EB900FC492660000096306E000810280002488048C0604E4EB900FC422B36
S224FCC6406056306E00080C280051000466303EBC00022F2E00085A972F0E51974EB900FCF4
S224FCC66040BE508F2E8E51974EB900FCEFA03D40FFF63EAEFFF64EB900FC049A60064EB945
S224FCC68000FC4D6C60126010B0BC0000005367AAB0BC0000005467AA60264EB900FC470A87
S224FCC6A0601E4EB900FC076A60166014207C00FF17CC7205B09857C9FFFC206800144ED0BB
S224FCC6C04E5E4E754E56000048E7030042476024206E000832074 8C110301800488048C007
S224FCC6E0D0BC00FF13A020400810000266044240600A5247BE6E000C6DD670014A9F4CDF92
S224FCC70000804E5E4E754E56000048E7030042476016206E0008101048803E804EB900FC15
S224FCC720062A52AE00085247BE6E000C6DE44A9F4CDF00804E5E4E754E56FFF6422EFFFE95
S224FCC740206E000C10AE0013426EFFFC6034306EFFFCD1EE000C326EFFFCD3EE0008115104
S224FCC7600001206E0008322EFFFC48C110301800034000FF122EFFFED2001D41FFFE526EFA
S224FCC780FFFC302EFFFCB06E00106DC2526EFFFC102EFFFE024000FFC07C00F0E840807C60
S224FCC7A00030326EFFFCD3EE000C1280526EFFFC102EFFFE024000FFC07C000F807C0030A0
S224FCC7C0326EFFFCD3EE000C1280526EFFFC0C2E000200136612306EFFFCD1EE000C10BCAC
S224FCC7E00003526EFFFC6010306EFFFCD1EE000C10BC0004526EFFFC302EFFFC4E5E4E7553
S224FCC8004E56FFF260540C6EFFFEFFFA660C42790001BAB670FE60000124302EFFFA4880AE
S224FCC82032790001BAB6D3FC0001BAB81280532790001BAB60C7901010001BAB66D0C42799F
S224FCC8400001BAB670FF600000F40C6E0004FFFA671A0C6E0003FFFA671242974EB900FCE0
S224FCC86006CE3D40FFFAB07CFFFF669A0C6E0004FFFA670A0C6E0003FFFA660000BE0C6E47
S224FCC8800004FFFA66000086422EFFFE3D7C0001FFF8601E306EFFF8223C0001BAB810306C
S224FCC8A018004880122EFFFED2001D41FFFE526EFFF830390001BAB65740B06EFFF86ED4AE
S224FCC8C030790001BAB65748223C0001BAB8103018004880C07C000FE94032790001BAB61D
S224FCC8E05549D3FC0001BAB812114881C27C000FD04148801D40FFFC102EFFFEB02EFFFCD9
S224FCC900670A42790001BAB670FF60303EB90001BAB63F3C0001BAB82F2E00084EB900FCCC
S224FCC92040BE508F3D790001BAB6FFF642790001BAB6302EFFF66004600242404E5E4E75C7
S224FCC9404E56FFF8426EFFFE426EFFFC604E206E000A322EFFFC48C110301800488048C011
S224FCC960D0BC00FF13A02040081000026726302EFFFEC1FC000A3D40FFFE206E000A322EDD
S224FCC980FFFC48C1103018004880C07C000FD16EFFFE600442406018526EFFFC302EFFFC79
S224FCC9A0B06E00086DA8206E000E30AEFFFE70014E5E4E754E56FEA42EBC0001AC764EB98A
S224FCC9C000FC05702EBC0001AC764EB900FC057E3EBC00012F3C0001AC763F3C00014EB946
S224FCC9E000FC058C5C8F3EAE00084EB900FC048C3F002F3C00FF18344EB900FCDD885C8FEF
S224FCCA00426EFEB2426EFEB042AEFEB4203900001018C0BC00003FF3D40FEA83EBC004059
S224FCCA2042673F0E0697FFFFFEBC4EB900FC40925C8F3EBC040042672F3C0001BBBA4EB96B
S224FCCA4000FC40925C8F2EBC0001BBB84EB900FC79F43F3C000000002F3C403500002F3C98
S224FCCA600000000002F3C401800002F39000326224EB900FCDD2A588F2F013F004EB900FCEC
S224FCCA80D550DFFC0000000102F012F004EB900FCD820DFFC000000102F013F004EB900FCDE
S224FCCAA0D998508F3D40FEFC3EBC00024EB900FC09242EBC00FD04024EB900FC06143E80BA
S224FCCAC0025700BF2F3C00FD04024EB900FC061E588F3EBC00044EB900FC0A7A3EBC010041
S224FCCAE042673F0E0697FFFFFEFE4EB900FC40925C8F2E8E0697FFFFFEFE4EB900FC4F5003
S224FCCB003D40FFFE6F123EAEFFFE2F0E0697FFFFFEFE6100043E588F3EBC01002F0E0697FD
S224FCCB20FFFFFEFE3F3C00134EB900FC087E5C8F3D40FFFE6F123EAEFFFE2F0E0697FFFF3C
S224FCCB40FEFE61000268588F4AB90001B6786750302EFEFC02800000FFFFD0B90001B680A5
S224FCCB602D40FEB83EBC00012F2EFEB84EB900FC09C8588F306EFEB2D1C8D1C8D1CE316E1A
S224FCCB80FEB8FEBC526EFEB2026E000FFEB22EB90001B6784EB900FC4EE442B90001B67810
S224FCCBA04AB90001B67C67343EBC0002302EFEFC02800000FFFFD0B90001B6842F004EB9E5
S224FCCBC000FC09C8588F42B90001B67C4AAEFEB46624302EFEB2B06EFEB0671A306EFEB097
S224FCCBE0D1C8D1C8D1CE2D68FEBCFEB4526EFEB0026E000FFEB0202EFEB4B0B90000101C32
S224FCCC006200009C4AAEFEB4670000942D7900001018FEB8302E000848C0D1AEFEB8202EFB
S224FCCC20FEB8C0BC00003FF2040D1FC0001BBBA00100001426EFEAC604A302EFEAC02807D
S224FCCC400000FFFFD0AEFEB8C0BC000003FF3D40FEAE306EFEAED1FC0001BBBA0810000154
S224FCCC606710306EFEAED1FC0001BBBA10BC0007600E306EFEAED1FC0001BBBA00100003CF
S224FCCC80526EFEAC0C6E0018FEAC6DAE306EFEAED1FC0001BBBA0010000442AEFEB42F3C24
S224FCCCA0000004002F390000101852974EB900FCEEAA508F3D40FEAE302EFEA8B06EFEAEB5
S224FCCCC0670000DC306EFEA8D1FC0001BBBA1D50FEAA306EFEA8D1FC0001BBBA4210082E65
S224FCCCE00002FEAA674C2EBC00FD04024EB900FC06143E80025700EF2F3C00FD04024EB951
S224FCCD0000FC061E588F42790001B67630790001B68AD1FC0001B68C10BC0003527900018E
S224FCCD20B68A0C7902000001B68A660642790001B68A082E0000FEAA674E30790001B68A05
S224FCCD40D1FC0001B68C10BC000252790001B68A0C7902000001B68A660642790001B68AB8
S224FCCD602EBC00FD04024EB900FC06143E80005700102F3C00FD04024EB900FC061E588F07
S224FCCD8033FC00010001B676302EFEA8524048C081FC040048403D40FEA86000FF1C4EB9E9
S224FCCDA000FC05246000FD364E5E4E754E56FFCA206E00080C2800520001660000C8206E05
S224FCCDC000081028000348804 8C0600000963EAE000C2F2E000861000420588F600000A27E

Mar-16-99 02:26pm From-MILLEN, Wh ZELANO & BRANIGAN 7032436410 T-713 P.28/38 F-776

S224FCCDE0610002046000609A2EBC0001BBB84EB900FC79F413FC0052FFEA10390002D7E02C
S224FCCE0048805340807C003048801D40FFEB1D7C0045FFEC1D7C0006FFED3EBC00023F3CB0
S224FCCE2000042F0E0697FFFFFFD62F0E0697FFFFFFEA4EB900FCC738DFFC0000000A3D401B
S224FCCE40FFFE3EAEFFFE2F0E0697FFFFFFD63F3C00133F3C00014EB900FC076C508F60205F
S224FCCE60601EB0BC000000316700FF64B0BC000000346700FF6CB0BC000000456700FF6AD9
S224FCCE80600000CC206E000810280001488048C0600000A84EB900FC4154600000824EB90D
S224FCCEA000FC41CC600000A84EB900FC49266000009E206E00081028000248804 8C060569A
S224FCCEC04EB900FC4228605E206E00080C280051000466383EBC00022F2E00085A972F0EDA
S224FCCEE00697FFFFFFD04EB900FC40BE508F2E8E0697FFFFFFD04EB900FCEFA03D40FFCEE5
S224FCCF003EAEFFCE4EB900FC049A60064EB900FC4D6C60126010B0BC0000005367A2B0BC7E
S224FCCF2000000005467A260264EB900FC470A601E4EB900FC076A60166014207C00FF17FC2F
S224FCCF407206B09857C9FFFC206800184ED04E5E4E754E56FF5C48E70300306E000CD1EE2E
S224FCCF60000842101D7C0044FF8010390002D7E048805340807C003048801D40FF814EB9C5
S224FCCF8000FC4F0E02800000FFFF2D40FF822D7CFFFFFFFFFF86422EFF8A3EBC00093F3C28
S224FCCFA000202F0E0697FFFFFF884EB900FC40925C8F1D7C0015FFA83EAE000C55572F2EF5
S224FCCFC0000852972F0E0697FFFFFF944EB900FC4022508F4247602A3047D1EE00080C1043
S224FCCFE00052661C3047D1EE00080C280045000160E3047D1EE00080C28004A0002670803
S224FCD0005247BE6E000C6DD03047D1EE00080C100052666E300748C0D0AE00082E80569721
S224FCD0204EB900FCEFA03D40FF620C6E0006FF6266501D7C0045FF7010390002D7E04880D1
S224FCD0405340807C003048801D40FF713EBC00092F3C00FF18522F0E0697FFFFFF724EB954
S224FCD06000FC4022508F3EBC000B2F0E0697FFFFFF703F3C00113F3C00014EB900FC076CA8
S224FCD080508F2D6E0008FF5C4AAEFF5C672E3EAE000C2F0E0697FFFFFF8A2F0E0697FFFF99
S224FCD0A0FF862F0E0697FFFFFF8B2F2EFF5C4EB900FCA308DFFC000000103E003EAE000C01
S224FCD0C0065700122F0E0697FFFFFF803F3C00123F3C00014EB900FC076C508F4A9F4CDF17
S224FCD0E000804E5E4E754E56FFDA3EBC00203F3C00302F0E0697FFFFFFDE4EB900FC409274
S224FCD1005C8F1D7C0052FFDF10390002D7E048805340807C003048801D40FFE01D7C003400
S224FCD120FFE130390001BBB848C081FC03E8807C003048801D40FFE230390001BBB848C0AA
S224FCD14081FC006448C081FC000A4840807C003048801D40FFE330390001BBB848C081FC41
S224FCD160000A48C081FC000A4840807C003048801D40FFE4303900032AD448801D40FFEEDD
S224FCD180303900032 60A48801D40FFEF303900032A5248801D40FFF030390002D7DE4880FB
S224FCD1A01D40FFF530390002464E48801D40FFF63EBC00023F3C00192F0E0697FFFFFFDEBF
S224FCD1C02F0E0697FFFFFFDF4EB900FCC738DFFC0000000A3D40FFFE3EAEFFFE2F0E069774
S224FCD1E0FFFFFFDE3F3C00133F3C00014EB900FC076C508F4E5E4E754E56FFF0426EFFFE45
S224FCD2001D7C0052FFF510390002D7E048805340807C003048801D40FFF61D7C0031FFF7CB
S224FCD2201D7C0006FFF82E8E55972F2E000858973F3C00034EB900FCC9405C8FB07C0001B9
S224FCD2406670302EFFFEC1FC000A3D40FFFE2EBC0001BBB83F2EFFFE4EB900FC793054 8F04
S224FCD260206E000810280010488033C000032AD4206E000810280011488033C00003260A46
S224FCD280206E000810280012488033C000032A5220 6E000810280017488033C00002D7DE1C
S224FCD2A0206E000810280018488033C00002464E60061D7C0015FFF83EBC00023F3C0004B0
S224FCD2C02F0E0697FFFFFFF42F0E0697FFFFFFF54EB900FCC738DFFC0000000A3D40FFFC57
S224FCD2E03EAEFFFC2F0E0697FFFFFFF43F3C00133F3C00014EB900FC076C508F4E5E4E75AD
S224FCD3004E56FFA648E70F1C2A6E000849EEFFB00C15002B6604528D60080C15002D66030
S224FCD32018DD18FC003018FC002E6002528D0C15002067F86002528D0C15003067F8424716
S224FCD340600418DD52470C1500306D060C1500396FF00C15002E6622528D4A47660C600440
S224FCD360528D53470C15003067F6600218DD0C1500306D060C1500396FF26002538C0C2C36
S224FCD3800030FFFF67F6424642450C15006567060C1500456602528D0C15002B6604528DBD
S224FCD3A0600A0C15002D6604528D7A01600ECDFC000A101D4880DC40DC7CFFD00C15003026
S224FCD3C06D060C1500396FE64A45670630064440 3C00DC474A4667421 8FC00454A466C0A7D
S224FCD3E018FC002D300644403C0047EEFFA6300648C081FC000A4840D07C0030488016C0B4
S224FCD40048C68DFC000A4A4666E4600218E3200ED08CFFFFFFA6B7C062F2421C45EEFFB0CB
S224FCD420610A4A9F4CDF38E04E5E4E7548E733007000720074007C007E001C1A0C06002BC0
S224FCD440670A0C06002D660608C700001C1A0C06003065220C060039622C0C801999999988
S224FCD460630A0807000266E4528260E04EB900FCDA4A0206000FD2867C00D1860807000255
S224FCD48067CA538260C60C06003E660608C7000267BA2F0274000C06002B67280C06002D11
S224FCD4A0671E088600050C06004567060C06004466361C1A0C06002B670A0C06002D6060E
S224FCD4C008C700011C1A0C06003065120C060039620C0206000FC4FC000AD48660E6080743
S224FCD4E0000167024482D597534A243C43300000760 00C8000100000640C80824EB900FC98
S224FCD500D5706728601C0C8000200000650C068200100000E288E29160EC0280000FFFFF4D
S224FCD520808208070000670408C0001F241F2F012F00203C4024000072004EB900FCDA7660
S224FCD540241F261F4EB900FCD8304CDF00CC4E752F0343EF00084CD9000F611426 1F4E7560
S224FCD5602F0343EF00084CD9000F610E261F4E754A826714084200 1F60044A82670A4A8078
S224FCD580660A220320024E754A804E7548E73F002C002E0202B0000FFFFF02A2000FFFFF99
S224FCD5A008C0001408C20014D281E390D683E392D281E390D683E3922A0748464847 3A06FA
S224FCD5C0E84EE84F024607FF024707FF38069847672C620A4444C142C343CD4748450C44A2
S224FCD5E0003762340C440008650C1602E08AE09B514466F06008E28AE293534466F8280541
S224FCD6004A44BB446B56D283D182080000176708E288E2915246677E740008010001671E2A

Mar-16-99 02:27pm From-MILLEN, Wh ZELANO & BRANIGAN 7032436410 T-713 P.29/38 F-776

S224FCD6200801000066060 1B1000267125481D18208000017670122 88E2915246675 8E2889C
S224FCD640E291E288E291088000 14EB4EE355E2564846424680864CDF00FC4E75928391 8206
S224FCD6606408448140800845000F4A806614200167E442404B404B4142410446001 06F10BD
S224FCD68060E8080000166690D281E39053 4666F27200700060C04EB900FCD9FA60B82F0354
S224FCD6A043EF0008241926192019221961064CDF00084E7548E7F0004A806A084A826A044D
S224FCD6C0C142C343B4806608B6816404 44FC00194CDF000F4E752F0343EF00084CD9000F09
S224FCD6E0610 4261F4E7548E73F002A01280067000 1122E032C02670001104842300 22F00BF
S224FCD700028400 0FFFFF0286000FFFFF08C4001408C6001476204A8766044A066766 7000C0
S224FCD7207200243C004000004 87A0010B886620665 4ABA8765464243602 8C14167026 13CAE
S224FCD74074000801000167100801000066060801000267045 8 81D182E288E291E288E29102
S224FCD760606EBC84621265 04BE85620CD2829A8799B666044A85670AE29A6B06DA85E3940B
S224FCD78060E04E754242B886620665 0CBA876508E28CE295E2524243EA8E88C630044840 1C
S224FCD7A0484538058 8C630044845380588C632044841380288C632044844E24EB846651058
S224FCD7C07C005281D1860800001567045381918 62C1F3E1FE35EE35F08C6000102070 0E13B
S224FCD7E004467FE004477FE09C4769249C4306467FE0E25E0246FFF008800014484642 46B2
S224FCD80080864CDF00FC4E754EB900FCD9FA60F26A084EB900FCD9FA60E87200700060E23B
S224FCD8202F0343EF00084CD9000F6104261F4E7548E7FF0022024840340048413601024 2CB
S224FCD840000F0243000F08C2000408C30004E358E3590240FFE1670001100241FFE16700 2C
S224FCD86001080 4407FE004417FE0D2406 90000F03F01700072007800 7A007C004AAF00065D
S224FCD88066084AAF000E676B601C3C2F0008CCEF000C42464846D2863C2F0006CCEF000EE5
S224FCD8A042464846D2863C2F0004CCEF0010424 64846D2863C2F0008CCC3D286D1843C2F37
S224FCD8C00006CCEF000CD286D1843C2F0004CCEF000ED286D1843C02CCEF0010D286D18432
S224FCD8E03C2F0006CCC33E2F000ECEC2DC87DB843E2F0004CEEF000CDC87DB844845D0857C
S224FCD9002A06484642464245484 5D286D1853C2F000CCCC2D0863C2F0004CCC3D086C4C3C8
S224FCD9204842D0823E1F080000196708064700206806602AD281E390080100046730080145
S224FCD940000366060801000567240681000000 10D184080000 1A67160647002068106A08DC
S224FCD9604EB900FCD9FA602872007000603206477FE06FF4E25F0247FFF0484742477C04C4
S224FCD980E288E29151CEFFFA0280000FFFFF808750 8F4CDF00FC4E75202F0004222F000886
S224FCD9A061024E7548E7F0004EB900FCE31E0880001F7600243C433000004EB900FCD57ADB
S224FCD9C020014A576A02448050 8F241F261F4E75202F0004222F00084A8067 1CE3592 81 2C
S224FCD9E000000000ED080E29104807FE0000006800FE00000E58880814E7570144E403F3C3F
S224FCDA0000083F00304F70094E404E75302F000448C06004202F00042F012F0002978000E8
S224FCDA2000006A0244800C80007FFFFF6308E2880657008060F0223C4800000008 0814EB9F9
S224FCDA4000FCDAF2D09F221F4E752F022F012400D281E390D281E390D29FD182D281E390EF
S224FCDA60241F4E754E5600004 3EE00084CD9000761044E5E4E754A82675A4A80675E48E777
S224FCDA803E0028026A0244847C002A3C3FF00000E28C6720641 2C346C145260624054EB902
S224FCDAA000FCD830C346C145260124004EB900FCD83060DC260624054EB900FCD8304A977F
S224FCDAC06A0C26012400610C4EB900FCD6E64CDF007C4E757200203C3FF000004E75202FDF
S224FCDAE00004222F0008600A202F0004222F0008600A4A81671208410 01F60044A816708FE
S224FCDB004A806608200 14E754A804E7548E778002600280148434844EE4BEE4CE188E18908
S224FCDB2008C0001F08C1001F140394046710620644 02C141C7440C0200196234E4A9B744EF
S224FCDB400804000866 3ED0816406E2905203674E080000076 71A080000066606080000008BB
S224FCDB60670E06800000008 06406E290520367 2EEF4BE0880888000174843424380834CDFE4
S224FCDB80001E4E759081 67F664060843000844806BBE53036704D08060F6700060E04EB96D
S224FCDBA000FCD9FA60D8202F0004222F000848E778002600670000AA2801670000AA484110
S224FCDBC030012F0002830 07FFFFF0284007FFFFF08C3001708C400173 23C01004A04673 4C2
S224FCDBE07000 7419B68465104241B88362060 5C0968467085342 6B04D68360EE0800000150
S224FCDC00670E080000000660608000002670258 80E488601A4242B6846506E28BE252424 19C
S224FCDC20E08C86C430034840360286C4300336 1F381FE35BE35C08C3000102040000104437A
S224FCDC407F0004447F00964469249641 06437F00E25B0243FFA0088000174843424380 83C4
S224FCDC604CDF001E4E754EB900FCD9FA60F26A084EB900FCD9FA60E8700060E4202F0004D8
S224FCDC80222F000848E77C003800 3A01484048413400360102420 07F0243007F0AC2000738
S224FCDCA008C300070240FF80675E0241FF80675 8E35AE35904407F0004417F00D24069 3ED3
S224FCDCC03002C4C3C0C5C6C4CAC4D0B33A024845D0856A080641010068046022D08008007C
S224FCDCE00007672808000006660608000000867 1C068000000008064140641 01006 80E6A08D2
S224FCDD004EB900FCD9FA601C700060180641 7F006FF6E2590241FF80E0880880001 7484110
S224FCDD2042418081 4CDF003E4E75202F00042200671EE390E391E68804800FE000000680EA
S224FCDD407FE00000E291E290028100000007E6994E75202F00042F012F004EB900FCE362B8
S224FCDD60671C0280007FFFFF08C000173217EE49040100966B04E3A86004444 1E2A84A9FD0
S224FCDD806A0244 80221F4E754E56FFFA0CAEFFFFFFFF0008662A23EE000C0001BFBA41EE9D
S224FCDDA0001023C80001BFBE2079000 1BFBA42103EBC00016 15E2079000 1BFBA4210602 8DD
S224FCDDC00CAE0000001400086410 41EE000C23C80001BFBE425761 3C600E41EE000823C88E
S224FCDDE00001BFBE425761 2C4E5E4E754E56FFFC23EE00080001BFBA41EE000C23C80001B6
S224FCDE00BFBE3EBC000 1610C2079000 1BFBA42104E5E4E754E56FF9A48E7071C20790001 1F
S224FCDE20BFBE2A5058B9000 1BFBE287900 01BFBE6000040A23CC0001BFBEBE3C0025671 4C7
S224FCDE40100748803E803F2E000861000400548F600003EA42403D40FFAA3D40FFA4101D25

Mar-16-98 02:28pm From-MILLEN, Wh ZELANO & BRANIGAN 7032436410 T-713 P.30/38 F-776

S224FCDE6048801E00B07C614D66061E1D526EFFAABE3C00226601221D526EFFA41D7C002072
S224FCDE80FFA2BE3C003066061D47FFA21E1D3D7CFFFFFFAE60224A6EFFAE6C04426EFFAEF2
S224FCDEA0302EFFAEC1FC000A12074881D041D07CFFD03D40FFAE1E1DBE3C00306D06BE3C85
S224FCDEC000396FD3BE3C002A66061E1D3D5CFFAE3D7CFFFFFFACBE3C002E6606426EFFAC65
S224FCDEE01E1D6018302EFFACC1FC000A12074881D041D07CFFD03D40FFAC1E1DBE3C003003
S224FCDF006D06BE3C00396FDCBE3C002A66061E1D3D5CFFAC426EFFA8BE3C006C6606526E17
S224FCDF20FFA81E1D41EEFFB02D48FF9E1007488048C06000023A4A6EFFA8670A2D7C00FC16
S224FCDF40ED90FF9A60082D7C00FCED20FF9A42572F2EFF9A3F3C00013F3C000A2F0E06978D
S224FCDF60FFFFFFB02F0C4EB900FCECA0DFFC00000010548C4A6EFFA86702548C6000020C4B
S224FCDF804A6EFFA8670A2D7C00FCED90FF9A60082D7C00FCED20FF9A42572F2EFF9A43670A
S224FCDFA03F3C000A2F0E0697FFFFFFB02F0C4EB900FCECA0DFFC00000010548C4A6EFFA860
S224FCDFC06702548C600001C44A6EFFA4670E3EBC00303F2E000861000274548F4A6EFFA84A
S224FCDFE0670A2D7C00FCED90FF9A60082D7C00FCED20FF9A42572F2EFF9A43673F3C000886
S224FCE0002F0E0697FFFFFFB02F0C4EB900FCECA0DFFC00000010548C4A6EFFA86702548C3B
S224FCE020600001684A6EFFA4671C3EBC00303F2E000861000218548F3EBC00783F2E000854
S224FCE0406100020A548F4A6EFFA8670A2D7C00FCED90FF9A60082D7C00FCED20FF9ABE3C37
S224FCE06000586704425760043EBC00012F2EFF9A42673F3C00102F0E0697FFFFFFB02F0CF8
S224FCE0804EB900FCECA0DFFC00000010548C4A6EFFA86702548C600000F223CC0001BFBEBE
S224FCE0A020790001BFBE2D50FF9E58B90001BFBE28790001BFBE600000D23D5CFFA6302EB2
S224FCE0C0FFA648801D40FFB0422EFFB16000008C3EAEFFAC2F0E0697FFFFFFB02F0C6100D0
S224FCE0E001DE508F508C3D7CFFFFFFAC6000009C3EAEFFAC2F0E0697FFFFFFB02F0C61006D
S224FCE1000180508F508C3D7CFFFFFFAC6000007C3EAEFFAC2F0E0697FFFFFFB02F0C6100CA
S224FCE1200160508F2E8E0697FFFFFFB0610001CE322EFFAC5E41B0416F143EAEFFAC2F0E76
S224FCE1400697FFFFFFB02F0C61000174508F508C3D7CFFFFFFAC6032100748803E803F2EAA
S224FCE1600008610000E8548F600000D2601C90BC0000043B0BC0000003562DCE5B0204089
S224FCE180D1FC00FF185C20504ED02EAEFF9E6100016C3C00BC6EFFAC6F0A4A6EFFAC6D040B
S224FCE1A03C2EFFAC302EFFAE90463D40FFA64A6EFFAA664A0C2E0020FFA26724306EFF9E84
S224FCE1C00C10002D661A5346206EFF9E101048803E803F2E000861000074548F52AEFF9E41
S224FCE1E06010102EFFA248803E803F2E0008615C548F302EFFA6536EFFA64A406EE4601679
S224FCE200206EFF9E101048803E803F2E0008613C548F52AEFF9E300653464A4066E3601089
S224FCE220102EFFA248803E803F2E0008611E548F302EFFA6536EFFA64A406EE41E1D6600BB
S224FCE240FBF44A9F4CDF38C04E5E4E754E56FFFC4A6E0008671220790001BFBA10AE000B9F
S224FCE26052B90001BFBA600E102E000B48803E804EB900FC062A102E000B48804E5E4E7528
S224FCE2804E56FFF44A6E00106C063D7C00060010206E00082D680004FFFC2D50FFF83EAE53
S224FCE2A000102F2E000C2F2EFFFC2F2EFFF84EB900FCE80EDFFC0000000C4E5E4E754E5645
S224FCE2C0FFF44A6E00106C063D7C00060010206E00082D680004FFFC2D50FFF83EAE0010A7
S224FCE2E02F2E000C2F2EFFFC2F2EFFF84EB900FCE390DFFC0000000C4E5E4E754E56000098
S224FCE30048E703042A6E00084247600252474A1D66FA30074A9F4CDF30804E5E4E754E56DD
S224FCE320000072FF43EE00083011E848034007FF044003FF6B2404400034640A4400C40EE
S224FCE34000206208E1A92019C291601204400030E1A9C2917000C3406004720070004E5E04
S224FCE3604E754E56000043EE00083211EE490401007F6B1204010017641044017001E3A8B0
S224FCE3804480C09160067000600230114E5E4E754E56FFE648E7070C4A6E00146C083D7CCB
S224FCE3A000010014600E0C6E001000146F063D7C001000143A6E001042A743A73F2E000C06
S224FCE3C02F2E00084EB900FCD69EDFFC0000001066361AFC00304A6E001467041AFC003E18
S224FCE3E060041AFC0030302E0014536E00144A406EF01AFC00651AFC00301AFC00304315E5
S224FCE400202E00106000037242A742A72F2E000C2F2E00084EB900FCD69EDFFC00000010C6
S224FCE4206C1C1AFC002D2F2E000C2F2E00084EB900FCEBD4508F2D4000082D41000C424739
S224FCE440602A2F3C000000002F3C4197D7842F2E000C2F2E00084EB900FCD6D6DFFC0000D0
S224FCE46000102D41000C2D40000850472F3CFFC000002F3C41DFFFFF2F2E000C2F2E000884
S224FCE4804EB900FCD69EDFFC00000106CB42F2E000C2F2E00084EB900FCD998508F2C00AC
S224FCE4A02F2E000C2F2E00082F064EB900FCEBEA588F2F012F004EB900FCD69EDFFC0000E8
S224FCE4C000106F0253A6606251472F3C000000002F3C4197D7842F2E000C2F2E00084EB9A9
S224FCE4E000FCD820DFFC00000102D41000C2D4000082F2E000C2F2E00084EB900FCD9980B
S224FCE500508F2C002F2E000C2F2E00082F064EB900FCEBEA588F2F012F004EB900FCD69E57
S224FCE520DFFC00000106F0253864A866606BE7CFFA56E94425742672F0E0697FFFFFFE68A
S224FCE5402F066100023EDFFC0000000A49EEFFE61ADC4A6E001467041AFC003E60104A6E4A
S224FCE560001467061AD4536E0014528C52474A1466EC2F064EB900FCEBEA588F2F012F00DC
S224FCE5802F2E000C2F2E00084EB900FCD550DFFC00000102D41000C2D4000086000017ACF
S224FCE5A00C6E000800146F000862F3C000000002F3C4197D7842F2E000C2F2E00084EB9F1
S224FCE5C000FCD820DFFC00000102D4000082D41000C2F2E000C2F2E00084EB900FCD9982A
S224FCE5E0508F2C002F2E000C2F2E00082F064EB900FCEBEA588F2F012F004EB900FCD69E77
S224FCE600DFFC00000106F025386516E00143EBC00013F3C00082F0E0697FFFFFFE62F0681
S224FCE62061000160DFFC0000000A600000B62F2E000C2F2E0008302E001448C0E78020400D
S224FCE640223C00FF19342F3018042F3018004EB900FCD820DFFC00000102D4000082D4154
S224FCE660000C2F3C000000002F3C3FE000002F2E000C2F2E00084EB900FCD560DFFC0000B7
S224FCE68000102D41000C2D4000082F2E000C2F2E00084EB900FCD998508F2C002F2E000CC4

Mar-16-99 02:29pm From-MILLEN, Wh ZELANO & BRANIGAN 7032436410 T-713 P.31/38 F-776

S224FCE6A02F2E00082F0CDFB900FCEBEA588F2F012F004EB90090D69EDFFC000000106F02CE
S224FCE6C053863EBC0001712E00142F0E0697FFFFFFE62F0661000 0ACDFFC0000000A426E50
S224FCE6E0001449EEFFE660021ADC4A1466FA2F064EB900FCEBEA588F2F012F002F2E000C17
S224FCE7002F2E00084EB900FCD550DFFC000000102D41000C2D400008 4A6E00146600FEB2DF
S224FCE7201AFC00654A476C0A300744403E001AFC002DBE7C00646D18300748C081FC0064D7
S224FCE740D07C003048801AC048C7AFFC006448473007 48C081FC000AD07C003048801AC029
S224FCE760300748C081FC000A4840D07C003048801AC0421520 2E00104A9F4CDF30C04E5EC7
S224FCE7804E754E56FFE648E7070C2E2E00082A6E000C424649EEFFE652462F3C0000000A31
S224FCE7A02F074EB900FCEE96508FD0BC000000304880 18C02F3C0000000A2F074EB900FCB2
S224FCE7C0EEBE508F2E006ED049EEFFE6BC6E00106C0A302E001090465240600242403D403E
S224FCE7E000104A6E0012670C60041AFC0030536E00106EF660083046D1CE1AE8FFE65346EF
S224FCE8006CF442154A9F4CDF30C04E5E4E754E56FFE648E70F0C4A6E00146C083D7C000100
S224FCE82000146 00E0C6E001000146F063D7C001000142A6E001042A742A72F2E000C2F2E25
S224FCE84000084EB900FCD69EDFFC000000106C1C1AFC002D2F2E000C2F2E00084EB900FCB1
S224FCE860EBD4508F2D400008 2D41000C42A742A72F2E000C2F2E00084EB900FCD69EDFFC18
S224FCE8800000010662A1AFC00304A6E00146716 1AFC002E60041AFC0030302E0014536E27
S224FCE8A000144A4066F0421520 2E00106000029030 2E001448C0E7802040223C00FF197C89
S224FCE8C02F301804 2F3018002F2E000C2F2E00084EB900FCD560DFFC000000102D41000CDA
S224FCE8E02D4000084247602A2F3C000000002F3C4197D7842F2E000C2F2E00084EB900FCB5
S224FCE900D6D6DFFC000000102D41000C2D400008 52472F3CFFC000002F3C41DFFFFF2F2EC7
S224FCE920000C2F2E00084EB900FCD69EDFFC000000106CB42EAE000C2F2E00084EB900FC93
S224FCE940EC18588F2F012F004EB900FCD998508F2A004257426 72F0E0697FFFFFFE62F05BC
S224FCE96061000 1E6DFFC0000000A49EEFFE660021ADC4A1466FA2F054EB900FCEBEA588F44
S224FCE9802F012F002F2E000C2F2E00084EB900FCD550DFFC000000102D41000C2D40000847
S224FCE9A04A476 7682F3C000000002F3C4197D7842F2E000C2F2E00084EB900FCD820DFFC49
S224FCE9C000000010 2D41000C2D4000085 3472EAE000C2F2E00084EB900FCEC18588F2F0132
S224FCE9E02F004EB900FCD998508F2A003EBC00013F3C00082F0E0697FFFFFFE62F0561009A
S224FCEA000148DFFC0000000A6000FF604A6E00146704 1AFC002E6000011 80C6E000800147E
S224FCEA206F682F3900FF1A502F3900FF1A4C2F2E000C2F2E00084EB900FCD820DFFC0000BC
S224FCEA4000102D41000C2D400008 2EAE000C2F2E00084EB900FCEC18588F2F012F004EB915
S224FCEA6000FCD998508F2A00516E00143EBC00013F3C00082F0E0697FFFFFFE62F0561007C
S224FCEA8000C8DFFC0000000A607030 2E001448C0E7802040223C00FF1A0C2F301804 2F305A
S224FCEAA018002F2E000C2F2E00084EB900FCD820DFFC000000102D41000C2D40000 82EAEBE
S224FCEAC0000C2F2E00084EB900FCEC18588F2F012F004EB900FCD998508F2A003EBC0001FF
S224FCEAE02F2E00142F0E0697FFFFFFE62F056158DFFC0000000A426E001449EEFFE66002C3
S224FCEB001ADC4A1466FA2F054EB900FCEBEA588F2F012F002F2E000C2F2E00084EB900FC1D
S224FCEB20D550DFFC000000102D41000C2D40000 84A6E00146600FEE442152 02E00104A9F23
S224FCEB404CDF30E04E5E4E754E56FFE648E7070C2E2E00082A6E000C424649EEFFE65246FB
S224FCEB602F3C0000000A2F074EB900FCEE96508FD0BC000000304880 18C02F3C0000000AB2
S224FCEB802F074EB900FCEEBE508F2E006ED049EEFFE68C6E00106C0A302E001090465340A2
S224FCEBA0600242403D4000104A6E0012670C60041AFC0030536E00106EF660083046D1CE4A
S224FCEBC01AE8FFE653466CF442154A9F4CDF30C04E5E4E75202F0004222F00080840001F77
S224FCEBE04E75302F000448C06006202F00044E712F032F0242A722006A063EBC800044815 1
S224FCEC0076002 43C4330000020024EB900FCD570D09F241F261F4E754E56FFF432EAE000C07
S224FCEC202F2E00084EB900FCE31E588F2D40FFF82D41FFFC42A742A72F2E000C2F2E000816
S224FCEC404EB900FCD69EDFFC000000106C452F2EFFFC2F2EFFF82F2E000C2F2E00084EB91E
S224FCEC6000FCD69EDFFC000000106C282F3C000000002F3C3FF000002F2EFFFC2F2EFFF8F3
S224FCEC804EB900FCD550DFFC000000102D41FFFC2D40FFF8222EFFFC202EFFF84E5E4E7594
S224FCECA04E56FFF048E7030C2F0E0697FFFFFFF03F2E00123F2E00102F0E06970000000CD9
S224FCECC02F2E0008206E00144E90DFFC000000102A40200ED0BCFFFFFFF0BBC066022421D10
S224FCECE0286E000C60201E254887BE7C000A6C06DE7C00306 00E4A6E001867047037600 2ED
S224FCED007057DE4018C7200ED0BCFFFFFFF0BBC066D442142 00C4A9F4CDF3080 4E5E4E751D
S224FCED204E5600004 8E707042A6E00143C2E001048C6206E0008301048C02E004A6E0012EA
S224FCED40671C4A876C18200744802E00206E000C205010BC002D226E000C529 16006CEBC4F
S224FCED600000FFFF601A2E862F074EB900FCEEBE588F48C02E0020390003 2A4E48801AC0EE
S224FCED804A8766E2200D4A9F4CDF20C04E5E4E754E5600004 8E71F0C2A6E00143A2E0010A7
S224FCEDA048C5206E00082E102C070C6E00100010662078086010 2007C0BC0000000F4880B4
S224FCEDC01AC0E88753444A8767044A4466E8600000BA0C6E0008001066 2A780B6010 2007E4
S224FCEDE0C0BC00000007488 01AC0E68753444A8767044A4466E84A44660602 2D0003FFFFA7
S224FCEE0060000 0884A6E0012675C4A876C32206E000C205010BC002D226E000C52918EBC11
S224FCEE2080000000006614287C00FF1A54301C48801AC066F8538D200D60522007 44802E00A2
S224FCEE40601E2F052F074EB900FCEE96508F48801AC02F052F074EB900FCEEBE508F2E009B
S224FCEE604A8766DE602460 1E2F052F064EB900FCEEAA508F48801AC02F052F064EB900FC89
S224FCEE80EF40508F2C004A8666DE200D4A9F4CDF30F04E5E4E752F2F00082F2F00084EB980
S224FCEEA000FCEEBE508F20014E752F2F00082F2F00084EB900FCEF40508F20014E75204 3C2
S224FCEEC0222F00046C0244 81262F00086E0E6D0A203C8000000022006 05C4483B6BC000066

S224FCEEE0000166062001170060 3A7000B6816D086E22700172796 02C740282BC0001000067
S224FCEF006C0C82C3300142414841601 8D482D683B28364F8606B2836504808292 83E28BB4
S224FCEF20E28A66F24A6F00046A0444804481 4A6F00086A02448023C100032A4E26084E7517
S224FCEF40204322442 22F0004262F0008B6BC000000016606200172006040700082 83653ADF
S224FCEF60660670017200603274022801C8BC0000FFFF828 4660C82C33001424148416 01AEA
S224FCEF80D482E38B650E828364F66008B28365048082 92 83E293E28A66F2260828094E7532
S224FCEFA04E560000 48E707042A6E000860025 28D0C15002067F80C15000A67F20C15000943
S224FCEFC067EC7C010C15002B67060C15002D660E0C1D002B6604700160027 0FF3C00424720
S224FCEFE06010CFFC000A1015488 0DE40DE7CFFD0528D0C1500306D060C1500396FE4300611
S224FCF000C1C74A9F4CDF20C04E5E4E754E5600004 8E707042A6E00086002528D0C15002004
S224FCF02067F80C15000A67F20C15000967EC7C010C15002B67060C15002D66100C1D002B21
S224FCF0406604700160027 0FF48C02C0042876020 2F3C0000000A2F074EB900FCF0D8508F31
S224FCF0602E0010154880D07CFFD048C0DE80528D0C1500306D060C1500396FD42F072F0648
S224FCF0804EB900FCF0D8508F4A9F4CDF20C04E5E4E754E5600004 8E703042A6E00084 2475F
S224FCF0A06004 5247528D4A1566F830074A9F4CDF20804E5E4E754E5600004 8E7011C2A6ED4
S224FCF0C000082 86E000C264D1ADC66FC200B4A9F4CDF38004E5E4E7592C94A6F00046C064A
S224FCF0E044AF00045 2494A6F00086C0644AF00085349322F0006302F000A3401C4C02042C8
S224FCF100342F00046702C4C0302F00086702C0C1D04248404240D0883209670244804E75AA
S224FCF120322F0006302F000A3401C4C02042342F00046702C4C0302F00086702C0C1D0433C
S224FCF14048404240D0884E7500000000000000000000000000000000000000000000000089
S224FF000000FC194600FC19D800FC19D800FC19D800FC19D800FC1B9E00FC1BA800FC1BB092
S224FF002000FC1BBC00FC1BC800FC1BD000FC1BF000FC1BD800FC1BE400FC1D0000FC1D12EE
S224FF004000FC1D0000FC1D1200FC1D3400FC1D6400FC1D6400FC1D6443616E277420637 2F2
S224FF006065617465202770 6D5F636F6E74726F6C272054232532640A0000424F415244 5F0F
S224FF00804E414D4520686173206E6F7420626 5656E2064656 6696E65642E0A0052656 16411
S224FF00A065722F6465766963652063 6F6E74726F6C2068617320626 5656E2072656C696E55
S224FF00C071756973686564 2E0A0043616E277420637265617465202761 6C6C63656C6C731D
S224FF00E027205423253 2640A000000FC320200FC320200FC320200FC320200FC320200FC8D
S224FF0100320200FC320200FC320200FC320200FC320200FC320200FC320200FC320200FC5B
S224FF0120320200FC320200FC325A693D25642C206F7574627566663D25730000FFFFFFFF88
S224FF0140FFF001020407F10103050801FFFFFFFFF2020306090 2FFFFFFFF03FFFFFFFFF3A9
S224FF01600302010AF40006050404FFFFFFFF05FFFFFFFFF5050401 0A06FFFFFFFFF606045C
S224FF0180020AF70605030AFFFFFFFFFFF80009080707FFFFFFFF08FFFFFFFFF90807010A1B
S224FF01A009FFFFFFFFFFA0907020AFB0908030AFFFFFFFFFFF00FFFFFFFFFC0007040AFD0002
S224FF01C008050AFFFFFFFFFFFE0009060AFFFFFFFFFFFFFFFFFFFFFFFFFFFFFFFFFFFFFFF05
S224FF01E0FFFF07030406FFFF0406FFFFFFFF02080109FFFFFFFF0208FFFFFFFF0505FFFFC7
S224FF020008020505050508020505FFFF0307FFFF010903070505 0109FFFFFFFFFFFF090176
S224FF02200604FFFF0604FFFFFFFFFFFF03070208FFFF0208FFFF03070208 0109FFFFFFFF7A
S224FF0240FFFFFFFFFFFFFFFFFFFFFFFFFFFFFF030702080109060405050406FFFFFFFFFFFF72
S224FF0260FFFFFFFF0000FFFFFFFFFFFFFFFFFFFFFFFFFFFF0505FFFFFFFFFFFF0505040674
S224FF0280FFFF0109FFFF01090109FFFF0505FFFF0604030804 06FFFFFFFF0604FFFF04060E
S224FF02A002080208FFFF02080604020804 06FFFF0505FFFFFFFFFFFFFFFF06040505 0307E2
S224FF02C003070307FFFFFFFF0505FFFFFFFFFFFFFFFFFFFF0000090108020703000009 01E2
S224FF02E0080207030000000000000008020703FFFFFFFFFFFFFFFF080207030109FFFFFFFFC0
S224FF0300FFFFFFFFFFFF01090901FFFF0703FFFFFFFF0901FFFF07030208FFFFFFFFFFFFB1
S224FF0320FFFF0208FFFFFFFF09010802FFFFFFFF09010802FFFF0307FFFFFFFFFFFF030785
S224FF0340FFFFFFFFFFFF0703FFFF0703FFFFFFFF0406FFFF0000FFFFFFFF0703000000008 3
S224FF0360FFFF0802050508020802FFFF0505080205050000FFFF0802FFFF0000FFFF000033
S224FF0380FFFF0901FFFF0901FFFFFFFF0604FFFF00000901FFFFFFFFFFFF00000000FFFF43
S224FF03A0FFFF0209FFFFFFFF07040704FFFFFFFF0407FFFF0209FFFF0100FFFFFFFFFFFF15
S224FF03C0FFFF0803FFFFFFFF0506FFFFFFFF0308FFFFFFFF0100FFFFFFFF0902FFFFFFFF02
S224FF03E0090206050605090206 05FFFF0308FFFFFFFFFFFFFFFF0209FFFF03080209FFFFA4
S224FF04000100FFFFFFFFFFFFFFFF03080209FFFF0100FFFFFFFFFFFFFFFF05060001FFFFC8
S224FF0420FFFF0506FFFF0407FFFF0407FFFF04070605050604 07FFFF0506FFFFFFFFFFFF70
S224FF04400506 0506FFFF04070407FFFFFFFF0100FFFF04070605 0209FFFF06050605FFFF40
S224FF04600605FFFF0407FFFF02090407060502 09FFFFFFFF0506FFFFFFFF06050506FFFF33
S224FF04800308 0308FFFF0308FFFFFFFF0506FFFFFFFFFFFF0704FFFFFFFF0803FFFF2A
S224FF04A0000109020803 0704FFFFFFFF07040803080308 03FFFF070407040803 0100FFFFD0
S224FF04C0FFFF0803FFFF01000100FFFFFFFFFFFF09020704 0704FFFFFFFF0209FFFFFFFFF1
S224FF04E002090704FFFF02090902FFFFFFFFFFFFFFFFFFFF0902080303080308 0902FFFFA3
S224FF0500FFFF0308FFFFFFFF0001FFFF00010704FFFF0704FFFF0407FFFF0407FFFFFFFFB0
S224FF0520FFFFFFFF0001FFFFFFFFFFFF0506000105 06FFFFFFFF0001FFFF0803FFFFFFFFA7
S224FF05400506FFFFFFFF0902FFFF0605FFFF09020605FFFF00010902FFFFFFFF0605FFFF59
S224FF05600101FFFFFFFF0101FFFFFFFFFFFF0705FFFFFFFFFFFF04080200FFFF0200FFFF6B
S224FF0580010103090101 0804FFFF0804FFFFFFFFFFFFFFFF0309FFFFFFFF0309FFFF09031B
S224FF05A0FFFF0903FFFFFFFF0606FFFFFFFFFFFF0309FFFF02000200FFFF01010101030 90F

S224FF05C0010102000101FFFFFFFFFFFF01010309030902000809FFFFFFFF0408FFFF0002F1
S224FF05E00606FFFFFFFF0606FFFFFFFFFFFF0408050704080606FFFFFFFFFFFF0101FFFFBF
S224FF06000101FFFFFFFFFFFFFFFF0507040805070408FFFFFFFF04080606FFFFFFFFFFFF9E
S224FF062006060606FFFF0408FFFF04080200FFFFFFFF0507FFFFFFFFFFFF0606FFFF060670
S224FF06400606FFFF0507FFFF03090507FFFFFFFFFFFFFFFFFFFFFFFFFFFFFFFFFFFFFFFF7E
S224FF0660FFFFFFFF0002090308040705FFFFFFFFFFFFFFFF0101FFFFFFFF08040705FFFF48
S224FF06800101FFFFFFFF08040705FFFFFFFFFFFF09030903FFFF0705FFFFFFFF0200FFFF28
S224FF06A0FFFF09030200FFFF020008040903FFFF090308040804080409030309FFFF0309C2
S224FF06C0FFFF0804FFFF03090002FFFF000200020705070500020705040804080002 0408B2
S224FF06E0FFFFFFFFFFFFFFFFFFFF0002000208040804FFFFFFFF05070507FFFFFFFFFFFFD6
S224FF0700FFFFFFFF00020903FFFFFFFF0606FFFFFFFFFFFFFFFFFFFF00020903FFFFFFFFC3
S224FF07200606FFFF0201FFFFFFFF07060201FFFF070604090201FFFF0409FFFFFFFFFFFF7C
S224FF07400102FFFF01020102FFFF080501020805FFFF0508010205080300FFFF0300FFFF56
S224FF07600201FFFF0201FFFFFFFF0904FFFFFFFFFFFF0607FFFFFFFF03000300FFFF02015E
S224FF07800102FFFF030002010102FFFF030002010102FFFF0300030003000607FFFFFFFF34
S224FF07A00003FFFFFFFFFFFF0003FFFFFFFFFFFFFFFF06070508040901020508FFFF010205
S224FF07C0FFFFFFFF0102FFFFFFFF0508FFFFFFFFFFFF05080409FFFF020104090201FFFFEA
S224FF07E00201FFFFFFFFFFFFFFFFFFFF04090607FFFF040906070508FFFFFFFF0300FFFFC0
S224FF0800FFFFFFFFFFFFFFFF06070508FFFFFFFF03000904FFFFFFFF0003FFFFFFFFFFFFBD
S224FF0820FFFFFFFFFFFFFFFF000309040805070601020805FFFF0102FFFF0805FFFFFFFF7A
S224FF0840FFFFFFFF0102FFFFFFFF08050706FFFF020107060201FFFFFFFFFFFF0706FFFF69
S224FF08600201FFFFFFFF0904FFFF070609040805FFFFFFFFFFFFFFFF090408050300FFFF30
S224FF0880FFFFFFFFFFFFFFFF0300FFFF0003FFFF00030706FFFF0706FFFF0409FFFF040929
S224FF08A0FFFFFFFFFFFFFFFFFFFFFFFF0003000308050805FFFFFFFF05080508FFFFFFFF0E
S224FF08C0FFFFFFFFFFFFFFFF00030003000309040904090400030607060706070003FFFFC1
S224FF08E0FFFFFFFFFFFF0103FFFFFFFF0400FFFF02020103FFFF0707FFFF0103FFFF0400E0
S224FF090004000301FFFFFFFFFFFF080603010806FFFF050903010509FFFFFFFFFFFFFFFF9B
S224FF0920FFFFFFFF0202FFFF0905FFFF020209050608FFFF02020608FFFFFFFFFFFFFFFF81
S224FF0940FFFFFFFFFFFFFFFF030102020103FFFF030102020103FFFFFFFFFFFF0004060879
S224FF09600509FFFFFFFF00040004FFFFFFFF06080509FFFFFFFFFFFFFFFFFFFF0103FFFF51
S224FF098001030400FFFFFFFF0103FFFFFFFF0509FFFF04000400FFFF020206080202020223
S224FF09A00400FFFF0202FFFFFFFF0608020206080400FFFF04000301FFFF05090301FFFFF9
S224FF09C00301FFFFFFFFFFFFFFFF0509FFFFFFFF06080509FFFF09050806FFFFFFFFFFFFDD
S224FF09E0FFFFFFFF070707070707FFFFFFFF0905080607070103FFFF01030806FFFF080687
S224FF0A00FFFF07070707070701030707FFFF0806FFFF09050202020209050905020209054A
S224FF0A2007070707FFFFFFFF07070905FFFF0301FFFF08060301FFFFFFFF0806FFFFFFFF66
S224FF0A400301FFFFFFFFFFFFFFFF09050806FFFFFFFFFFFFFFFF00040004FFFFFFFF070770
S224FF0A600707FFFFFFFF040004000004FFFFFFFFFFFFFFFF0004FFFF08060509FFFF05093A
S224FF0A8005090004FFFFFFFF0004FFFFFFFFFFFFFFFFFFFF0004090506080608FFFF060810
S224FF0AA00004FFFFFFFFFFFFFFFF0203FFFF0104FFFF010402030708FFFFFFFFFFFF010418
S224FF0AC00708FFFFFFFFFFFF03020302FFFF0104FFFFFFFFFFFF0807FFFFFFFFFFFF0500F4
S224FF0AE0050003020203FFFFFFFF0906FFFFFFFFFFFF0609FFFFFFFFFFFFFFFFFFFFFFFFDB
S224FF0B00FFFF0203FFFFFFFF01040104FFFF0203FFFFFFFF030202030104FFFFFFFF0401B9
S224FF0B20FFFF06090401FFFFFFFFFFFF0005FFFF0401060906090500FFFFFFFFFFFF04017B
S224FF0B40FFFF0401FFFFFFFF0104FFFF05000401FFFFFFFFFFFF050005000401FFFFFFFFB0
S224FF0B60FFFFFFFF0401FFFF0203060904010609FFFFFFFFFFFF06090302FFFFFFFF03023B
S224FF0B800500FFFF0302FFFFFFFFFFFFFFFF060905000500FFFF0807FFFF0906FFFFFFFF22
S224FF0BA000050906FFFFFFFFFFFF080707080807FFFF0906FFFF0708FFFFFFFF01040104D6
S224FF0BC00104FFFFFFFFFFFF08070708FFFF0708FFFFFFFFFFFFFFFF02030906FFFF0906CE
S224FF0BE0FFFF07080708FFFFFFFFFFFF07080906FFFFFFFFFFFF03020906FFFFFFFF0906A4
S224FF0C0008070807FFFFFFFF0807FFFF09060401FFFFFFFF04010005FFFFFFFF000507087F
S224FF0C20FFFFFFFF0708FFFFFFFFFFFF08070005FFFFFFFFFFFF0005FFFF0005FFFF080788
S224FF0C400807FFFFFFFFFFFF0500FFFF0005FFFFFFFFFFFF00050906FFFF0609FFFF060957
S224FF0C600609FFFF0005FFFFFFFF0105FFFF0402FFFFFFFFFFFF01050709FFFFFFFF07093C
S224FF0C800204010507090501FFFF0303FFFF0105FFFFFFFFFFFF0808FFFFFFFFFFFFFFFF24
S224FF0CA0FFFFFFFFFFFF030303030303FFFF020402040303FFFF090709070303FFFF0600EC
S224FF0CC006000204FFFF03030303FFFFFFFF0204FFFFFFFFFFFFFFFF030302040105FFFFF0
S224FF0CE0FFFF0501FFFFFFFFFFFF0501FFFF0006060005010402FFFF06000600FFFFFFFFD0
S224FF0D00FFFF0402FFFF0105FFFF04020105FFFF05010402FFFFFFFF0105FFFFFFFFFFFFB7
S224FF0D2004020402FFFF0204FFFFFFFF0600FFFF0402FFFFFFFF060006000501FFFF030387
S224FF0D40FFFF06000501FFFF030306000501FFFF030306000600060009070808FFFFFFFF43
S224FF0D600006FFFF00060006FFFFFFFFFFFFFFFF09070808FFFFFFFFFFFF0709FFFF010539
S224FF0D800105FFFF0105FFFF08080709FFFFFFFFFFFF0709FFFFFFFF0709FFFF0204020407
S224FF0DA00204FFFFFFFF0907FFFF0709FFFFFFFF07090907FFFF03030303FFFFFFFFFFFFEF
S224FF0DC00303FFFFFFFF0907FFFF09070808FFFF0402FFFFFFFF04020006FFFFFFFF0006D1
S224FF0DE00709FFFFFFFF0709FFFFFFFFFFFF0501FFFF0006050100060501000600060808A1

Mar-16-99 02:32pm From-MILLEN, WH ZELAND & BRANIGAN 7032436410 T-713 P.34/38 F-776

S224FF0E00FFFFFFFF080872FF080800060907FFFF0006FFFFFF35FFFF00060006FFFF090786
S224FF0E200907FFFFFFFF0600FFFFFFFFFFFFFFFF0403FFFF02050106FFFF0700FFFFFFFF90
S224FF0E4004030700FFFFFFFFFFFFFFFFFFFF0502FFFF0304FFFF01060809FFFFFFFF08095B
S224FF0E600304FFFFFFFFFFFFFFFFFFFF0601FFFFFFFF030402050908FFFFFFFF090803043B
S224FF0E80FFFFFFFF030402050106FFFFFFFFFFFFFFFFFFFFFFFFFFFFFFFFFFFF0304020541
S224FF0EA00106FFFFFFFFFFFFFFFFFFFF0601050204030007FFFFFFFF04030007FFFFFFFF0F
S224FF0EC005020403FFFFFFFF0106FFFFFFFFFFFFFFFFFFFF05020403FFFFFFFF01060601EF
S224FF0EE0FFFF0403FFFF0205FFFFFFFFFFFFFFFF0601FFFF0403FFFF0205FFFFFFFF0601D8
S224FF0F000502FFFF0304FFFFFFFFFFFFFFFF06010502FFFF0304FFFFFFFF00070908080991
S224FF0F20FFFF0700FFFFFFFFFFFFFFFFFFFFFFFFFFFFFFFFFFFFFFFFFFFFFFFFFFFFFFFFC4
S224FF0F40FFFFFFFF01060106FFFFFFFF0809080907000700FFFFFFFFFFFFFFFFFFFFFFFF63
S224FF0F600205FFFF0205FFFF0908FFFF09080700FFFF0700030409080809FFFF0304030402
S224FF0F800304FFFFFFFF09080809FFFF03040908080900070403040304030700FFFFFFFFE2
S224FF0FA00403FFFF000700070403FFFF07000700FFFFFFFFFFFF0502FFFFFFFF0502FFFF05
S224FF0FC0FFFF0007FFFF08090007FFFF0809FFFFFFFFFFFF0601FFFF0601FFFFFFFFFFFFE3
S224FF0FE0FFFF0007090800070908FFFFFFFF070102060701FFFFFFFFFFFF02060107FFFFA3
S224FF10000107FFFFFFFFFFFF03060107FFFF05030503FFFF0305FFFFFFFFFFFF010701079C
S224FF10200503FFFFFFFF080006020305FFFF0602FFFF0305FFFFFFFF0909FFFFFFFF090968
S224FF1040FFFF0305FFFF010703050206FFFFFFFF03050206FFFF010701070107FFFF010748
S224FF106003050206FFFFFFFFFFFFFFFF04040404FFFF0503000800080602FFFF0404000838
S224FF1080FFFFFFFF05030503050304040404040405030107010701070503FFFFFFFFFFFFFE
S224FF10A0FFFFFFFFFFFF0602FFFF0404FFFF0206FFFFFFFF0602FFFF0404FFFF0306060206
S224FF10C0FFFFFFFFFFFF030503050602FFFFFFFFFFFF06020503FFFF0305FFFF0701FFFFE6
S224FF10E00909070108000701FFFFFFFFFFFFFFFF0909FFFF0800FFFFFFFFFFFF0701FFFFB2
S224FF1100070108000701FFFFFFFFFFFFFFFF0107FFFFFFFF0800080007010701FFFF070191
S224FF112002060701020602060909070109090909FFFFFFFFFFFFFFFF03050909FFFFFFFF3F
S224FF11400305FFFF0305FFFFFFFF090909090800FFFFFFFFFFFFFFFFFFFF07010404FFFF51
S224FF11600404FFFF0008FFFFFFFF000804040008FFFFFFFFFFFF050305030800FFFFFFFF3B
S224FF11800503FFFF0008FFFFFFFF0800FFFF080006020008FFFF0602FFFFFFFF0602FFFF1B
S224FF11A0FFFF0008FFFFFFFFFFFF00080909FFFFFFFF070207020405040507020405FFFFE1
S224FF11C0FFFFFFFF01080207FFFFFFFFFFFFFFFF03060801FFFFFFFFFFFF03060108FFFFE9
S224FF11E0FFFF010805040108030602070603FFFF0603FFFFFFFF0306FFFFFFFF020702079D
S224FF12000603FFFF0900FFFF020701080306FFFF0306FFFF03060306FFFFFFFF020701087C
S224FF12200207010803060504FFFFFFFF0603FFFFFFFF0504FFFF0009FFFF0009FFFF050467
S224FF1240040500090504FFFFFFFFFFFFFFFFFFFF0504040501080108FFFF01080504FFFF47
S224FF1260FFFF0207FFFF0603060304050405FFFFFFFF020702070207060302070405FFFF11
S224FF128005040603FFFF0603FFFF0504FFFFFFFFFFFFFFFFFFFF06030504FFFF0306FFFF1D
S224FF12A00801FFFFFFFF090008010702FFFFFFFF0801FFFF000909000900FFFFFFFFFFFFF2
S224FF12C00702FFFFFFFF08010702FFFF0108FFFF07020108FFFF0108FFFFFFFFFFFF0702D2
S224FF12E007020900FFFF0702FFFFFFFF0207FFFFFFFFFFFF0900090008010801030608019C
S224FF1300FFFF08010306030609000801FFFFFFFF09000900FFFF07020405FFFF0702040570
S224FF1320040507020405000 9FFFFFFFF0009FFFF04050009FFFF0801000908010504FFFF50
S224FF13400504FFFF00090801000900090504FFFF0009FFFF0603FFFF06030900FFFFFFFF3B
S224FF13600603FFFFFFFF0009FFFF09000900FFFF0000004200000050000000540000005512
S224FF1380000000590000000000FC375C00FC376600FC377000FC37E600FC37EE00FC380CAB
S224FF13A020202020202020202028282828282020202020202020202020202020202020202001
S224FF13C04810101010101010101010101010101010848484848484848484101010101010 49
S224FF13E0108181818181010101010101010101010101010101010101010110101010101006F
S224FF14001082828282820202020202020202020202020202020202020202101010101010 34
S224FF1420256325632563000000FC51E600FC507E00FC52F600FC52F600FC52F600FC52F603
S224FF144000FC52F600FC511000FC52F600FC4FF000FC52F600FC517C00FC52F600FC52F6D3
S224FF146000FC514600FC52F600FC502C00FC522C00FC518E00FC51A000FC52F600FC52F64F
S224FF148000FC52F600FC524000FC538000FC538000FC538000FC538000FC538000FC53809C
S224FF14A000FC538000FC538000FC538000FC538000FC538000FC538000FC538000FC5380B0
S224FF14C000FC538000FC538000FC538000FC594800FC5DF000FC6C2200FC657000FC72826A
S224FF14E000FC785C4531323032204241442050414 34B455400004531323334204 94A205617
S224FF150065726966792045727 26F720000000042000000500000005400000055000000 59EA
S224FF15200000000000FC817600FC818000FC818A00FC81F800FC820000FC821E323330206C
S224FF15405541525400002563256325632563000025632563253033 2E336400002563 2563BE
S224FF156000002563256300002563256300003233322049 4A00002563256300000 0FC892A3E
S224FF158000FC89F200FC893C00FC8B6400FC8ABE00FC893C00FC8B6400FC8AD00000003 1AD
S224FF15A00000003200000034000000350000003700000042000000430000004500000049 42
S224FF15C00000004D000000540000005800000000 00FC8C3200FC8C0800FC8C4C00FC8C1850
S224FF15E000FC8C5C00FC8DB000FC8D0A00FC8DB800FC8C6C00FC8CDE00FC8CF800FC8CE6AE
S224FF160000FC8E460000004200000 04B000000500000005400000055000000590000000017
S224FF162000FC8E5A00FC8E6400FC8E6E00FC8E7800FC8EEE00FC8EF600FC8F143233302 08E

What is claimed is:

1. A surveillance module for an object traveling along a transport mechanism of a transport path comprising:

first means, operably coupled to a tracking means, for sensing the object;

second means, operably coupled to the tracking means, for sensing the object;

means, operably coupled to the tracking means, for representing a position of the transport mechanism with respect to a reference point;

means, operably coupled to the tracking means, for assigning a unique object identifier to the object in response to detecting of the object by at least the first means for sensing, and for associating said identifier with a representation from said means for representing said position of said transport mechanism; and, tracking means for tracking a given location of the object in response to input from the first means for sensing, the second means for sensing, the means for assigning the unique identifier, and the means for representing a position of the transport mechanism with respect to a reference point, said tracking means comprising:

means for determining a first reference indication corresponding to the arrival detected by the first means for sensing;

means for determining a second reference indication corresponding to the arrival detected by the second means for sensing; and, means for comparing an expected arrival reference indication with an actual arrival reference indication.

2. The surveillance module of claim 1 wherein the first means for sensing and the second means for sensing each comprise an optic signal emitter and an optic signal detector.

3. The surveillance module of claim 1 wherein the first means for sensing and the second means for sensing sense an edge of the object.

4. The surveillance module of claim 1 wherein the means for representing a position of the transport mechanism comprises a shaft encoder.

5. The surveillance module of claim 1 wherein the second means for sensing is positioned as a next subsequent sensor along the transport path.

6. The surveillance module of claim 1 wherein the tracking means comprises a microprocessor.

7. The surveillance module of claim 1 wherein the tracking means comprises:

means for detecting an arrival of an object using the first means for sensing;

means for assigning the unique object identifier to the object in response to detecting the arrival of the object;

means for communicating the object identifier and the first reference indication to a message queue associated with the second means for sensing;

means for detecting the arrival of the object using the second means for sensing;

means for retrieving from the message queue the unique object identifier and the first reference indication;

means for computing a net difference between the first reference indication and the second reference indication;

means for comparing the net difference to a predetermined expected arrival time; and means for determining an object status in response to the value of the net difference.

8. An object surveillance system for an object travelling along a transport mechanism of a transport path comprising:

a plurality of object tracking modules with each tracking module comprising:

first means, operably coupled to a tracking means, for sensing the object;

second means, operably coupled to a tracking means, for sensing the object;

means, operably coupled to the tracking means, for representing a position of the transport mechanism with respect to a given reference point;

means, operably coupled to the tracking means, for assigning a unique object identifier to the object in response to detection of the object by at least the first means for sensing, and for associating said identifier with a representation from said means for representing said position of said transport mechanism;

tracking means for tracking a given location of the object in response to input from the first means for sensing, the second means for sensing, the means for assigning the unique identifier, and the means for representing a position of the transport mechanism with respect to a given reference point, said tracking means comprising:

means for determining a first reference indication corresponding to the arrival detected by the first means for sensing;

means for determining a second reference indication corresponding to the arrival detected by the second means for sensing; and, means for comparing an expected arrival reference indication with an actual arrival reference indication;

system tracking means for communicating with each tracking means for tracking the given location of the object.

9. The surveillance system of claim 8 wherein the first means for sensing and the second means for sensing each comprise an optic signal emitter and an optic signal detector.

10. The surveillance system of claim 8 wherein the first means for sensing and the second means for sensing sense an edge of the object.

11. The surveillance system of claim 8 wherein the means for representing a position of the transport mechanism comprises a shaft encoder.

12. The surveillance system of claim 8 wherein the second means for sensing is positioned as a next subsequent sensor along the transport path.

13. The surveillance system of claim 8 wherein the tracking means comprises a microprocessor.

14. The surveillance system of claim 8 wherein the tracking means comprises:

means for detecting an arrival of an object using the first means for sensing;

means for assigning the unique object identifier to the object in response to detecting the arrival of the object;

means for communicating the object identifier and the first reference indication to a message queue associated with the second means for sensing;

means for detecting the arrival of the object using the second means for sensing;

means for retrieving from the message queue the unique object identifier and the first reference indication;

means for computing a net difference between the first reference indication and the second reference indication;

means for comparing the net difference to a predetermined expected arrival time; and means for determining an object status in response to the value of the net difference.

15. The surveillance system of claim 8 wherein the system tracking means communicates with each module tracking means over a common bus.

16. The surveillance system of claim 8 wherein the system tracking means communicates with the tracking means on an independent multi-tasking basis.

17. A document surveillance system for tracking a document traveling along a transport path in a document sorting system comprising:

a plurality of sensors, positioned in sequence along the transport path, for detecting an edge of the document;

optical character reading mechanism, positioned along the transport path, for reading characters located on the document;

means, operably coupled to the plurality of sensors, for determining document status of the document as it travels along the transport path wherein the means for determining document status further comprises means for passing edge detection information between the plurality of sensors, said edge detection information comprising a unique document identifier and a representation of a position of a transport mechanism associated with said transport path; and a document labeling mechanism for labeling the document in response to output from the optical character reader.

18. A method of surveillance for an object travelling along a transport mechanism of a transport path comprising the steps of:

detecting an arrival of an object using a first means for sensing;

determining a first reference indication corresponding to the arrival detected by the first means for sensing, said first reference indication being representative of a first position of said transport mechanism;

assigning a unique object identifier to the object in response to detecting the arrival of the object;

communicating the object identifier and the first reference indication to a message queue associated with a second means for sensing;

detecting the arrival of the object using the second means for sensing;

determining a second reference indication corresponding to the arrival detected by the second means for sensing, said second reference indication being representative of a second position of said transport mechanism;

retrieving from the message queue the unique object identifier and the first reference indication;

computing a net difference between the first reference indication and the second reference indication;

comparing the net difference to a predetermined expected arrival time; and determining an object status in response to the value of the net difference.

19. The method of claim 18 wherein determining a first reference indication further comprises reading an output count generated by a shaft encoder which represents a current transport mechanism position.

20. The method of claim 18 wherein communicating a message to a message queue associated with the second means for sensing comprises storing the message in a register location accessible by a microprocessor as a first-in first-out register.

21. A method of surveillance for an object traveling along a transport path comprising the steps of:

detecting a leading edge of an object using a first means for sensing;

determining a first reference indication corresponding to the time in which the leading edge was detected;

assigning a unique object identifier to the object in response to detecting the leading edge of the object;

communicating an arrival message, whose content includes the unique object identifier and the first reference indication to a message queue associated with a next subsequent means for sensing;

detecting a trailing edge of the object by the first means for sensing;

determining a second reference indication corresponding to the time at which the trailing edge was detected by the first means for sensing;

determining a net object blockage time in response to the first reference indication and the second reference indication;

generating an object jam signal when the net object blockage time is substantially different than a designated blockage tolerance;

communicating a trail message, whose context includes the object identifier and the second reference indication to the message queue;

detecting the leading edge of the object using the next subsequent means for sensing;

recording a third reference indication corresponding to the time in which the next subsequent means for sensing detected the leading edge of the object;

retrieving from the message queue the arrival message;

comparing the first reference indication to the third reference indication resulting in a net arrival indicator;

generating a new document identifier when the net arrival indicator is less than a predetermined range;

generating a new arrival message whose contents include the new object identifier and the third reference indication; and adjusting the message queue in response to the net arrival indicator.

22. The method of claim 21 wherein adjusting the message queue further comprises:

rearranging the order of the arrival message and the trail message in the message queue to maintain the arrival message in the message queue for use on a next object traveling along the transport path.

* * * * *